United States Patent
Yoshida et al.

(10) Patent No.: US 9,575,364 B2
(45) Date of Patent: Feb. 21, 2017

(54) LIQUID CRYSTAL DISPLAY

(71) Applicant: Sharp Kabushiki Kaisha, Osaka-shi, Osaka (JP)

(72) Inventors: Hidefumi Yoshida, Osaka (JP); Tsuyoshi Kamada, Osaka (JP); Tsuyoshi Maeda, Osaka (JP); Mitsuhiro Murata, Osaka (JP); Yoji Yoshimura, Osaka (JP); Yuichiro Yamada, Osaka (JP); Kenji Okamoto, Osaka (JE); Yosuke Iwata, Osaka (JP); Yasuhiro Nasu, Osaka (JP); Akira Sakai, Osaka (JP); Masahiro Hasegawa, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 392 days.

(21) Appl. No.: 14/350,943

(22) PCT Filed: Oct. 11, 2012

(86) PCT No.: PCT/JP2012/076277
§ 371 (c)(1),
(2) Date: Apr. 10, 2014

(87) PCT Pub. No.: WO2013/054828
PCT Pub. Date: Apr. 18, 2013

(65) Prior Publication Data
US 2014/0253853 A1     Sep. 11, 2014

(30) Foreign Application Priority Data

Oct. 11, 2011   (JP) .................................. 2011-224336
May 29, 2012   (JP) .................................. 2012-122237

(51) Int. Cl.
*G02F 1/1337*   (2006.01)
*G02F 1/1343*   (2006.01)

(52) U.S. Cl.
CPC ....... *G02F 1/1337* (2013.01); *G02F 1/133753* (2013.01); *G02F 1/133788* (2013.01);
(Continued)

(58) Field of Classification Search
CPC .................... G02F 1/133707; G02F 1/133753; G02F 1/133788
See application file for complete search history.

(56) References Cited

U.S. PATENT DOCUMENTS 6,583,835 B1   6/2003   Yoshida et al.
6,661,488 B1   12/2003  Takeda et al.
(Continued)

FOREIGN PATENT DOCUMENTS

JP   11-242225 A    9/1999
JP   2002-357830 A  12/2002
(Continued)

OTHER PUBLICATIONS

Official Communication issued in International Patent Application No. PCT/JP2012/076277, mailed on Dec. 18, 2012.

*Primary Examiner* — Wen-Ying P Chen
(74) *Attorney, Agent, or Firm* — Keating & Bennett, LLP

(57) ABSTRACT

This liquid crystal display device (100) includes: a vertical alignment liquid crystal layer (30); first and second substrates (10, 20); first and second electrodes (11, 21) arranged on the first and second substrates to face the liquid crystal layer; and two photo-alignment films (12, 22). Each pixel region includes first and second liquid crystal domains, of which the reference alignment directions defined by the two photo-alignment films are a first direction and a second direction different from the first direction, respectively. The first electrode has a slit cut region (11R1), through which a slit (11s) has been cut to run substantially parallel to the reference alignment direction, in a part of a region allocated
(Continued)

to each of the first and second liquid crystal domains. The width (W) of the slit is set so that when the highest grayscale voltage is applied to the first electrode, an effective applied voltage decreases by at least 0.5 V and the alignment direction of liquid crystal molecules (30a) shifts with respect to the reference alignment direction by less than 45 degrees.

17 Claims, 35 Drawing Sheets

(52) U.S. Cl.
CPC .. *G02F 1/134309* (2013.01); *G02F 1/133707* (2013.01); *G02F 2001/133742* (2013.01); *G02F 2201/122* (2013.01)

(56) References Cited

U.S. PATENT DOCUMENTS

| | | | |
|---|---|---|---|
| 6,958,791 | B2 | 10/2005 | Shimoshikiryo |
| 7,034,789 | B2 | 4/2006 | Takeuchi et al. |
| 7,113,241 | B2 | 9/2006 | Hanaoka |
| 2003/0048401 | A1 | 3/2003 | Hanaoka et al. |
| 2003/0160750 | A1 | 8/2003 | Ueda et al. |
| 2006/0146243 | A1 | 7/2006 | Nakanishi et al. |
| 2007/0115409 | A1 | 5/2007 | Oka et al. |
| 2007/0120092 | A1 | 5/2007 | Kataoka |
| 2009/0002588 | A1* | 1/2009 | Lee ................ G02F 1/133707 349/42 |
| 2009/0284703 | A1 | 11/2009 | Shoraku et al. |
| 2010/0123867 | A1* | 5/2010 | Jung ............... G02F 1/133753 349/141 |
| 2010/0265448 | A1* | 10/2010 | Nakanishi ........ G02F 1/133707 349/144 |
| 2012/0154703 | A1* | 6/2012 | Yoshida ........... G02F 1/133753 349/43 |

FOREIGN PATENT DOCUMENTS

| | | |
|---|---|---|
| JP | 2003-149647 A | 5/2003 |
| JP | 2003-255305 A | 9/2003 |
| JP | 2004-062146 A | 2/2004 |
| JP | 2004-078157 A | 3/2004 |
| JP | 2006-189610 A | 7/2006 |
| JP | 2006-317866 A | 11/2006 |
| JP | 2007-140089 A | 6/2007 |
| JP | 2008-197691 A | 8/2008 |
| JP | 2009-080197 A | 4/2009 |
| JP | 2010-169814 A | 8/2010 |
| JP | 2011-085738 A | 4/2011 |
| WO | 2006/132369 A1 | 12/2006 |

* cited by examiner (a) REAR SUBSTRATE SIDE (b) FRONT SUBSTRATE SIDE (c) LIQUID CRYSTAL LAYER (a) REAR SUBSTRATE SIDE (b) FRONT SUBSTRATE SIDE (c) LIQUID CRYSTAL LAYER (a) REAR SUBSTRATE SIDE (b) FRONT SUBSTRATE SIDE (c) LIQUID CRYSTAL LAYER (a) REAR SUBSTRATE SIDE (b) FRONT SUBSTRATE SIDE (c) LIQUID CRYSTAL LAYER (a)

(b)

(a) REAR SUBSTRATE SIDE (b) FRONT SUBSTRATE SIDE (c) LIQUID CRYSTAL LAYER (a)

(b)

(c)

(a)

(b)

(c)

(a)

(b)

(c)

(a)

(b)

(a)

(b)

(c)

(a)

(b)

LIQUID CRYSTAL DISPLAY

TECHNICAL FIELD

The present invention relates to a liquid crystal display device and more particularly relates to a liquid crystal display device including a vertical alignment liquid crystal layer and having a wide viewing angle characteristic.

BACKGROUND ART

Recently, the display performances of liquid crystal display devices have been improved to the point that more and more manufacturers use them in TV receivers, for example. The viewing angle characteristic of liquid crystal display devices has been improved to a certain degree but is not satisfactorily in some respects. Among other things, there is still a high demand for improvement of the viewing angle characteristic of a liquid crystal display device that uses a vertical alignment liquid crystal layer. A liquid crystal display device with a vertical alignment liquid crystal layer is sometimes called a "VA mode liquid crystal display device".

A VA mode liquid crystal display device which is currently used for a TV set with a big screen, for example, adopts an alignment division structure in which multiple liquid crystal domains are formed in a single pixel to improve the viewing angle characteristic. An MVA (multi-domain vertical alignment) mode is often adopted as a method of forming such an alignment division structure. The MVA mode is disclosed in Patent Document No. 1, for example.

Specifically, according to the MVA mode, an alignment control structure is provided on each of the two substrates, which face each other with a vertical alignment liquid crystal layer interposed between them, so as to contact with the liquid crystal layer, thereby forming multiple liquid crystal domains with mutually different alignment directions (i.e., tilt directions), the number of which is typically four, in each pixel. As the alignment control structure, a slit (as an opening) or a rib (as a projection structure) may be provided for an electrode, thereby creating an alignment controlling force from both sides of the liquid crystal layer.

If such a slit or rib is adopted, however, the alignment controlling force will be applied onto liquid crystal molecules non-uniformly within a pixel because the slit or rib has a linear structure unlike the situation where the pretilt directions are defined by an alignment film in a conventional TN (twisted nematic) mode LCD. As a result, the response speed may have a distribution unintentionally. In addition, since the transmittance of light will decrease in the areas with the slits or ribs, the brightness of the screen will decrease, too.

To avoid such a problem, the alignment division structure is suitably formed by defining the pretilt directions with an alignment film for a VA mode liquid crystal display device, too. A VA mode liquid crystal display device, of which the alignment control structure has been formed in this manner, is proposed in Patent Document No. 2.

In the liquid crystal display device disclosed in Patent Document No. 2, a quadruple alignment division structure is formed by defining the pretilt direction with an alignment film. That is to say, when a voltage is applied to the liquid crystal layer, four liquid crystal domains are formed in a single pixel. Such a quadruple alignment division structure will be sometimes simply referred to herein as a "4D structure".

Also, in the liquid crystal display device disclosed in Patent Document No. 2, the pretilt direction defined by one of the two alignment films that face each other with the liquid crystal layer interposed between them and the pretilt direction defined by the other alignment film are different from each other by substantially 90 degrees. That is why when a voltage is applied, the liquid crystal molecules will have a twisted alignment. Such a VA mode in which the liquid crystal molecules have a twisted alignment by using two alignment films which are arranged so that their pretilt directions (alignment treatment directions) are perpendicular to each other is sometimes called either a VATN (vertical alignment twisted nematic) mode or an RTN (reverse twisted nematic) mode. As already described, the 4D structure is formed in the liquid crystal display device of Patent Document No. 2, and therefore, the display mode of the liquid crystal display device of Patent Document No. 2 is sometimes called a "4D-RTN" mode.

As for a specific method for getting the pretilt directions of the liquid crystal molecules defined by alignment films, a method that uses a photo-alignment treatment is thought to be a promising one as pointed out in Patent Document No. 2. The photo-alignment treatment contributes to increasing the yield because that treatment is a non-contact method and generates no static electricity due to friction unlike the rubbing treatment. An alignment film subjected to such a photo-alignment treatment is sometimes called a "photo-alignment film".

Also, in order to improve the responsivity of the MVA mode, so-called "PSA (polymer sustained alignment) technology" has been developed recently. The PSA technology is disclosed in Patent Documents Nos. 3 and 4. According to the PSA technology, to give a pretilt to liquid crystal molecules, a polymer layer, which is called an "alignment sustaining layer", is used. The alignment sustaining layer is formed by polymerizing a photo-polymerizable monomer, which has been added in advance to the liquid crystal material, with a voltage applied to the liquid crystal layer after a liquid crystal cell is completed. By adjusting the distribution and intensity of an electric field to be applied to polymerize the monomer, the pretilt azimuth (i.e., azimuth angle within a substrate plane) and pretilt angle (i.e., an elevation angle with respect to the substrate plane) of the liquid crystal molecules can be controlled.

Meanwhile, Patent Document No. 4 discloses a configuration in which a pixel electrode with a fine-line striped pattern (which is sometimes called a "fishbone type pixel electrode") is used in combination with the PSA technology. According to such a configuration, when a voltage is applied to the liquid crystal layer, the liquid crystal molecules will be aligned parallel to the longitudinal direction of the striped pattern, which is in sharp contrast to the conventional MVA mode disclosed in Patent Document No. 1 in which the liquid crystal molecules are aligned perpendicularly to the linear alignment control structure such as slits or ribs. The lines and spaces of the fine-line striped pattern may have a narrower width than the conventional MVA mode alignment control structure. That is why the fishbone type pixel electrode is applicable more easily to small pixels than the conventional MVA mode alignment control structure is.

According to these modified VA mode technologies (including the 4D-RTN mode, the PSA technology, and the fishbone type pixel electrode), an excellent viewing angle characteristic is realized. Recently, however, since there is a growing demand for further improvement of the viewing angle characteristic of VA mode liquid crystal display devices, a so-called "pixel division driving technique" has been incorporated into actual products one after another (see Patent Documents Nos. 5 and 6, for example).

According to the pixel division driving technique, the phenomenon that the γ (gamma) characteristic when the screen is viewed straight on is different from the γ (gamma) characteristic when the screen is viewed obliquely, i.e., the viewing angle dependence of the γ characteristic, can be significantly reduced. In this case, the γ characteristic is the grayscale dependence of the display luminance.

Also, according to the pixel division driving technique, a single pixel is comprised of a plurality of subpixels which can apply mutually different voltages to the liquid crystal layer (i.e., which can exhibit mutually different luminances), and a predetermined luminance corresponding to the display signal voltage to be input to a pixel is realized by the entire pixel. That is to say, the pixel division driving technique is a technique for reducing the viewing angle dependence of a pixel's γ characteristic by synthesizing together mutually different γ characteristics of a plurality of subpixels.

CITATION LIST

Patent Literature

Patent Document No. 1: Japanese Laid-Open Patent Publication No. 11-242225
Patent Document No. 2: PCT International Application Publication No. 2006/132369
Patent Document No. 3: Japanese Laid-Open Patent Publication No. 2002-357830
Patent Document No. 4: Japanese Laid-Open Patent Publication No. 2003-149647
Patent Document No. 5: Japanese Laid-Open Patent Publication No. 2004-62146
Patent Document No. 6: Japanese Laid-Open Patent Publication No. 2004-78157

SUMMARY OF INVENTION

Technical Problem

If the pixel division driving technique is adopted, however, different effective voltages need to be applied to the liquid crystal layer from one subpixel to another, and therefore, the circuit configuration will get too complicated as will be described later.

In a liquid crystal display device that adopts the pixel division driving technique, the pixel electrode provided for each pixel includes a plurality of subpixel electrodes associated with its subpixels, and switching elements (such as TFTs) are provided for the respective subpixel electrodes.

Patent Document No. 5 discloses a configuration in which a number of subpixel electrodes that form a single pixel are connected to mutually different signal lines. According to such a configuration, the number of signal lines required increases compared to a conventional general liquid crystal display device, and the signal line driver also needs to have a different configuration from the conventional one.

Patent Document No. 5 also discloses a configuration in which the voltage applied to the liquid crystal layer is changed on a subpixel basis by using a capacitance division technique. According to this configuration, each of those subpixels includes a storage capacitor which is comprised of a storage capacitor electrode that is electrically connected to its subpixel electrode, an insulating layer, and a storage capacitor counter electrode that faces the storage capacitor electrode with the insulating layer interposed between them.

Furthermore, according to this configuration, the storage capacitor counter electrodes of respective subpixels are electrically independent of each other. That is why by adjusting the capacitance of the storage capacitor and the magnitude of the voltage applied to the storage capacitor counter electrode (which will be referred to herein as a "storage capacitor counter voltage"), the magnitude of the voltage applied to the liquid crystal layer can be controlled on a subpixel basis.

If this configuration is adopted, there is no need to apply mutually different signal voltages to respective subpixel electrodes, and the switching elements of respective subpixels may be connected to the same signal line in common and may be supplied with the same signal voltage. That is why the number of signal lines required is the same as in a conventional liquid crystal display device, and the signal line driver may have the same configuration as its counterpart of a conventional liquid crystal display device. According to this configuration, however, an external circuit is sometimes needed to generate a storage capacitor counter voltage which is typically an oscillating voltage.

In addition, in both of the former configuration in which signal lines are provided on a subpixel basis and the latter configuration in which the capacitance division technique is used, the viewing angle dependence of the γ characteristic can be reduced more effectively if the area ratio of multiple subpixels is uneven (i.e., if the area ratio of subpixels which apply a relatively high voltage to the liquid crystal layer is the smaller) than in a situation where their area ratio is even. Nevertheless, the optical transmittance in white display mode becomes maximum when the area ratio of multiple subpixels is even and decreases as the area ratio becomes uneven. The reason is that as the area ratio becomes uneven, any of the multiple subpixels comes to have a decreased area, and therefore, the intended division alignment state cannot be achieved anymore. On top of that, this phenomenon is remarkable particularly in a liquid crystal display device with a small pixel area (i.e., in a high definition liquid crystal display device). That is why according to the pixel division driving technique, the effect of reducing the viewing angle dependence of the γ characteristic becomes only a limited one, considering the optical transmittance in the white display mode. Furthermore, since the transmittance is particularly important for a high-definition liquid crystal display device, it is difficult to apply the pixel division driving technique to such a type of device in the first place, because the transmittance would decrease for the reasons described above and the aperture ratio would decrease due to the presence of an additional structure (such as the second TFT) if such a technique was adopted.

The present inventors perfected our invention in order to overcome these problems by reducing the viewing angle dependence of the γ characteristic of a VA mode liquid crystal display device sufficiently using a relatively simple circuit configuration.

Solution to Problem

A liquid crystal display device according to an embodiment of the present invention includes: a vertical alignment liquid crystal layer; first and second substrates which face each other with the liquid crystal layer interposed between them; first and second electrodes which are arranged on the first and second substrates, respectively, to face the liquid crystal layer; two photo-alignment films which are arranged between the first electrode and the liquid crystal layer and between the second electrode and the liquid crystal layer, respectively; and a plurality of pixel regions which are arranged in a matrix pattern. Each of the plurality of pixel regions includes a first liquid crystal domain, of which the reference alignment direction defined by the two photo-alignment films is a first direction, and a second liquid crystal domain, of which the reference alignment direction is a second direction that is different from the first direction. The first electrode has a slit cut region, through which a slit has been cut so as to run substantially parallel to the reference alignment direction defined by the two photo-alignment films, in a part of a region which is allocated to each of the first and second liquid crystal domains. And the width of the slit is set so that when the highest grayscale voltage is applied to the first electrode, an effective voltage applied to the liquid crystal layer over the slit decreases by at least 0.5 V and the alignment direction of liquid crystal molecules in the liquid crystal layer over the slit shifts with respect to the reference alignment direction by less than 45 degrees.

In one embodiment, the width of the slit is set so that when the highest grayscale voltage is applied to the first electrode, an effective voltage applied to the liquid crystal layer over the slit decreases by 1.0 V or more.

In one embodiment, the width of the slit is set so that when the highest grayscale voltage is applied to the first electrode, the alignment direction of liquid crystal molecules in the liquid crystal layer over the slit shifts with respect to the reference alignment direction by 30 degrees or less.

In one embodiment, the width of the slit is equal to or greater than 2.5 µm.

In one embodiment, the width of the slit is equal to or greater than 4.0 µm.

In one embodiment, the width of the slit is less than 8.0 µm.

In one embodiment, the width of the slit is equal to or smaller than 6.0 µm.

In one embodiment, the first substrate further includes a third electrode which is arranged under the first electrode with a dielectric layer interposed between them.

In one embodiment, the third electrode is supplied with substantially the same voltage as the voltage applied to the second electrode.

In one embodiment, the width of the slit is equal to or greater than 1.0 µm.

In one embodiment, the width of the slit is equal to or greater than 2.0 µm.

In one embodiment, the width of the slit is less than 6.0 µm.

In one embodiment, the width of the slit is equal to or smaller than 4.5 µm.

In one embodiment, the slit cut region accounts for one third or more of each of two regions of the first electrode that are allocated to the first and second liquid crystal domains, respectively.

In one embodiment, the slit cut region accounts for two thirds or more of each of two regions of the first electrode that are allocated to the first and second liquid crystal domains, respectively.

In one embodiment, a plurality of the slits have been cut through the slit cut region and have substantially the same width.

In one embodiment, a plurality of the slits have been cut through the slit cut region, and include a slit with a first width and a slit with a second width which is different from the first width.

In one embodiment, when viewed along a normal to a display screen, the slit is entirely surrounded with a conductive film of the first electrode.

In one embodiment, when viewed along a normal to a display screen, the slit is not entirely surrounded with a conductive film of the first electrode.

In one embodiment, the first electrode has a slit uncut region, through which no slits have been cut, in another part of the region that is allocated to each of the first and second liquid crystal domains.

In one embodiment, the first electrode has an additional slit cut region, through which an additional slit with a different width from the slit of the slit cut region has been cut, in another part of the region which is allocated to each of the first and second liquid crystal domains.

In one embodiment, the first substrate is an active-matrix substrate, and the first electrode is a pixel electrode.

In one embodiment, the pixel electrode includes a plurality of subpixel electrodes, each of the plurality of pixel regions includes a plurality of subpixel regions which are associated with the plurality of subpixel electrodes, and each of the subpixel regions has the first and second liquid crystal domains.

In one embodiment, each of the plurality of pixel regions further has third and fourth liquid crystal domains, of which the reference alignment directions are third and fourth directions, respectively. The first, second, third and fourth directions are four directions which are defined so that an angle formed between any two of the four directions is approximately equal to an integral multiple of 90 degrees. And the first electrode also has the slit cut region in a part of the region which is allocated to each of the third and fourth liquid crystal domains.

In one embodiment, the first, second, third and fourth liquid crystal domains are arranged in two columns and two rows to form a matrix pattern so that each of these liquid crystal domains is adjacent to the other liquid crystal domains.

In one embodiment, the first, second, third and fourth liquid crystal domains are arranged so that their reference alignment directions are different from each other by approximately 90 degrees between any two adjacent ones of the liquid crystal domains.

In one embodiment, a portion of edges of the first electrode which is located close to the first liquid crystal domain includes no edge portion in which an azimuthal direction that is perpendicular to the portion and that points toward the inside of the first electrode defines an angle greater than 90 degrees with respect to the first direction. A portion of the edges of the first electrode which is located close to the second liquid crystal domain includes no edge portion in which an azimuthal direction that is perpendicular to the portion and that points toward the inside of the first electrode defines an angle greater than 90 degrees with respect to the second direction. A portion of the edges of the first electrode which is located close to the third liquid crystal domain includes no edge portion in which an azimuthal direction that is perpendicular to the portion and that points toward the inside of the first electrode defines an angle greater than 90 degrees with respect to the third direction. And a portion of the edges of the first electrode which is located close to the fourth liquid crystal domain includes no edge portion in which an azimuthal direction that is perpendicular to the portion and that points toward the inside of the first electrode defines an angle greater than 90 degrees with respect to the fourth direction.

In one embodiment, the first direction defines an angle of approximately 45 degrees with respect to the azimuthal direction which is perpendicular to the portion of the edges of the first electrode that is located close to the first liquid crystal domain and which points toward the inside of the first electrode. The second direction defines an angle of approximately 45 degrees with respect to the azimuthal direction which is perpendicular to the portion of the edges of the first electrode that is located close to the second liquid crystal domain and which points toward the inside of the first electrode. The third direction defines an angle of approximately 45 degrees with respect to the azimuthal direction which is perpendicular to the portion of the edges of the first electrode that is located close to the third liquid crystal domain and which points toward the inside of the first electrode. And the fourth direction defines an angle of approximately 45 degrees with respect to the azimuthal direction which is perpendicular to the portion of the edges of the first electrode that is located close to the fourth liquid crystal domain and which points toward the inside of the first electrode.

In one embodiment, a portion of edges of the first electrode which is located close to the first liquid crystal domain includes a first edge portion in which an azimuthal direction that is perpendicular to the portion and that points toward the inside of the first electrode defines an angle greater than 90 degrees with respect to the first direction. A portion of the edges of the first electrode which is located close to the second liquid crystal domain includes a second edge portion in which an azimuthal direction that is perpendicular to the portion and that points toward the inside of the first electrode defines an angle greater than 90 degrees with respect to the second direction. A portion of the edges of the first electrode which is located close to the third liquid crystal domain includes a third edge portion in which an azimuthal direction that is perpendicular to the portion and that points toward the inside of the first electrode defines an angle greater than 90 degrees with respect to the third direction. And a portion of the edges of the first electrode which is located close to the fourth liquid crystal domain includes a fourth edge portion in which an azimuthal direction that is perpendicular to the portion and that points toward the inside of the first electrode defines an angle greater than 90 degrees with respect to the fourth direction.

In one embodiment, the first direction defines an angle of approximately 135 degrees with respect to the azimuthal direction which is perpendicular to the first edge portion and which points toward the inside of the first electrode. The second direction defines an angle of approximately 135 degrees with respect to the azimuthal direction which is perpendicular to the second edge portion and which points toward the inside of the first electrode. The third direction defines an angle of approximately 135 degrees with respect to the azimuthal direction which is perpendicular to the third edge portion and which points toward the inside of the first electrode. And the fourth direction defines an angle of approximately 135 degrees with respect to the azimuthal direction which is perpendicular to the fourth edge portion and which points toward the inside of the first electrode.

In one embodiment, if a horizontal direction on a display screen has an azimuth angle of 0 degrees, the first direction is about 45 degrees, about 135 degrees, about 225 degrees or about 315 degrees.

In one embodiment, the liquid crystal display device further includes a pair of polarizers which face each other with the liquid crystal layer interposed between themselves and which are arranged so that their transmission axes intersect with each other at substantially right angles. The first and second directions define an angle of approximately 45 degrees with respect to the transmission axes of the pair of polarizers.

In one embodiment, the liquid crystal layer has liquid crystal molecules with negative dielectric anisotropy, and the pretilt directions defined by one and the other of the two photo-alignment films are different from each other by approximately 90 degrees.

In one embodiment, the pretilt angles defined by one and the other of the two photo-alignment films are substantially equal to each other.

Advantageous Effects of Invention

According to an embodiment of the present invention, the viewing angle dependence of the γ characteristic of a VA mode liquid crystal display device can be reduced sufficiently using a relatively simple circuit configuration.

DESCRIPTION OF EMBODIMENTS

Figure 1:
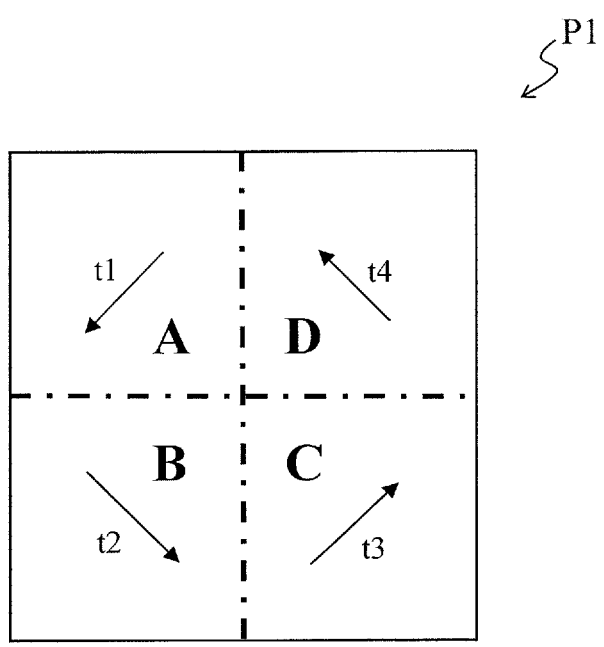
FIG. 1 Illustrates an exemplary pixel region with an alignment division structure for a VA mode liquid crystal display device.

Hereinafter, embodiments of the present invention will be described with reference to the accompanying drawings. It should be noted that the present invention is in no way limited to the embodiments to be described below.

(Definition of Terms)

First of all, some major terms to be used in this description will be defined.

In this description, the "vertical alignment liquid crystal layer" means a liquid crystal layer in which liquid crystal molecules define a tilt angle of approximately 85 degrees or more with respect to the surface of a vertical alignment film. The liquid crystal material that makes the vertical alignment liquid crystal layer has negative dielectric anisotropy. By combining the vertical alignment liquid crystal layer with a pair of polarizers that are arranged as crossed Nicols so as to face each other with the liquid crystal layer interposed between them (i.e., arranged so that their transmission axes intersect with each other at substantially right angles), a display operation is conducted in normally black mode.

In this description, a "pixel" refers herein to a minimum unit representing a particular gray scale tone on the display screen, and corresponds to a unit representing each gray scale tone of R, G and B in color display and is also called a "dot". A combination of R, G and B pixels forms a single color display pixel. A "pixel region" refers herein to a region of a liquid crystal display device which is allocated to a single "pixel" on the display screen.

A "pretilt direction" is the orientation direction of liquid crystal molecules to be controlled with an alignment film and refers herein to an azimuthal direction on a display screen. Also, the angle formed by liquid crystal molecules with respect to the surface of the alignment film in this case will be referred to herein as a "pretilt angle". A pretilt direction of liquid crystal molecules is given to an alignment film suitably by the photo-alignment treatment to be described later.

By changing combinations of the pretilt directions which are defined by one and the other of the two alignment films that face each other with the liquid crystal layer interposed between them within a pixel region, a quadruple alignment division structure can be formed. The pixel region that has been divided into four has four liquid crystal domains. Alternatively, a double divided alignment structure may also be formed. In that case, the pixel region that has been divided into two has two liquid crystal domains.

Each of these liquid crystal domains is characterized by the tilt direction of liquid crystal molecules at the center of a plane of the liquid crystal layer, to which a voltage is being applied, and at the middle of the thickness of the liquid crystal layer. Such a tilt direction will be sometimes referred to herein as a "reference alignment direction". And this tilt direction (or reference alignment direction) will have a decisive effect on the viewing angle dependence of each domain. This tilt direction is also an azimuthal direction. The reference azimuthal direction is supposed to be the horizontal direction on the display screen and the azimuth angle is supposed to increase counterclockwise. For example, comparing the display screen to a clock face, the three o'clock direction is supposed to have an azimuth angle of zero degrees and the angle is supposed to increase counterclockwise. As for the quadruple alignment division structure, by defining four directions so that an angle formed between any two of the four directions is approximately equal to an integral multiple of 90 degrees (e.g., as the twelve o'clock direction, the nine o'clock direction, the six o'clock direction and the three o'clock direction, respectively), highly uniform viewing angle characteristic and good display quality are realized. To increase the uniformity of the viewing angle characteristic, the areas of those four liquid crystal domains in each pixel region are suitably substantially equal to each other. Specifically, the difference in area between the largest and smallest ones of the four liquid crystal domains is suitably equal to or smaller than 25% of the largest area. On the other hand, as for the double alignment division structure, if the angle formed between the respective tilt directions of the two liquid crystal domains is substantially 180 degrees, highly uniform viewing angle characteristic and good display quality are realized.

The vertical alignment liquid crystal layer of the embodiment to be described below includes liquid crystal molecules with negative dielectric anisotropy (i.e., a nematic liquid crystal material with negative dielectric anisotropy). The pretilt direction defined by one of the two alignment films is different by approximately 90 degrees from the one defined by the other. The tilt direction (i.e., the reference alignment direction) is defined as an intermediate direction between these two pretilt directions. And when a voltage is applied to the liquid crystal layer, the liquid crystal molecules located near the alignment films will have a twisted alignment under the alignment controlling force of the alignment films. By using such a pair of vertical alignment films defining two pretilt directions (alignment treatment directions) that are perpendicular to each other, the VA mode in which the liquid crystal molecules have a twisted alignment is sometimes called a VAIN mode as described above.

In the VAIN mode, the pretilt angles defined by the two alignment films are suitably substantially equal to each other. If the pretilt angles are approximately equal to each other, the display luminance characteristic can be improved, which is advantageous. Particularly when the difference between the pretilt angles is within one degree, the tilt direction (i.e., the reference alignment direction) of liquid crystal molecules, located approximately at the middle of the thickness of the liquid crystal layer, can be controlled with good stability, and the display luminance characteristic can be improved. This is probably because if the difference between the pretilt angles were more than one degree, then some area would have a higher transmittance than the intended one and the contrast ratio would decrease.

According to known methods, a pretilt direction may be given to an alignment film by subjecting the alignment film to a rubbing treatment or a photo-alignment treatment, by forming a microstructure on an undercoat film for each alignment film and transferring the pattern of the microstructure onto the surface of the alignment film, or by evaporating obliquely an inorganic material such as SiO on an alignment film to define a microstructure thereon. Considering its mass productivity, either the rubbing treatment or the photo-alignment treatment is preferred. Among other things, the photo-alignment treatment is particularly preferred to increase the yield because that treatment is a non-contact method and generates no static electricity due to friction unlike the rubbing treatment. Also, by using a photo-alignment film including a photosensitive group, the variation in pretilt angle can be reduced to one degree or less. The photo-alignment film suitably includes at least one photosensitive group selected from the group consisting of a 4-chalcone group, a 4'-chalcone group, a coumarin group, and a cinnamoyl group.

(Alignment Division by Photo-alignment Films)

Hereinafter, it will be described how to carry out the alignment division using photo-alignment films.

First of all, a pixel region P1 with a quadruple alignment division structure shown in FIG. 1 will be described. FIG. 1 illustrates a substantially square pixel region P1 provided for a substantially square pixel electrode for the sake of simplicity. However, the present invention is in no way limited to any particular shape of a pixel region. For example, the pixel region P1 may also have a substantially rectangular shape.

The pixel region P1 includes four liquid crystal domains A, B, C and D, of which the tilt directions (i.e., reference alignment directions) are identified by t1, t2, t3 and t4, respectively. These four tilt directions are defined so that an angle formed between any two of the four directions is approximately equal to an integral multiple of 90 degrees. What is illustrated in FIG. 1 is an ideal quadruple structure to achieve the best viewing angle characteristic, because the areas of these liquid crystal domains A, B, C and D are equal to each other. The four liquid crystal domains A, B, C and D are arranged in two columns and two rows to define a matrix pattern.

It should be noted that in this case, the two polarizers that face each other with the liquid crystal layer interposed between them are arranged so that their transmission axes (polarization axes) intersect with each other at substantially right angles. More specifically, those polarizers are arranged so that one of the two transmission axes is substantially parallel to the horizontal direction on the display screen and that the other transmission axis is substantially parallel to the vertical direction on the display screen. In the following description, the transmission axes of the polarizers are supposed to be arranged in this manner, unless otherwise stated.

If the horizontal direction on the display screen (i.e., the three o'clock direction) has an azimuthal angle of zero degrees, the tilt directions t1, t2, t3 and t4 are an approximately 225 degree direction (liquid crystal domain A), an approximately 315 degree direction (liquid crystal domain B), an approximately 45 degree direction (liquid crystal domain C) and an approximately 135 degree direction (liquid crystal domain D), respectively. That is to say, these liquid crystal domains A, B, C and D are arranged so that the tilt directions of any two adjacent ones of the liquid crystal domains define an angle of approximately 90 degrees between them.

FIGS. 2(a), 2(b) and 2(c) show a method of dividing the pixel region P1 shown in FIG. 1. FIG. 2(a) shows the pretilt directions PA1 and PA2 defined by the photo-alignment film provided for the rear substrate (as the lower substrate). FIG. 2(b) shows the pretilt directions PB1 and PB2 defined by the photo-alignment film provided for the front substrate (as the upper substrate). And FIG. 2(c) shows the tilt directions when a voltage is applied to the liquid crystal layer. These drawings schematically indicate the orientation directions of liquid crystal molecules as viewed from the viewer and show that the liquid crystal molecules are tilted so that the elliptical end of each circular cylindrical liquid crystal molecule points toward the viewer.

As shown in FIG. 2(a), the alignment treatment is conducted so as to horizontally divide the region close to the rear substrate (i.e., a region corresponding to a single pixel region P1) into two and to give pretilt directions PA1 and PA2 which are antiparallel to the vertical alignment film to those left and right regions, respectively. In this embodiment, a photo-alignment treatment is carried out by irradiating the liquid crystal layer with an ultraviolet ray obliquely that has come from the direction pointed by the arrows.

As shown in FIG. 2(b), the alignment treatment is also conducted so as to vertically divide the region close to the front substrate (i.e., a region corresponding to a single pixel region P1) into two and to give pretilt directions PB1 and PB2 which are antiparallel to the vertical alignment film to those upper and lower regions, respectively. In this embodiment, a photo-alignment treatment is carried out by irradiating the liquid crystal layer with an ultraviolet ray obliquely that has come from the direction pointed by the arrows.

By bonding together the rear and front substrates that have been subjected to the alignment treatment as shown in FIGS. 2(a) and 2(b), an alignment divided pixel region P1 can be defined as shown in FIG. 2(c). As can be seen from FIG. 2(c), in each of the liquid crystal domains A through D, the respective pretilt directions defined by the photo-alignment films on the rear and front substrates are different from each other by approximately 90 degrees, and a tilt direction (reference alignment direction) is defined as an intermediate direction between these two pretilt directions.

Figure 2:
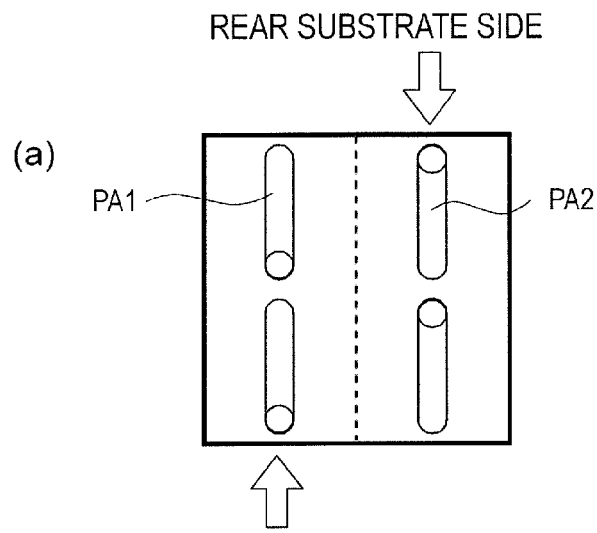
FIG. 2 Shows a method of dividing the pixel region shown in FIG. 1, wherein (a) shows the pretilt directions on a rear substrate side, (b) shows the pretilt directions on a front substrate side, and (c) shows the tilt directions when a voltage is applied to the liquid crystal layer.
Figure 2:
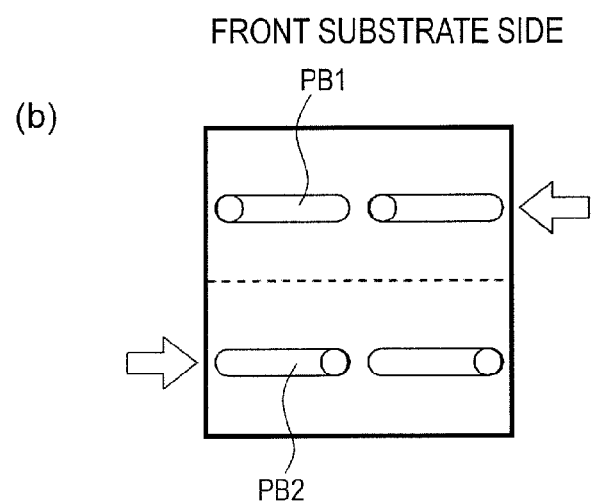
Figure 2:
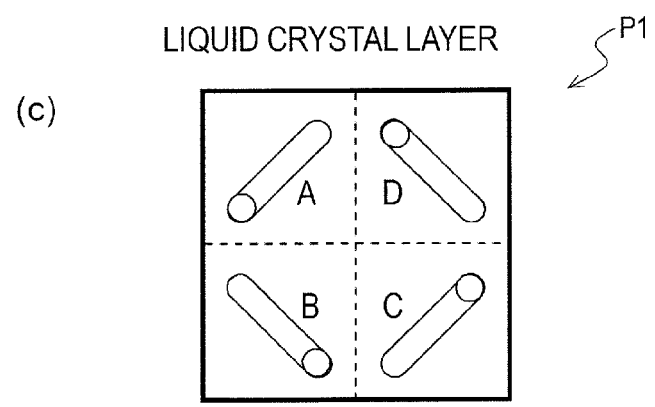

It should be noted that the alignment division method for dividing a single pixel region into four liquid crystal domains A through D (i.e., the arrangement of the liquid crystal domains A through D in the pixel region) shown in FIG. 2 is only an example and does not have to be adopted.

Figure 3:
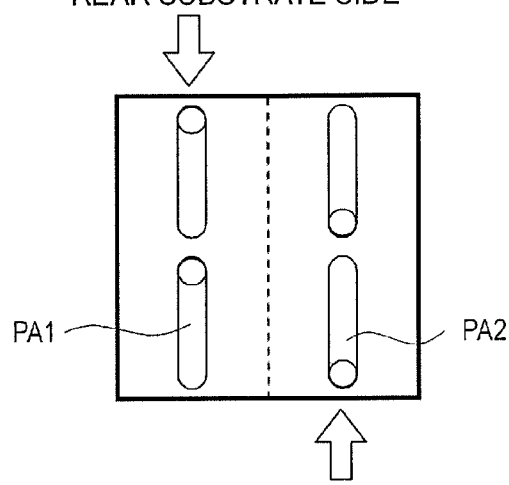
FIG. 3 Shows another method of dividing the pixel region, wherein (a) shows the pretilt directions on a rear substrate side, (b) shows the pretilt directions on a front substrate side, and (c) shows the tilt directions when a voltage is applied to the liquid crystal layer.
Figure 3:
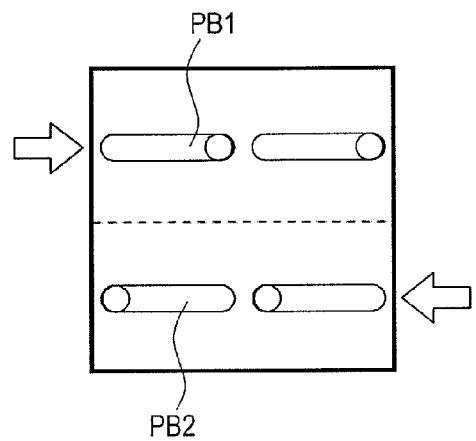
Figure 3:
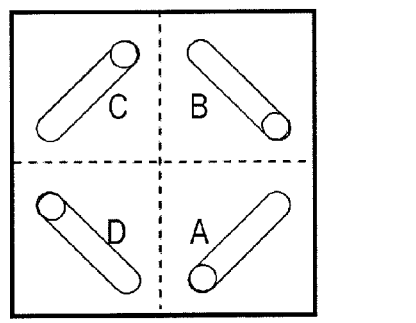

For example, by bonding together the rear and front substrates that have been subjected to the alignment treatment as shown in FIGS. 3(a) and 3(b), an alignment divided pixel region P2 can be defined as shown in FIG. 3(c). Just like the pixel region P1, this pixel region P2 also includes four liquid crystal domains A, B, C and D. The tilt directions of the liquid crystal domains A through D are the same as those of the liquid crystal domains A through D of the pixel region P1.

Nevertheless, even though the liquid crystal domains A through D of the pixel region P1 are respectively arranged as its upper left, lower left, lower right and upper right parts (i.e., arranged counterclockwise from the upper left part), the liquid crystal domains A through D of the pixel region P2 are respectively arranged as its lower right, upper right, upper left and lower left parts (i.e., arranged counterclockwise from the lower right part). The reason is that the pretilt directions of the pixel regions P1 and P2 are opposite to each other in each of the left and right regions of the rear substrate and in each of the upper and lower regions of the front substrate.

Figure 4:
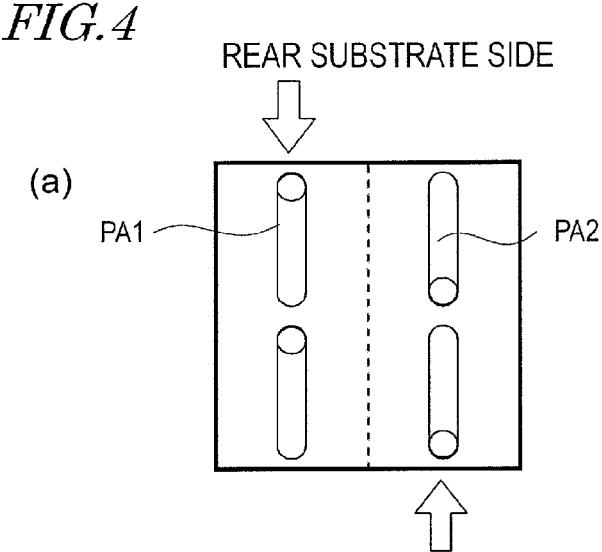
FIG. 4 Shows still another method of dividing the pixel region, wherein (a) shows the pretilt directions on a rear substrate side, (b) shows the pretilt directions on a front substrate side, and (c) shows the tilt directions when a voltage is applied to the liquid crystal layer.
Figure 4:
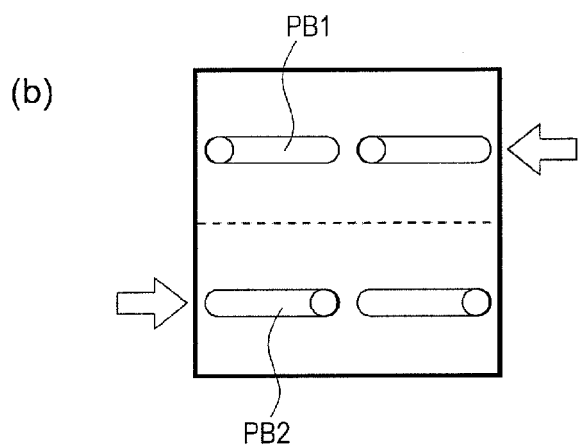
Figure 4:
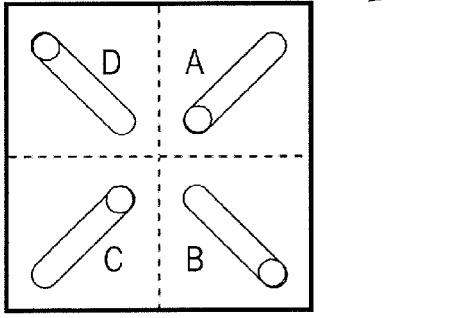

Alternatively, by bonding together the rear and front substrates that have been subjected to the alignment treatment as shown in FIGS. 4(a) and 4(b), an alignment divided pixel region P3 can be defined as shown in FIG. 4(c). Just like the pixel region P1, this pixel region P3 also includes four liquid crystal domains A, B, C and D. The tilt directions of the liquid crystal domains A through D are the same as those of the liquid crystal domains A through D of the pixel region P1.

Nevertheless, the liquid crystal domains A through D of the pixel region P3 are respectively arranged as its upper right, lower right, lower left and upper left parts (i.e., arranged clockwise from the upper right part). The reason is that the pretilt directions of the pixel regions P1 and P3 are opposite to each other in each of the left and right regions of the rear substrate.

Figure 5:
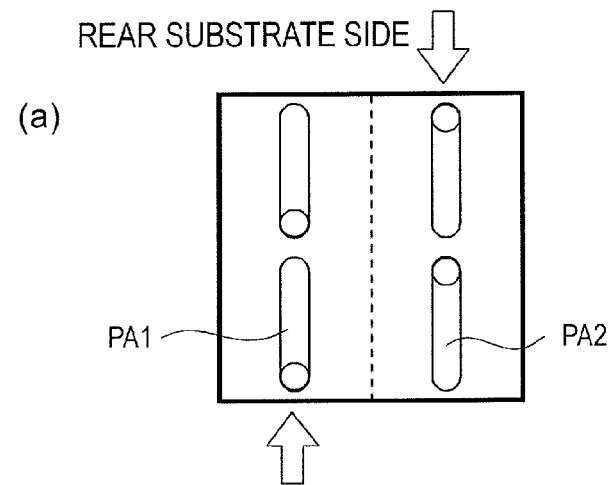
FIG. 5 Shows yet another method of dividing the pixel region, wherein (a) shows the pretilt directions on a rear substrate side, (b) shows the pretilt directions on a front substrate side, and (c) shows the tilt directions when a voltage is applied to the liquid crystal layer.
Figure 5:
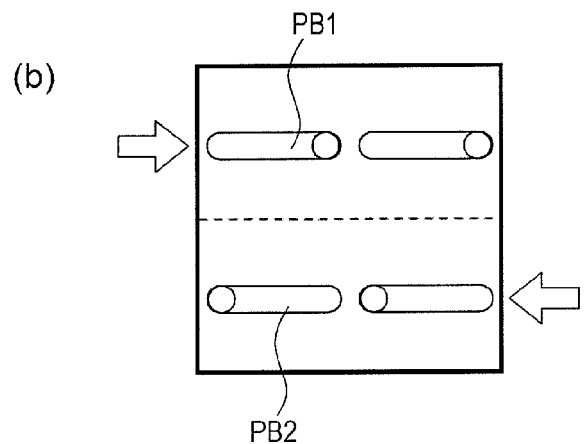
Figure 5:
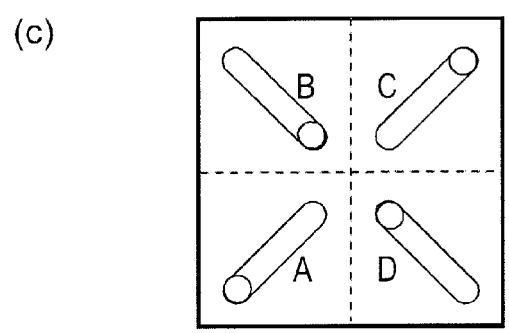

Alternatively, by bonding together the rear and front substrates that have been subjected to the alignment treatment as shown in FIGS. 5(a) and 5(b), an alignment divided pixel region P4 can be defined as shown in FIG. 5(c). Just like the pixel region P1, this pixel region P4 also includes four liquid crystal domains A, B, C and D. The tilt directions of the liquid crystal domains A through D are the same as those of the liquid crystal domains A through D of the pixel region P1.

Nevertheless, the liquid crystal domains A through D of the pixel region P4 are respectively arranged as its lower left, upper left, upper right, and lower right parts (i.e., arranged clockwise from the lower left part). The reason is that the pretilt directions of the pixel regions P1 and P4 are opposite to each other in each of the upper and lower regions of the front substrate.

Next, preferred embodiments of the present invention will be described specifically.

(Embodiment 1)

Figure 6:
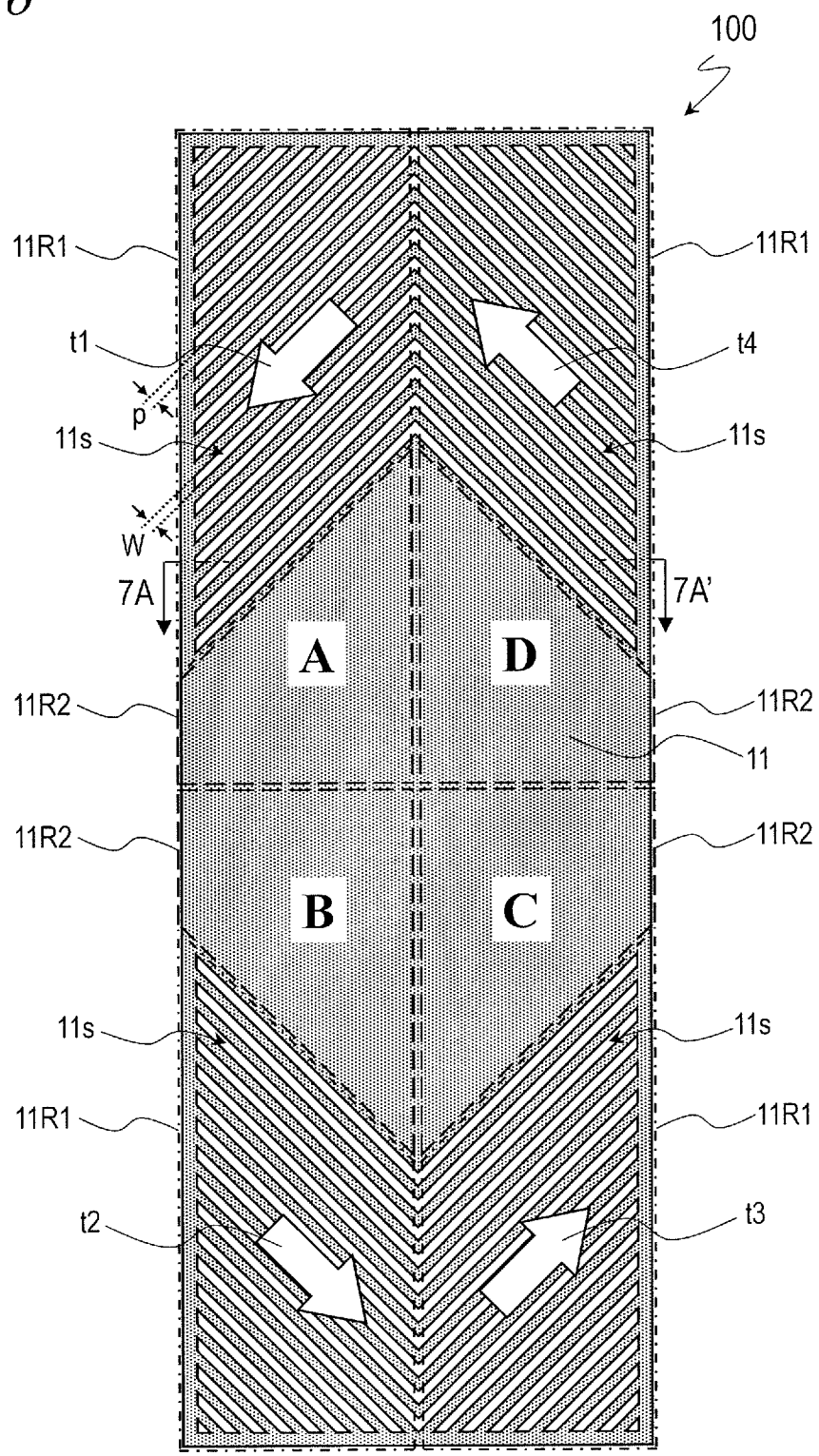
FIG. 6 A plan view schematically illustrating a single pixel region of a liquid crystal display device 100 according to an embodiment of the present invention.
Figure 7:
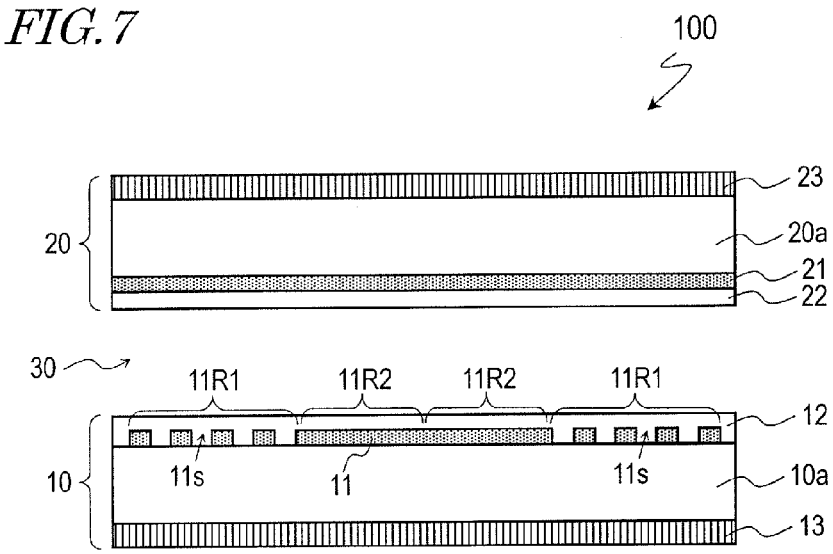
FIG. 7 A cross-sectional view schematically illustrating the liquid crystal display device 100 according to the embodiment of the present invention as viewed on the plane 7A-7A' shown in FIG. 6.

FIGS. 6 and 7 illustrate a liquid crystal display device 100 as a first embodiment of the present invention. The liquid crystal display device 100 includes a plurality of pixel regions which are arranged in a matrix pattern. FIG. 6 is a plan view schematically illustrating one of those multiple pixel regions of the liquid crystal display device 100, and FIG. 7 is a cross-sectional view of the device as viewed on the plane 7A-7A' shown in FIG. 6.

As shown in FIG. 7, this liquid crystal display device 100 includes a liquid crystal layer 30 and an active-matrix substrate 10 and a counter substrate 20 which face each other with the liquid crystal layer 30 interposed between them. The liquid crystal display device 100 further includes pixel electrodes 11, a counter electrode 21, and two photo-alignment films 12 and 22.

The liquid crystal layer 30 is a vertical alignment liquid crystal layer and includes liquid crystal molecules (not shown in FIG. 7) with negative dielectric anisotropy.

The active-matrix substrate 10 includes a transparent insulating substrate (such as a glass substrate) 10a and switching elements (not shown in FIG. 7) provided for respective pixel regions. A thin-film transistor (TFT) is typically used as the switching element. If the switching element is a TFT, the active-matrix substrate 10 further includes scan lines to supply scan signals to the TFTs and signal lines to supply video signals (grayscale voltages) to the TFTs. Also, if a storage capacitor is provided, the active-matrix substrate 10 further includes two electrodes to form the storage capacitor and a storage capacitor line which applies a predetermined voltage (i.e., the CS voltage to be described later) to one of those two electrodes.

The counter substrate 20 includes a transparent insulating substrate (such as a glass substrate) 20a and typically further includes a color filter layer (not shown). That is why the counter substrate 20 is sometimes called a "color filter substrate".

The pixel electrodes 11 are provided on the active-matrix substrate 10 to face the liquid crystal layer 30. The pixel electrodes 11 are arranged in the respective pixel regions and electrically connected to the switching elements described above. The pixel electrodes 11 may be made of a transparent conductive material (such as ITO).

The counter electrode 21 is provided on the counter substrate 20 to face the liquid crystal layer 30. Typically, the counter electrode 21 is a single electrode to be shared by those multiple pixel electrodes 11 in common (and therefore, is sometimes called a "common electrode"). The counter electrode 21 may be made of a transparent conductive material (such as ITO).

One of the two photo-alignment films 12 and 22 (which will be referred to herein as a "first photo-alignment film 12") is provided between the pixel electrodes 11 and the liquid crystal layer 30, while the other photo-alignment film (which will be referred to herein as a "second photo-alignment film 22") is provided between the counter electrode 21 and the liquid crystal layer 30.

The liquid crystal display device 100 further includes two polarizers 13 and 23 which are arranged so as to face each other with the liquid crystal layer 3 interposed between them. These two polarizers 13 and 23 are arranged so that their transmission axes (polarization axes) intersect with each other at substantially right angles.

As shown in FIG. 6, each pixel region of the liquid crystal display device 100 is subjected to the alignment division just like the pixel region P1 shown in FIGS. 1 and 2(c). That is to say, each pixel region of the liquid crystal display device 100 has four liquid crystal domains A, B, C and D, of which the tilt directions t1, t2, t3 and t4 when a voltage is applied to between the pixel electrodes 11 and the counter electrode 21 are approximately 225, 315, 45 and 135 degree directions, respectively. The respective tilt directions (reference alignment directions) of these liquid crystal domains A, B, C and D are defined by the two photo-alignment films 12 and 22. Since one of the two polarizers 13 and 23 which are arranged so that their transmission axes intersect with each other at right angles has a transmission axis that is substantially parallel to the horizontal direction on the display screen and the other polarizer 13 has a transmission axis that is substantially parallel to the vertical direction on the display screen, the respective reference alignment directions of the liquid crystal domains A, B, C and D define an angle of approximately 45 degrees with respect to the transmission axes of the polarizers 13 and 23.

If attention is paid to corresponding regions of these liquid crystal domains A, B, C and D, it can be seen that the pretilt directions defined by the first and second photo-alignment films 12 and 22 are different from each other by approximately 90 degrees. As described above, the pretilt angles defined by the first and second photo-alignment films 12 and 22 are suitably substantially equal to each other.

In the liquid crystal display device 100 of this embodiment, each of the pixel electrodes 11 has slit cut regions 11R1 (which are rectangular trapezoidal areas surrounded with the one-dot chains in FIG. 6) in respective portions of the regions allocated to the liquid crystal domains A, B, C and D. Through each of these slit cut regions 11R1, a number of slits 11s have been cut. In other words, the conductive film has been removed from some portions of the slit cut region 11R1.

Those slits 11s run substantially parallel to the reference alignment directions (which are defined by the two photo-alignment films 12 and 22 as described above). Specifically, the slits 11s which have been cut through the slit cut region 11R1 that is allocated to the liquid crystal domain A run substantially parallel to the reference alignment direction t1 (which is approximately a 225 degree direction). The slits 11s which have been cut through the slit cut region 11R1 allocated to the liquid crystal domain B run substantially parallel to the reference alignment direction t2 (which is approximately a 315 degree direction). The slits 11s which have been cut through the slit cut region 11R1 allocated to the liquid crystal domain C run substantially parallel to the reference alignment direction t3 (which is approximately a 45 degree direction). And the slits 11s which have been cut through the slit cut region 11R1 allocated to the liquid crystal domain D run substantially parallel to the reference alignment direction t4 (which is approximately a 135 degree direction). In this embodiment, those slits 11s have substantially the same width within each slit cut region 11R1.

Also, each pixel electrode 11 further has slit uncut regions (solid regions) 11R2 (which are rectangular trapezoidal areas surrounded with the long dashed lines in FIG. 6) in respective other portions of the regions allocated to the liquid crystal domains A, B, C and D. No slits have been cut through any of the slit uncut regions 11R2. In other words, the conductive film has been removed from substantially no portions of the slit uncut region 11R2.

As described above, in the liquid crystal display device 100 of this embodiment, the two photo-alignment films 12 and 22 define the reference alignment directions (tilt directions) of the liquid crystal domain A, B, C and D. That is to say, the alignment division of the pixel region is caused entirely by the first and second photo-alignment films 12 and 22.

Also, the slits 11s that have been cut through the pixel electrode 11 decrease the effective voltage applied to the liquid crystal layer 30 over the slits 11s themselves. Since the slit cut region 11R1 forms just a part of the region allocated to each of the liquid crystal domains A, B, C and D, there are two regions in which mutually different voltages are applied to the liquid crystal layer 30 (namely, the slit cut region 11R1 in which a relatively low voltage is applied thereto and the slit uncut region 11R2 in which a relatively high voltage is applied thereto) in each liquid crystal domain. As a result, the viewing angle dependence of the γ characteristic can be reduced.

In a single pixel region, a part corresponding to the combination of these four slit cut regions 11R1 functions as a relatively dark subpixel (which will be referred to herein as a "dark subpixel"), while a part corresponding to the combination of these four slit uncut regions 11R2 functions as a relatively bright subpixel (which will be referred to herein as a "bright subpixel"). In this embodiment, in the regions of the pixel electrode 11 allocated to the liquid crystal domains A and D, the slit cut regions 11R1 form a relatively upper part and the slit uncut regions 11R2 form a relatively lower part. On the other hand, in the regions of the pixel electrode 11 allocated to the liquid crystal domains B and C, the slit cut regions 11R1 form a relatively lower part and the slit uncut regions 11R2 form a relatively upper part. That is why in this embodiment, the bright subpixel is located at the center of a pixel, one half of the dark subpixel is located in the upper part of the pixel, and the other half of the dark subpixel is located in the lower part of the pixel.

The magnitude of a decrease in the effective voltage applied to the liquid crystal layer 30 over the slits 11s depends on the width W of the slits 11s. Specifically, the broader the width W of the slits 11s, the more significantly the applied voltage decreases. Conversely, the narrower the width W of the slits 11s, the less significantly the applied voltage decreases.

In the liquid crystal display device 100 of this embodiment, the width W of the slits 11s is set so that when the highest grayscale voltage is applied to the pixel electrode 11, the effective voltage applied to the liquid crystal layer 30 over the slits 11s will decrease by at least 0.5 V. By setting the width W of the slits 11s in this manner, the difference in the effective voltage applied to the liquid crystal layer 30 can be sufficiently increased between the slit cut region 11R1 and the slit uncut region 11R2. As a result, the viewing angle dependence of the γ characteristic can be reduced sufficiently effectively.

Figure 8:
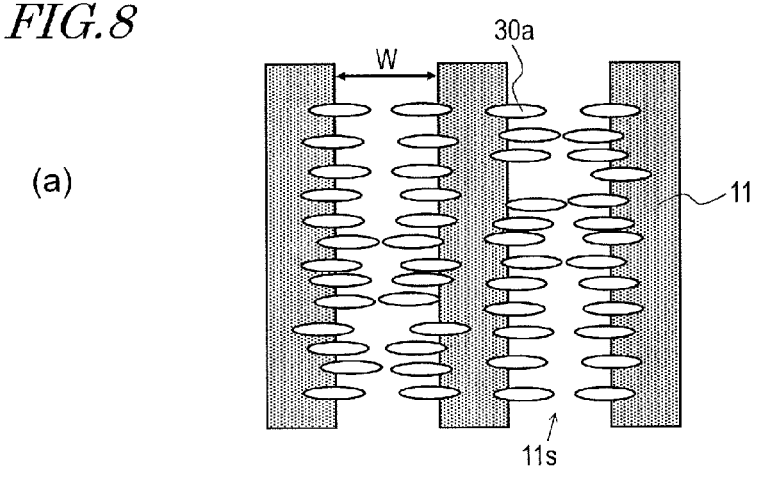
FIG. 8 (a) and (b) are respectively a top view and a cross-sectional view schematically illustrating how the liquid crystal molecules would be aligned under the application of a voltage if the width of slits were broadened extremely.
Figure 8:
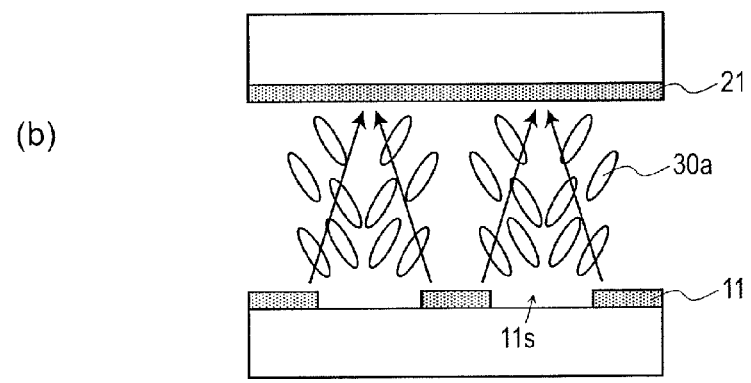
Figure 9:
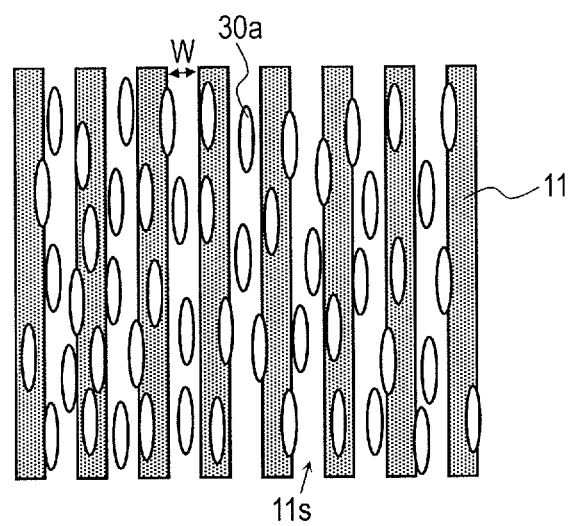
FIG. 9 (a) and (b) are respectively a top view and a cross-sectional view schematically illustrating how the liquid crystal molecules would be aligned under the application of a voltage if the width of slits were narrowed extremely.
Figure 9:
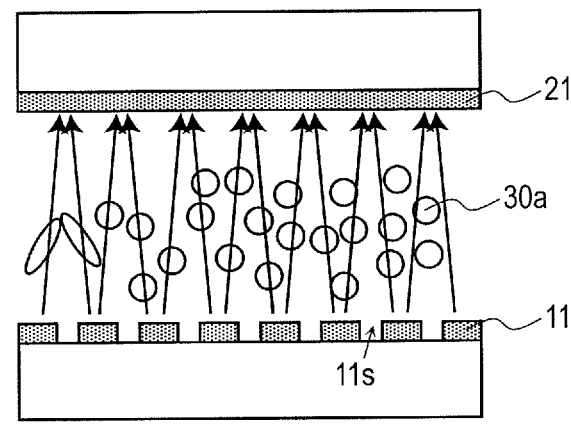

Likewise, the alignment direction of liquid crystal molecules in the liquid crystal layer 30 over the slits 11s also depends on the width W of the slits 11s. Hereinafter, this point will be described more specifically with reference to FIGS. 8 and 9. FIGS. 8(a) and 8(b) are respectively a top view and a cross-sectional view schematically illustrating how the liquid crystal molecules 30b would be aligned under the application of a voltage if the width W of the slits 11s were broadened extremely. On the other hand, FIGS. 9(a) and 9(b) are respectively a top view and a cross-sectional view schematically illustrating how the liquid crystal molecules 30b would be aligned under the application of a voltage if the width W of the slits 11s were narrowed extremely.

If the width W of the slits 11s were broadened extremely, then the liquid crystal molecules 30a would fall perpendicularly to the direction in which the slits 11s run as shown in FIGS. 8(a) and 8(b). The reason is that an oblique electric field (of which the electric lines of force are indicated by the arrows in FIG. 8(b)) generated over the slits 11s upon the application of a voltage works to make the liquid crystal molecules 30a fall in such a direction. In the same way, even if such slits are cut through the electrode of an MVA mode liquid crystal display device as an alignment control structure, the liquid crystal molecules will also fall perpendicularly to the direction in which the slits run upon the application of a voltage.

On the other hand, if the width W of the slits 11s were narrowed extremely, then the liquid crystal molecules 30a would fall parallel to the direction in which the slits 11s run as shown in FIGS. 9(a) and 9(b). The reason is as follows. Specifically, an oblique electric field itself (of which the electric lines of force are indicated by the arrows in FIG. 9(b)) generated over the slits 11s upon the application of a voltage works to make the liquid crystal molecules 30a fall perpendicularly to the direction in which the slits 11s run. However, if the width W of the slits 11s were too narrow, the liquid crystal molecules 30a falling in such a direction would collide against each other as schematically shown on the left-hand side of FIG. 9(b). As a result, the liquid crystal molecules 30a would eventually fall parallel to the direction in which the slits 11s run. It should be noted that even if a fishbone type pixel electrode is provided, the liquid crystal molecules would also fall parallel to the direction in which the slits run upon the application of a voltage.

As described above, the magnitude of a decrease in the applied voltage due to the presence of the slits 11s depends on the width W of the slits 11s. Thus, if the width W of the slits 11s were extremely narrow, the effective applied voltage would hardly decrease. That is why to reduce the viewing angle dependence of the γ characteristic, the width W of the slits 11s should be broadened to a certain degree. However, the broader the width W of the slits 11s, the more significantly the alignment direction of the liquid crystal molecules 30a would shift, upon the application of a voltage, from the most preferred direction, i.e., the reference alignment direction defined by the first and second photoalignment films 12 and 22 (i.e., the direction that is substantially parallel to the direction in which the slits 11s run). And the most extreme cases are shown in FIGS. 8(a) and 8(b). If the alignment direction of the liquid crystal molecules 30a shifts, the transmittance will decrease, so will the display luminance.

In the liquid crystal display device 100 of this embodiment, the width W of the slits 11s is set so that when the highest grayscale voltage is applied to the pixel electrode 11, the alignment direction of the liquid crystal molecules 30a in the liquid crystal layer 30 over the slits 11s will shift with respect to the reference alignment direction by less than 45 degrees. By setting the width W of the slits 11s in this manner, the decrease in display luminance can be minimized. Supposing the angle defined by the alignment direction (alignment azimuth) of the liquid crystal molecules 30a with respect to the transmission axis of the polarizer 13 on the rear side is θ, the transmittance is proportional to $\sin^2(2\theta)$. That is why θ is most suitably 45 degrees. The broader the width W of the slits 11s, the more significantly θ decreases from 45 degrees. And when θ reaches 0 degrees, the transmittance becomes the lowest. In the liquid crystal display device 100 of this embodiment, the width W of the slits 11s is set as described above, and therefore, the decrease in display luminance can be minimized.

As described above, in the liquid crystal display device 100 of this embodiment, each pixel electrode 11 has a slit cut region 11R1 that forms part of the region allocated to each of the liquid crystal domains A, B, C and D, and therefore, there are two kinds of regions to which mutually different effective voltages are applied (i.e., which have mutually different display luminances) within the pixel region. For that reason, this liquid crystal display device 100 can reduce the viewing angle dependence of the γ characteristic by using a relatively simple circuit configuration without using as complicated a circuit configuration as the one required by the pixel division driving technique. In addition, in the liquid crystal display device 100 of this embodiment, the reference alignment directions of the liquid crystal domains A, B, C and D are defined by the two photo-alignment films 12 and 22. That is to say, the alignment division of the pixel region is done by the first and second photo-alignment films 12 and 22 which apply a planar alignment controlling force to the liquid crystal molecules 30a in the liquid crystal layer 30. Consequently, since the multiple (e.g., two in this example) subpixels have an uneven area ratio, the intended alignment division state is realized even if the area of one subpixel has decreased. As a result, the effect of reducing the viewing angle dependence of the γ characteristic can be achieved sufficiently significantly without imposing a severe restriction on determining the area ratio of the multiple subpixels.

Furthermore, in the liquid crystal display device 100 of this embodiment, the width W of the slits 11s is set so that when the highest grayscale voltage is applied to the pixel electrode 11, the effective applied voltage will decrease by at least 0.5 V and the alignment direction of the liquid crystal molecules 30a will shift with respect to the reference alignment direction by less than 45 degrees. Consequently, not just can the viewing angle dependence of the γ characteristic be reduced sufficiently effectively but also can the decrease in display luminance be minimized as well. As already described with reference to FIGS. 8 and 9, it can be said that the width W of the slits 11s that have been cut through the pixel electrode 11 of the liquid crystal display device 100 of this embodiment is an intermediate one between the width of slits cut through the electrode of an MVA mode liquid crystal display device and that of slits cut through a fishbone type pixel electrode.

The effects described above can be achieved effectively by setting the width W of the slits 11s appropriately, because the liquid crystal display device 100 of this embodiment includes the photo-alignment films 12 and 22 and because the reference alignment direction defined by the photo-alignment films 12 and 22 is substantially parallel to the slits 11s. As can be seen from the foregoing description with reference to FIGS. 8 and 9, ideally the effective voltage applied to the liquid crystal layer 30 should be changed (i.e., decreased) with the alignment direction of the liquid crystal molecules itself kept substantially parallel to the slits 11s. If it were not for the photo-alignment films 12 and 22, naturally no alignment controlling force would be applied from the photo-alignment films 12 and 22. That is why in that case, if one tries to decrease sufficiently the effective voltage applied to the liquid crystal layer 30 by setting the width W of the slits 11s to be broad enough (e.g., if one attempts to decrease the effective voltage applied to the liquid crystal layer 30 by about 1 V by setting the width W of the slits 11s to be approximately 4 µm), the alignment direction of the liquid crystal molecules would shift significantly from the intended one and sufficiently high luminance could not be maintained anymore. On the other hand, according to this embodiment, the alignment direction of the liquid crystal molecules is restricted by the two photo-alignment films 12 and 22 to be substantially parallel to the slits 11s. That is why if the effective voltage applied to the liquid crystal layer 30 is decreased sufficiently by setting the width W of the slits 11s to be broad enough (e.g., if the effective voltage applied to the liquid crystal layer 30 is decreased by about 1 V by setting the width W of the slits 11s to be approximately 4 µm), the alignment direction of the liquid crystal molecules will not shift so significantly and a sufficiently bright image can be displayed.

As can be seen, since the reference alignment direction is defined by the photo-alignment films 12 and 22, the effective voltage applied to the liquid crystal layer 30 can be changed significantly with the alignment direction of the liquid crystal molecules kept close enough to their originally intended direction.

It should be noted that in order to reduce the viewing angle dependence of the γ characteristic even more effectively, the width W of the slits 11s is more suitably set so that when the highest grayscale voltage is applied to the pixel electrode 11, the effective voltage applied to the liquid crystal layer 30 over the slits 11s will decrease by 1.0 V or more.

Meanwhile, to check the decrease in the display luminance, the width W of the slits 11s is more suitably set so that when the highest grayscale voltage is applied to the pixel electrode 11, the alignment direction of the liquid crystal molecules 30a in the liquid crystal layer 30 over the slits 11s will shift with respect to the reference alignment direction by 30 degrees or less. As long as the magnitude of a shift is 30 degrees or less, the display luminance can be at least equal to a quarter of the originally intended one. As a result, a display operation can be conducted with sufficiently high quality.

Figure 10:
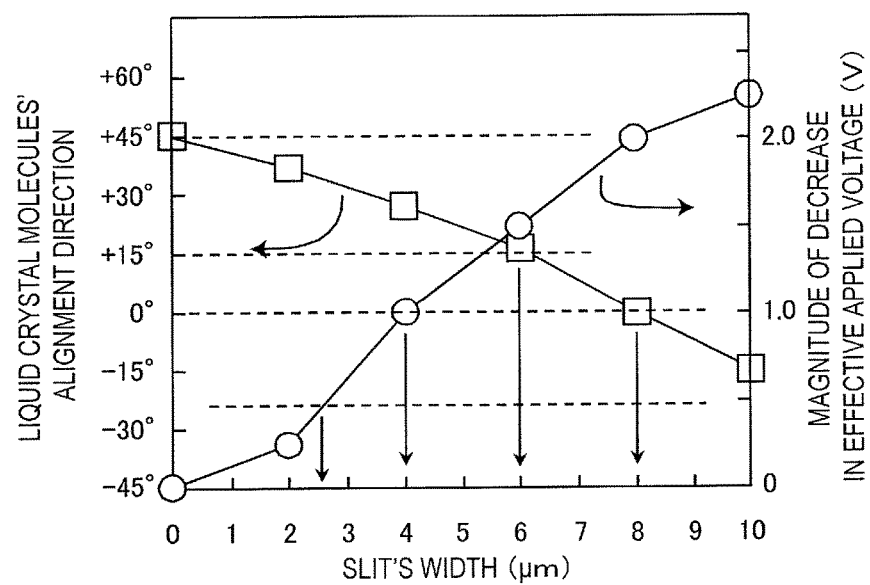
FIG. 10 A graph showing, based on the results of experiments, what influence was produced by changing the width of slits, wherein the abscissa represents the width of the slits, the ordinate on the right-hand side represents the magnitude of a decrease in the effective voltage applied to the liquid crystal layer over the slits, and the ordinate on the left-hand side represents the alignment direction (azimuth) of the liquid crystal molecules on the supposition that the azimuth of the transmission axis of the polarizer on the rear side is zero degrees.

Next, a specific preferred range of the width W of the slits 11s will be described with reference to FIG. 10, which is a graph showing, based on the results of experiments, what influence was produced by changing the width W of the slits 11s. In FIG. 10, the abscissa represents the width W of the slits 11s, the ordinate on the right-hand side represents the magnitude of a decrease in the effective voltage applied to the liquid crystal layer 30 over the slits 11s, and the ordinate on the left-hand side represents the alignment direction (azimuth) of the liquid crystal molecules 30a on the supposition that the azimuth of the transmission axis of the polarizer 13 on the rear side is zero degrees. If the liquid crystal molecules 30a are aligned ideally (i.e., aligned parallel to the reference alignment direction), the alignment direction of the liquid crystal molecules 30a is +45 degrees. In this case, the width W and pitch p (see FIG. 6) of the slits 11s have the same size.

As described above, to reduce the viewing angle dependence of the γ characteristic, the effective applied voltage suitably decreases by at least 0.5 V, and more suitably by 1.0 V or more. Consequently, as can be seen from FIG. 10, the width W of the slits 11s is suitably at least equal to 2.5 µm and more suitably equal to or greater than 4.0 µm.

As also described above, to minimize the decrease in display luminance due to the shift in the alignment direction of the liquid crystal molecules 30a, the alignment direction of the liquid crystal molecules 30a suitably shifts with respect to the reference alignment direction by less than 45 degrees, and more suitably by 30 degrees or less. In FIG. 10, the alignment direction of the liquid crystal molecules 30a shift with respect to the reference alignment direction by 45 and 30 degrees when the alignment directions of the liquid crystal molecules 30a are 0 degree and +15 degree directions, respectively. Thus, as can be seen from FIG. 10, the width W of the slits 11s is suitably less than 8.0 µm and more suitably equal to or smaller than 6.0 µm.

The results of experiments described above were obtained in a situation where the width W and pitch p of the slits 11s had the same size. However, even when the width W and pitch p of the slits 11s had different sizes, substantially the same results of experiments were obtained. That is to say, the magnitude of a decrease in the effective voltage applied to the liquid crystal layer 30 over the slits 11s and the magnitude of a shift in the alignment direction of the liquid crystal molecules 30a depend mostly on the width W of the slits 11s and hardly depend on the pitch p of the slits 11s. However, to form the pixel electrodes 11 at a good yield without causing any disconnection, the pitch p of the slits 11s suitably falls within the range of 5 μm to 30 μm.

The slit cut regions 11R1 and slit uncut regions 11R2 do not have to have the rectangular trapezoidal shapes shown in FIG. 6 but may have any other arbitrary shapes.

Furthermore, the area ratio of the slit cut region 11R1 to the slit uncut region 11R2 does not have to be that of the pixel electrode 11 shown in FIG. 6 as an example, but may also be set to be any other arbitrary value. However, to reduce the viewing angle dependence of the γ characteristic, the slit cut region 11R1 suitably accounts for at least one third, and more suitably two thirds or more, of each region of the pixel electrode 11 allocated to its associated liquid crystal domain.

(Embodiment 2)

Figure 11:
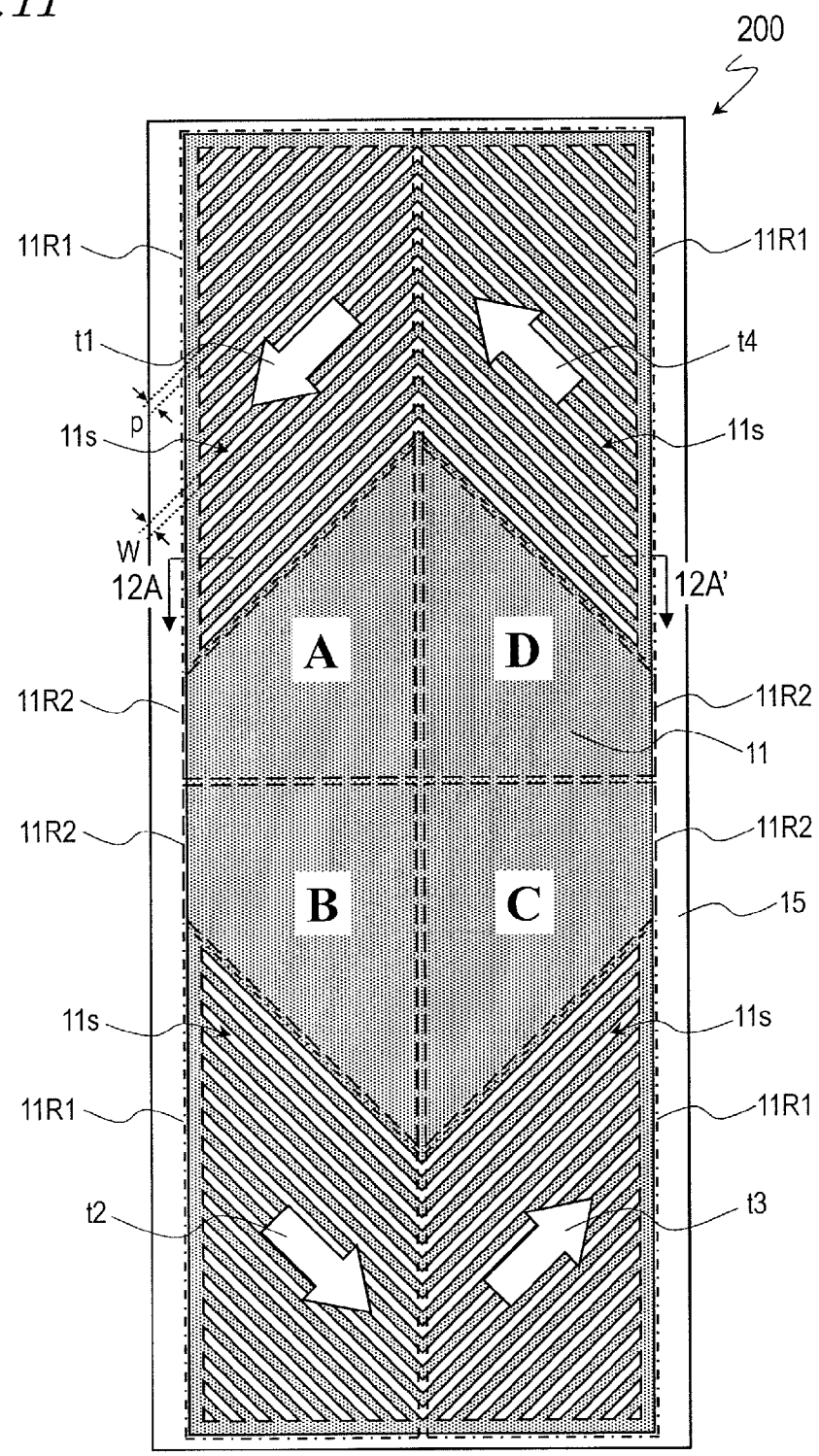
FIG. 11 A plan view schematically illustrating a single pixel region of a liquid crystal display device 200 according to an embodiment of the present invention.
Figure 12:
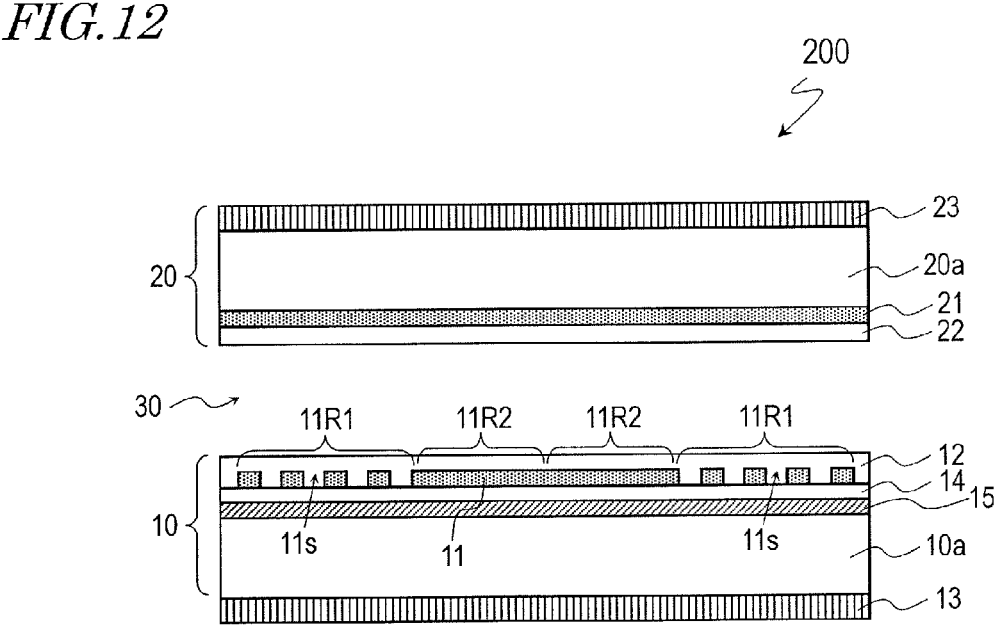
FIG. 12 A cross-sectional view schematically illustrating the liquid crystal display device 200 according to an embodiment of the present invention as viewed on the plane 12A-12A' shown in FIG. 11.

FIGS. 11 and 12 illustrate a liquid crystal display device 200 as a second embodiment of the present invention. FIG. 11 is a plan view schematically illustrating a single pixel region of the liquid crystal display device 200, and FIG. 12 is a cross-sectional view of the device as viewed on the plane 12A-12A' shown in FIG. 11. The following description of this second embodiment will be focused on only the differences of this liquid crystal display device 200 from the liquid crystal display device 100 of the first embodiment. Also, on the drawings, any component having substantially the same function as its counterpart of the liquid crystal display device 100 is identified by the same reference numeral and description thereof will be omitted herein (and the same statement will apply to the rest of the description of embodiments).

The active-matrix substrate 10 of this liquid crystal display device 200 further includes another electrode 15 which is arranged under the pixel electrode 11 with a dielectric layer 14 interposed between them (and which will be referred to herein as a "lower electrode 15"). This lower electrode 15 is made of a transparent conductive material (such as ITO). In the exemplary configuration shown in FIG. 11, the lower electrode 15 is arranged so as to be overlapped entirely by the pixel electrode 11.

A different voltage from the one for the pixel electrode 11 is applied to the lower electrode 15. Specifically, substantially the same voltage as the one applied to the counter electrode 21 is applied to the lower electrode 15.

The liquid crystal display device 200 of this embodiment includes such a lower electrode 15, and therefore, can decrease the effective voltage applied to the liquid crystal layer 30 over the slits 11s more significantly than the liquid crystal display device 100 of the first embodiment. That is why even if the width W of the slits 11s is not so broad, the effective applied voltage should be able to be decreased sufficiently. Consequently, the viewing angle dependence of the γ characteristic can be reduced sufficiently with the decrease in display luminance due to misalignment of the liquid crystal molecules 30a minimized.

Figure 13:
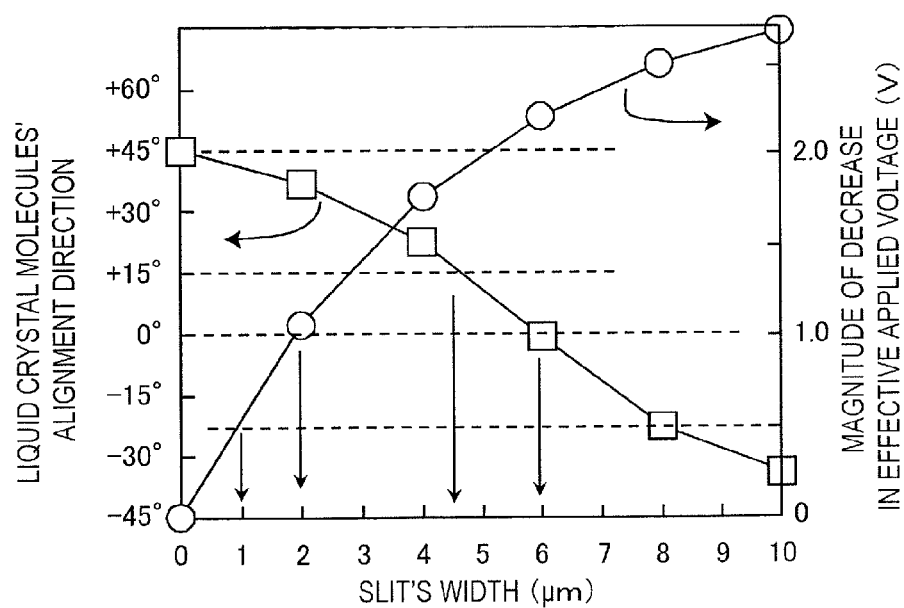
FIG. 13 A graph showing, based on the results of experiments, what influence was produced by changing the width of slits, wherein the abscissa represents the width of the slits, the ordinate on the right-hand side represents the magnitude of a decrease in the effective voltage applied to the liquid crystal layer over the slits, and the ordinate on the left-hand side represents the alignment direction (azimuth) of the liquid crystal molecules on the supposition that the azimuth of the transmission axis of the polarizer on the rear side is zero degrees.

Next, a specific preferred range of the width W of the slits 11s in the liquid crystal display device 200 including the lower electrode 15 will be described with reference to FIG. 13, which is a graph showing the results of experiments indicating how much influence was produced by changing the width W of the slits 11s. In FIG. 13, the abscissa represents the width W of the slits 11s, the ordinate on the right-hand side represents the magnitude of a decrease in the effective voltage applied to the liquid crystal layer 30 over the slits 11s, and the ordinate on the left-hand side represents the alignment direction (azimuth) of the liquid crystal molecules 30a in a situation where the azimuth angle of the transmission axis of the polarizer 13 on the rear side was set to be 0 degrees. If the liquid crystal molecules 30a are aligned in an ideal state (i.e., aligned parallel to the reference alignment direction (parallel to the slits 11s)), the liquid crystal molecules 30a have an alignment direction of +45 degrees. In this case, the width W and pitch p of the slits 11s are of the same size.

As described above, to reduce the viewing angle dependence of the γ characteristic, the effective applied voltage is suitably decreased by at least 0.5 V, and more suitably by 1.0 V or more. Consequently, as can be seen from FIG. 13, the width W of the slits 11s is suitably at least equal to 1.0 μm, and more suitably 2.0 μm or more.

As also described above, to minimize the decrease in display luminance due to a shift in the alignment direction of the liquid crystal molecules 30a, the alignment direction of the liquid crystal molecules 30a suitably shifts with respect to the reference alignment direction by less than 45 degrees, and more suitably by 30 degrees or less. In FIG. 13, the shifts in the alignment direction of the liquid crystal molecules 30a with respect to the reference alignment direction are 45 and 30 degrees when the alignment directions of the liquid crystal molecules 30a are 0 degree and +15 degree directions, respectively. For that reason, as can be seen from FIG. 13, the width W of the slits 11s is suitably less than 6.0 μm, and more suitably equal to or smaller than 4.5 μm.

Although the results of experiments described above were obtained when the width W and pitch p of the slits 11s were of the same size, substantially the same results of experiment were obtained even when the width W and pitch p of the slits 11s were of mutually different sizes. That is to say, the magnitude of a decrease in the effective voltage applied to the liquid crystal layer 30 over the slits 11s and the magnitude of a shift in the alignment direction of the liquid crystal molecules 30a depend mostly on the width W of the slits 11s and hardly depend on the pitch p of the slits 11s. However, to form the pixel electrodes 11 at a good yield without causing any disconnection, the pitch p of the slits 11s suitably falls within the range of 5 μm to 30 μm.

Figure 14:
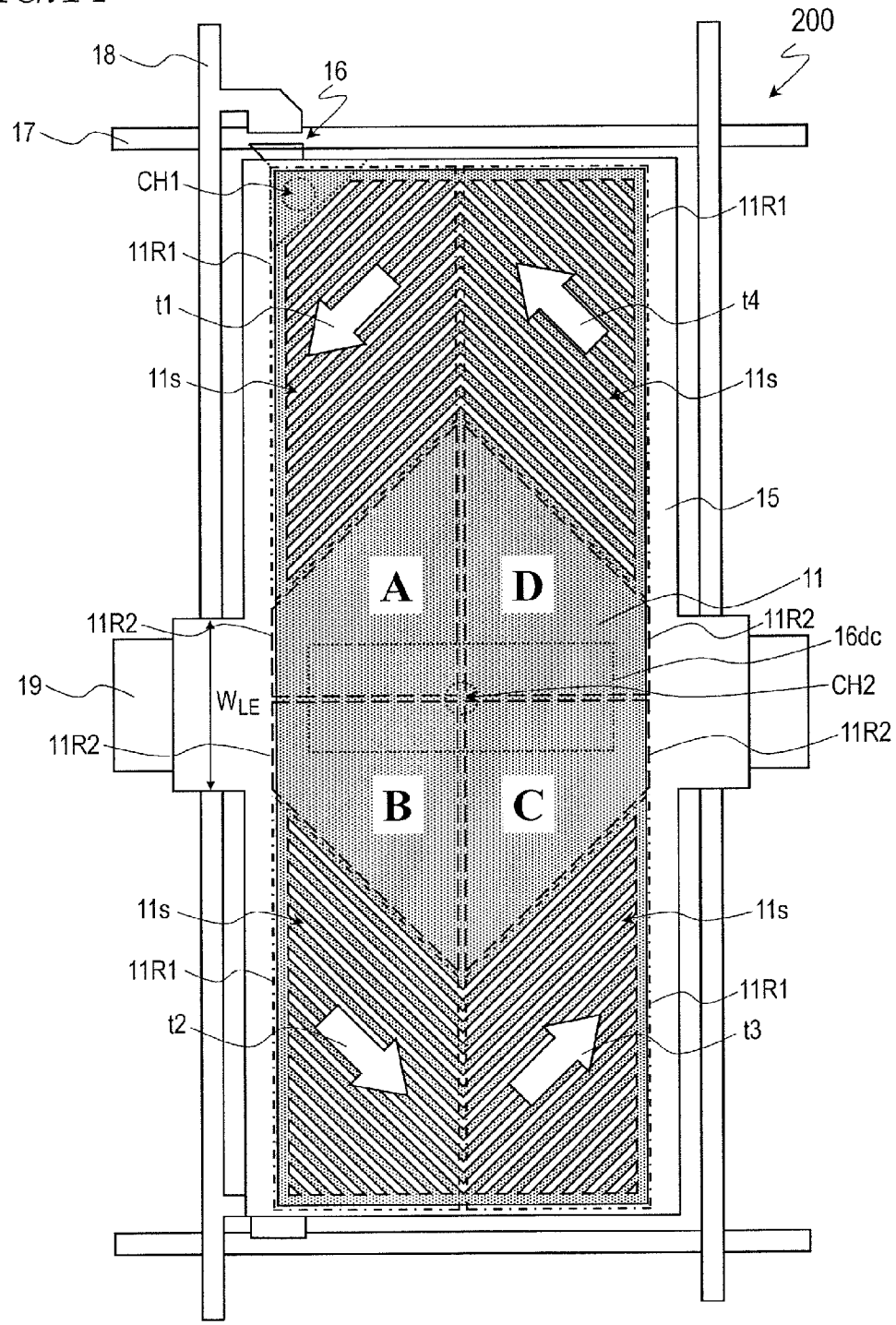
FIG. 14 A plan view schematically illustrating a single pixel region of a liquid crystal display device 200 according to an embodiment of the present invention.

FIG. 14 illustrates how a TFT 16 may be connected to the pixel electrode 11. In FIG. 14, illustrated are not only the TFT 16 but also scan lines 17, signal lines 18 and a common signal line (storage capacitor line) 19.

In the example illustrated in FIG. 14, slits 11s are omitted from the slit cut region 11R1 in the vicinity of the TFT 16 and the pixel electrode 11 is connected to the drain electrode of the TFT 16 through a contact hole CH1 which has been cut through the region with no slits 11s. Alternatively, the conductive layer (connecting electrode) may be extended from the drain electrode of the TFT 16 to the slit uncut region 11R2 through which no slits have been cut at all originally (i.e., to the center of the pixel region), and the pixel electrode 11 may be connected to the connecting electrode through the contact hole that has been cut through the center of the pixel electrode. In FIG. 14, also shown is a connecting electrode 16dc and contact hole CH2 to be used in a situation where such a configuration is adopted.

The source electrode, drain electrode and connecting electrode 16dc of the TFT 16 are made of the same conductive film (source metal layer) as the signal line 18, for example. If the lower electrode 15 is located over the source metal layer, the conductive film of the lower electrode 15 is removed from a region through which contact holes CH1 and CH2 are to be cut.

Also, the lower electrode 15 is electrically connected to the common signal line 19, through which the lower electrode 15 is supplied with substantially the same voltage as the one applied to the counter electrode 21. The common signal line 19 is made of the same conductive film (gate metal layer) as the scan lines 17 and the gate electrode of the TFT 16. A storage capacitor may be formed by the pixel electrode 11, the lower electrode 15 that faces the pixel electrode 11, and a dielectric layer 14 interposed between them. Alternatively, a storage capacitor may also be formed by an electrode which is arranged under, and electrically connected to, the pixel electrode 11 (e.g., the same conductive film as the signal lines 18, or a metal electrode formed by patterning the source metal layer), another electrode which is arranged under the former electrode and which is supplied with substantially the same voltage as the one applied to the counter electrode 21 (e.g., the same conductive film as the scan lines 17, or a metal electrode formed by patterning the gate metal layer), and a dielectric layer interposed between them (e.g., a gate insulating film). If the lower electrode 15 intersects with the signal lines 18, the width $W_{LE}$ of the lower electrode 15 at the intersection is suitably narrow, specifically, approximately 10 µm, in order to reduce the static capacitance produced between the signal lines 18 and the lower electrode 15.

(Embodiment 3)

Figure 15:
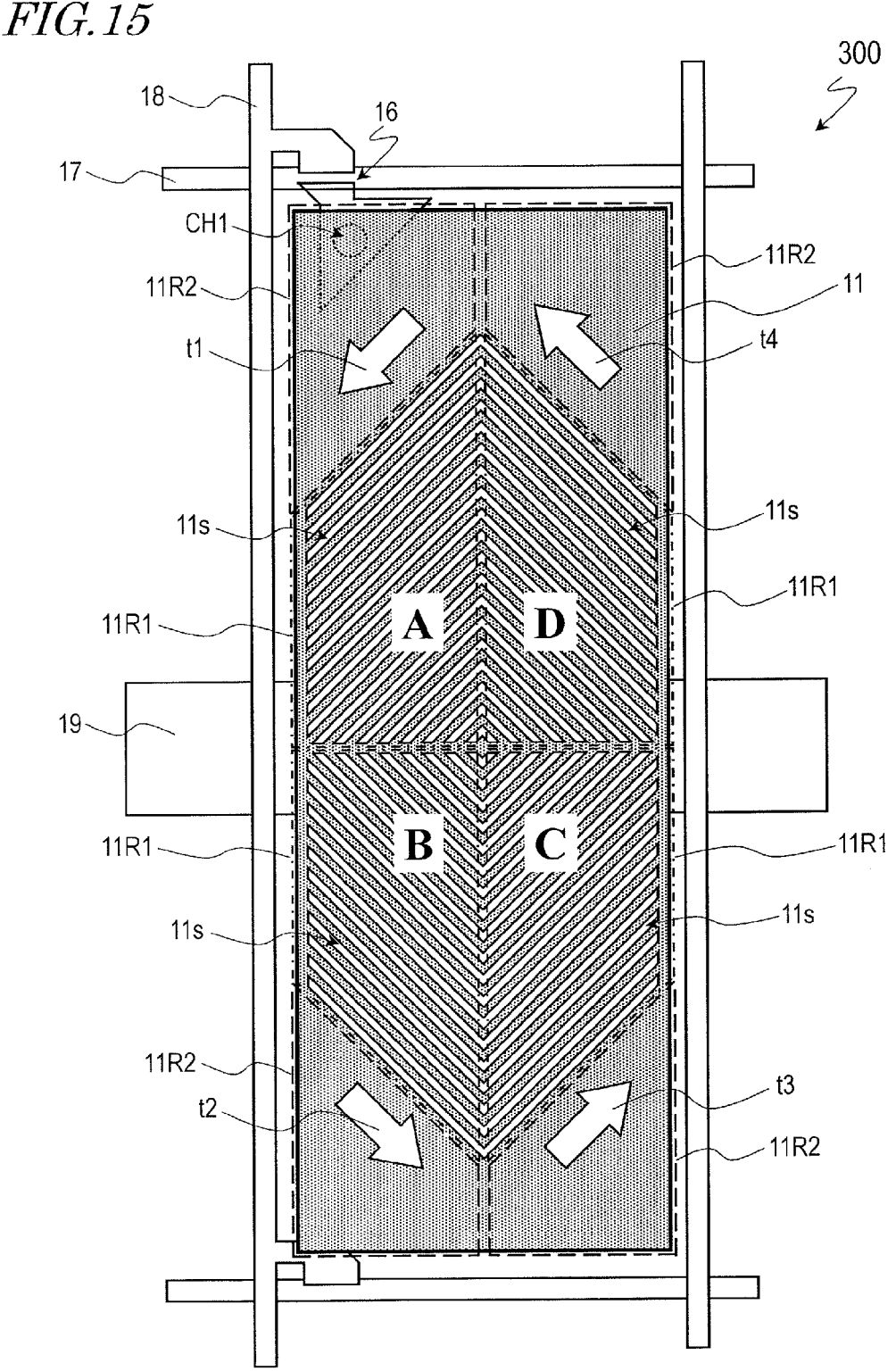
FIG. 15 A plan view schematically illustrating a single pixel region of a liquid crystal display device 300 according to an embodiment of the present invention.

FIG. 15 is a plan view schematically illustrating a single pixel region of a liquid crystal display device 300 as a third embodiment of the present invention.

In the liquid crystal display device 300 of this embodiment, the relative positions of the slit cut regions 11R1 and slit uncut regions 11R2 in the pixel electrode 11 are different from in the liquid crystal display device 100 of the first embodiment.

Specifically, according to this embodiment, in the regions of the pixel electrode 11 allocated to the liquid crystal domains A and D, the slit cut regions 11R1 form a relatively lower part and the slit uncut regions 11R2 form a relatively upper part as shown in FIG. 15. On the other hand, in the regions of the pixel electrode 11 allocated to the liquid crystal domains B and C, the slit cut regions 11R1 form a relatively upper part and the slit uncut regions 11R2 form a relatively lower part. That is to say, although the slits 11s are arranged in the upper and lower parts of the pixel region in the liquid crystal display device 100 of the first embodiment, the slits 11s are arranged around the center of the pixel region in the liquid crystal display device 300 of this embodiment. That is why in this embodiment, the dark subpixel is located at the center of a pixel, one half of the bright subpixel is located in the upper part of the pixel, and the other half of the bright subpixel is located in the lower part of the pixel.

The liquid crystal display device 300 of this embodiment can also reduce the viewing angle dependence of the γ characteristic. In addition, the liquid crystal display device 300 of this embodiment can also stabilize the alignments around the center of the pixel region thanks to the alignment controlling force of the slits 11s which are located in the central part of the pixel region. It should be noted that by adopting a configuration in which the slits 11s are located in the upper and lower parts of the pixel region (i.e., in outer parts of the pixel region) as in the liquid crystal display device 100 of the first embodiment, not in the central part of the pixel region, the adverse effects of an oblique electric field, generated due to the potentials on the scan lines 17, signal lines 18 and other bus lines, on the alignments can be reduced, which is advantageous.

(Embodiment 4)

Figure 16:
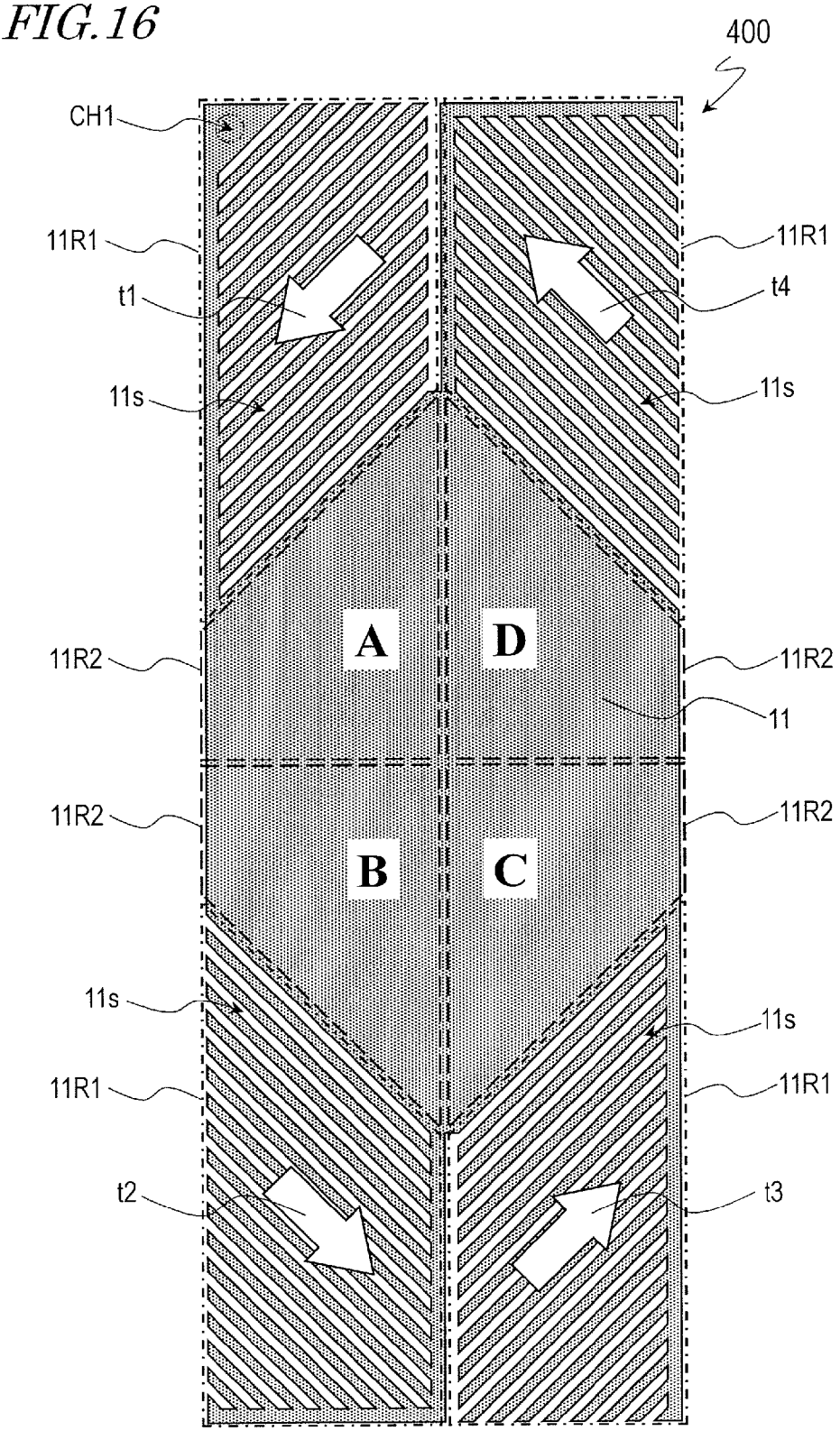
FIG. 16 A plan view schematically illustrating a single pixel region of a liquid crystal display device 400 according to an embodiment of the present invention.

FIG. 16 is a plan view schematically illustrating a single pixel region of a liquid crystal display device 400 as a fourth embodiment of the present invention.

In the liquid crystal display device 400 of this embodiment, the relative positions of the slit cut regions 11R1, slit uncut regions 11R2 and conductive film in the pixel electrode 11 are different from in the liquid crystal display device 100 of the first embodiment.

In the liquid crystal display device 100 of the first embodiment described above, when viewed along a normal to the display screen, the slits 11s are entirely surrounded with the conductive film of the pixel electrode 11 as shown in FIG. 6. On the other hand, in the liquid crystal display device 400 of this embodiment, when viewed along a normal to the display screen, the slits 11s are not entirely surrounded with the conductive film of the pixel electrode 11 as shown in FIG. 16. Specifically, the slits 11s are open in one end thereof. More specifically, in the regions allocated to the liquid crystal domains A and D, the slits 11s are open on the right end thereof. Meanwhile, in the regions allocated to the liquid crystal domains B and C, the slits 11s are open on the left end thereof. If the slits 11s are open on one end in this manner, the alignment controlling force produced by the oblique electric field will work more effectively to induce alignments of the liquid crystal molecules 30a in the reference alignment direction more easily.

On the other hand, if the slits 11s are entirely surrounded with the conductive film of the pixel electrode 11, then disclination will hardly arise, which is beneficial, too.

(Embodiment 5)

Figure 17:
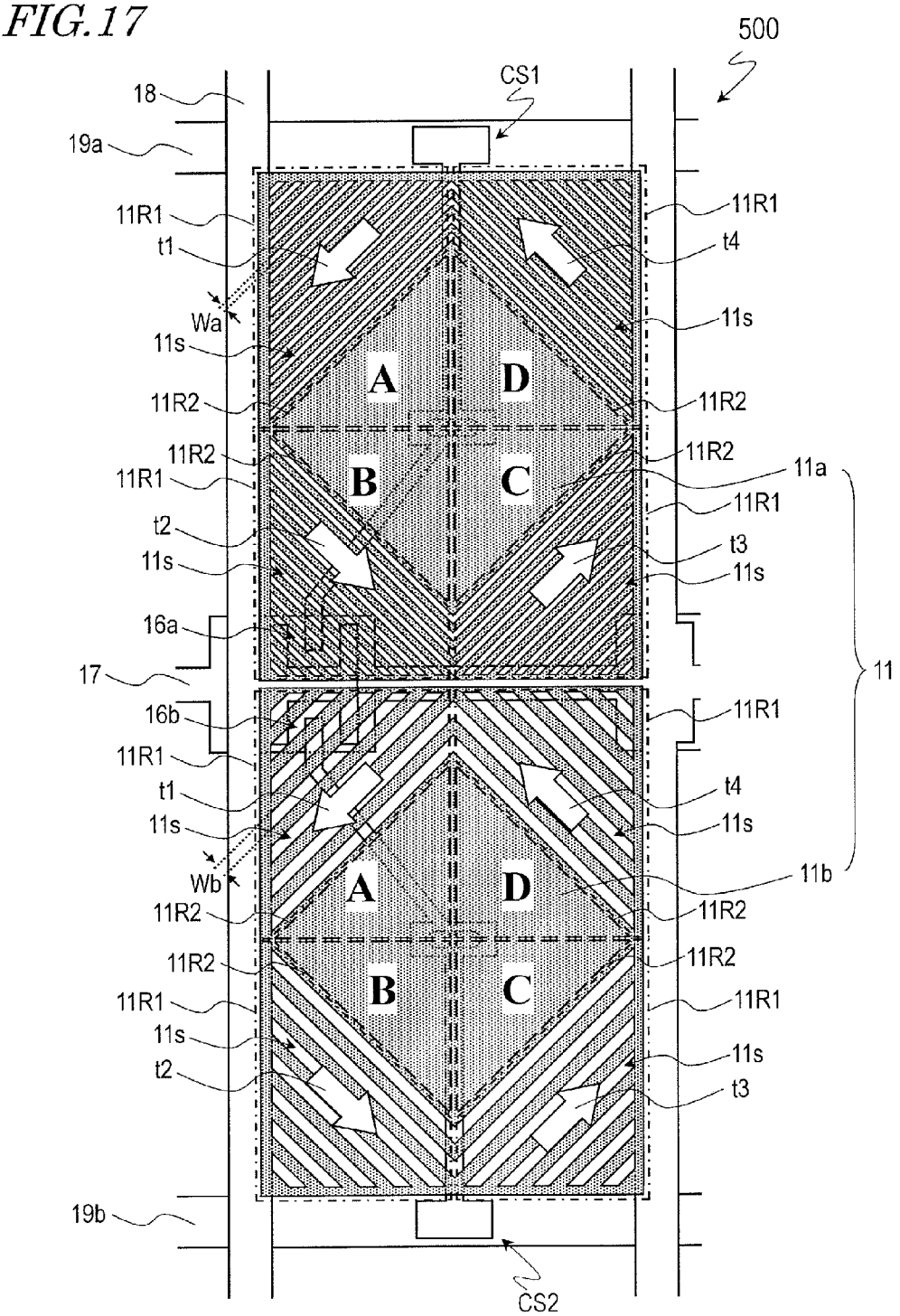
FIG. 17 A plan view schematically illustrating a single pixel region of a liquid crystal display device 500 according to an embodiment of the present invention.

FIG. 17 is a plan view schematically illustrating a single pixel region of a liquid crystal display device 500 as a fifth embodiment of the present invention.

In the liquid crystal display device 500 of this embodiment, a pixel electrode 11 including the slit cut regions 11R1 and the pixel division driving technique are used in combination. As shown in FIG. 17, each pixel electrode 11 of the liquid crystal display device 500 includes a plurality of (e.g., two in this example) subpixel electrodes 11a and 11b. One of the two subpixel electrodes 11a and 11b (which will be referred to herein as a "first subpixel electrode 11a") is connected to a first TFT 16a and a first storage capacitor CS1. The other subpixel electrode 11b (which will be referred to herein as a "second subpixel electrode 11b") is connected to a second TFT 16b and a second storage capacitor CS2. Each pixel region of the liquid crystal display device 500 includes a plurality of (e.g., two in this example) subpixel regions corresponding to those subpixel electrodes 11a and 11b.

The respective gate electrodes of the first and second TFTs 16a and 16b are connected to the same scan line in common. On the other hand, the respective source electrodes of the first and second TFTs 16a and 16b are connected to the same signal line 18 in common.

The first storage capacitor CS1 is connected to a first storage capacitor line 19a, while the second storage capacitor CS2 is connected to a second storage capacitor line 19b. One of the two electrodes that form the first storage capacitor CS1 (which is a storage capacitor counter electrode that forms part of the first storage capacitor line 19a in this example) is supplied with a storage capacitor counter voltage through the first storage capacitor line 19a. On the other hand, one of the two electrodes that form the second storage capacitor CS2 (which is a storage capacitor counter electrode that forms part of the second storage capacitor line 19b in this example) is supplied with a storage capacitor counter voltage through the second storage capacitor line 19b. The respective storage capacitor counter electrodes of the first and second storage capacitors CS1 and CS2 are independent of each other, and therefore, can be supplied with mutually different storage capacitor counter voltages (which will be referred to herein as "CS voltages") through their associated storage capacitor lines (i.e., the first and second storage capacitor lines 19a and 19b).

If after the first and second TFTs 16a and 16b have been turned OFF by supplying a display signal voltage to the first and second subpixel electrodes 11a and 11b through the same signal line 18, the voltages applied to the storage capacitor counter electrodes of the first and second storage capacitors CS1 and CS2 (i.e., the voltages supplied through the first and second storage capacitor lines 19a and 19b) have different variations (which are defined by the directions and magnitudes of the variations), the voltages applied to the first and second subpixel electrodes 11a and 11b can be different from each other by using the capacitance division technique.

In this liquid crystal display device 500, each of the two subpixel regions has four liquid crystal domains A, B, C and D. Each of the first and second subpixel electrodes 11a and 11b has slit cut regions 11R1 and slit uncut regions 11R2 in the regions allocated to those liquid crystal domains A, B, C and D. That is why in each of the two subpixel regions, there are two regions in which mutually different effective voltages are applied to the liquid crystal layer 30. That is why in the liquid crystal display device 500 of this embodiment, four regions in which mutually different effective voltages are applied to the liquid crystal layer 30 can be defined in a single pixel region. Consequently, the effect of reducing the viewing angle dependence of the γ characteristic can be achieved even more significantly.

It should be noted that the liquid crystal display device 500 of this embodiment uses the pixel division driving technique, and therefore, needs to have a little more complicated circuit configuration than the liquid crystal display devices 100 to 400 of the first through fourth embodiments described above. However, by using the pixel electrode 11 including the slit cut regions 11R1 and the pixel division driving technique as in this embodiment, the pixel division number can be increased (i.e., the viewing angle dependence of the γ characteristic can be reduced) more significantly with a similar circuit configuration, compared to a situation where just the pixel division driving technique is simply used. In other words, if the viewing angle dependence of the γ characteristic should be reduced to approximately the same degree, the combined use of the pixel electrode 11 including the slit cut regions 11R1 and the pixel division driving technique can simplify the circuit configuration, compared to a situation where just the pixel division driving technique is used.

In the exemplary configuration shown in FIG. 17, the width Wa of the slits 11s that have been cut through the first subpixel electrode 11a is different from the width Wb of the slits 11s that have been cut through the second subpixel electrode 11b. For example, the former width Wa may be 5 μm and the latter width Wb may be 7 μm. However, these widths Wa and Wb of the first and second subpixel electrodes 11a and 11b may naturally be the same, e.g., may both set to be 5 μm.

(Embodiment 6)

A variation of a pattern of cutting slits 11s through the pixel electrode 11 will be described as a sixth embodiment of the present invention.

A configuration in which the slits 11s cut through the slit cut regions 11R1 have substantially the same width W is illustrated in FIG. 6 and other drawings. However, there may be slits 11s with different widths W in the same slit cut region 11R1. For example, slits 11s1 with a first width W1 and slits 11s2 with a second width W2 that is different from (e.g., narrower in this example than) the first width W1 may have been cut through the same slit cut region 11R1 as shown in FIG. 18.

In part of the slit cut region 11R1 through which the broader slits 11s1 have been cut (i.e., the upper part of the slit cut region 11R1) and another part of the slit cut region 11R1 through which the narrower slits 11s2 have been cut (i.e., the lower part of the slit cut region 11R1), the effective voltage applied to the liquid crystal layer 30 decreases to mutually different degrees. More specifically, the applied voltage decreases to the greater degree in the part with the broader slits 11s1 and decreases to the lesser degree in the part with the narrower slits 11s2.

The broader slits 11s1 may have a width (first width) W1 of 5 μm and a pitch p1 of 5 μm, for example. On the other hand, the narrower slits 11s2 may have a width (second width) W2 of 3 μm and a pitch p2 of 3 μm, for example.

Figure 18:
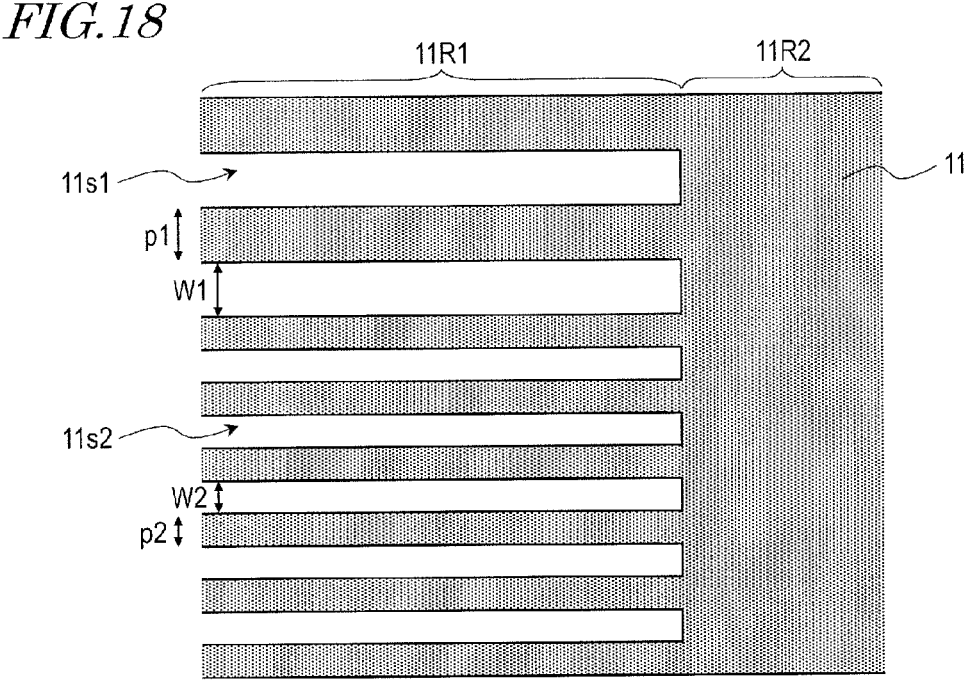
FIG. 18 A plan view illustrating an exemplary pattern of cutting slits through a pixel electrode.
Figure 19:
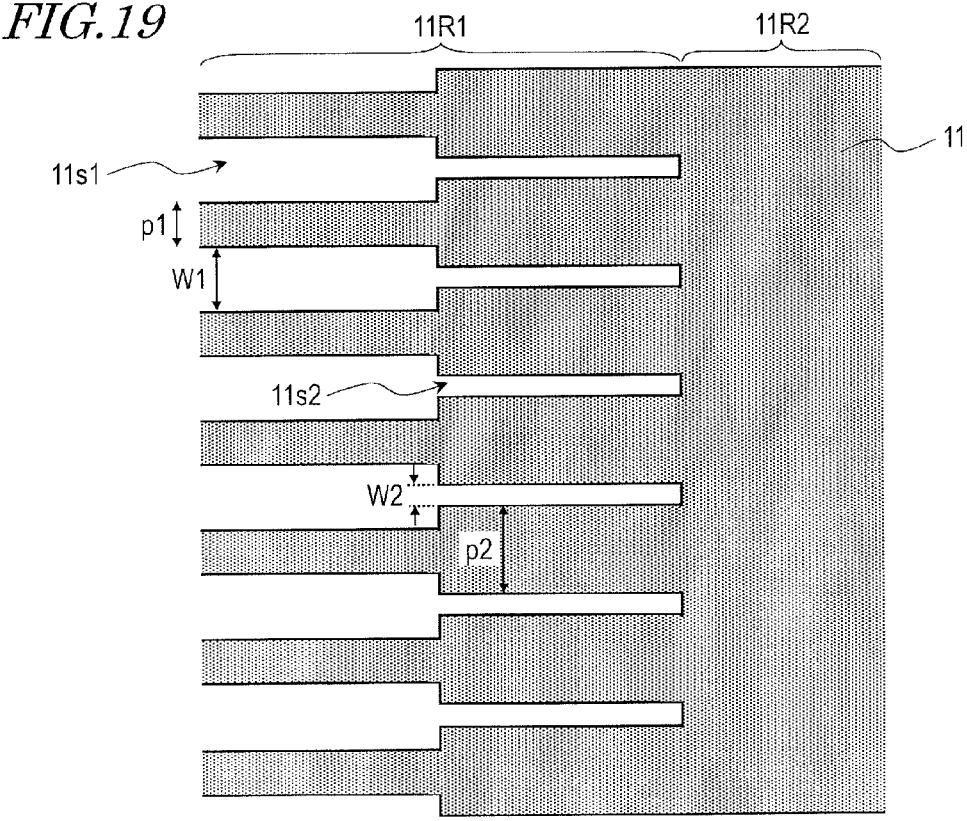
FIG. 19 A plan view illustrating another exemplary pattern of cutting slits through a pixel electrode.

In the configuration illustrated in FIG. 18, the broader slits 11s1 and the narrower slits 11s2 have been cut through independently of each other. However, as shown in FIG. 19, these two groups of slits may also have been cut continuously. Specifically, in the example illustrated in FIG. 19, the broader slits 11s1 are located on the left-hand side of the slit cut region 11R1, and the narrower slits 11s2 are located on the right-hand side of the slit cut region 11R1 and have been cut so as to be extended from the broader slits 11s1.

The broader slits 11s1 may have a width (first width) W1 of 6 μm and a pitch p1 of 4 μm, for example. On the other hand, the narrower slits 11s2 may have a width (second width) W2 of 2 μm and a pitch p2 of 8 μm, for example.

Figure 20:
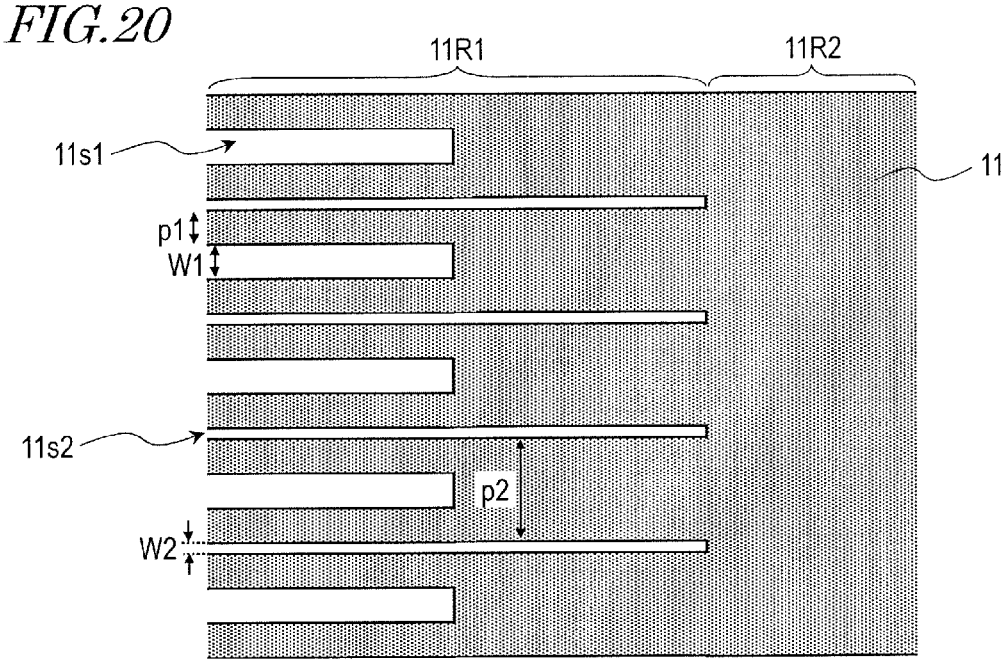
FIG. 20 A plan view illustrating still another exemplary pattern of cutting slits through a pixel electrode.

Alternatively, the arrangement pattern shown in FIG. 20 may also be adopted. In the example illustrated in FIG. 20, the broader slits 11s1 and the narrower slits 11s2 are arranged alternately on the left-hand side of the slit cut region 11R1, while only the narrower slits 11s2 are arranged on the right-hand side of the slit cut region 11R1.

The broader slits 11s1 may have a width (first width) W1 of 6 μm, and the narrower slits 11s2 may have a width (second width) W2 of 2 μm. Also, in that part where there are both the broader slits 11s1 and the narrower slits 11s2 (i.e., on the left-hand side of the slit cut region 11R1), their pitch p1 may be 6 μm, for example. On the other hand, in the part where there are only the narrower slits 11s2 (i.e., on the right-hand side of the slit cut region 11R1), the slits 11s2 may have a pitch p2 of 18 μm, for example.

In FIGS. 18 to 20, there are two groups of slits with two different widths in the same region. However, there may be three or more groups of slits with mutually different widths in the same slit cut region 11R1. Or the width of multiple slits may also change gradually within the same slit cut region 11R1 (e.g., the slits may be cut so that the closer to the center of the pixel region, the narrower the width of the slits cut through it).

Figure 21:
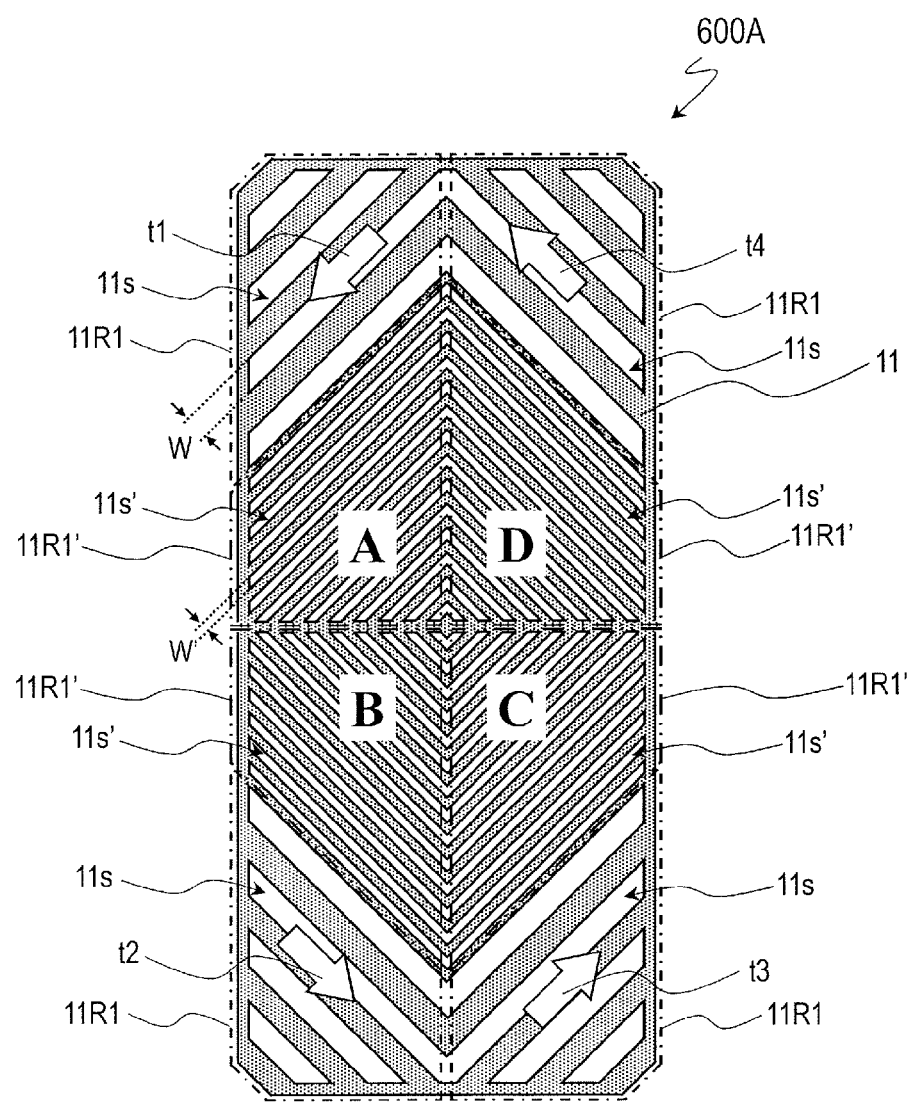
FIG. 21 A plan view schematically illustrating a single pixel region of a liquid crystal display device 600A according to an embodiment of the present invention.

Also, in the foregoing description, the pixel electrode 11 is supposed to have the slit uncut regions 11R2. However, the pixel electrode 11 does not have to have the slit uncut regions 11R2. FIG. 21 illustrates a liquid crystal display device 600A with no slit uncut regions 11R2.

As shown in FIG. 21, the pixel electrode 11 of this liquid crystal display device 600A has slit cut regions 11R1 in parts of the regions allocated to the liquid crystal domains A, B, C and D. The pixel electrode 11 of this liquid crystal display device 600A also has additional slit cut regions 11R1', through which additional slits 11s' with a different width W' from the width W of the slits 11s in the slit cut regions 11R1 have been cut. In the following description, the slit cut regions 11R1 will be referred to herein as "first slit cut regions" and the additional slit cut regions 11R1' will be referred to herein as "second slit cut regions".

The width W of the slits 11s in the first slit cut regions 11R1 and the width W' of the slits 11s' in the second slit cut regions 11R1' have been set so that when the highest grayscale voltage is applied to the pixel electrode 11, the effective applied voltage will decrease by at least 0.5 V and the alignment direction of the liquid crystal molecules 30a will shift with respect to the reference alignment direction by less than 45 degrees. Also, in the exemplary configuration illustrated in FIG. 21, the width W of the slits 11s in the first slit cut regions 11R1 is greater than the width W' of the slits 11s' in the second slit cut regions 11R1'.

In this liquid crystal display device 600A, the width W of the slits 11s in the first slit cut regions 11R1 is different from the width W' of the slits 11s' in the second slit cut regions 11R1'. That is why the magnitude of a decrease in the voltage applied to the liquid crystal layer 30 over the first slit cut regions 11R1 is different from that of a decrease in the voltage applied to the liquid crystal layer 30 over the second slit cut regions 11R1'. Consequently, in each liquid crystal domain, there are two regions in which mutually different voltages are applied to the liquid crystal layer 30, i.e., the first slit cut region 11R1 in which a relatively low voltage is applied and the second slit cut region 11R1' in which a relatively high voltage is applied. As a result, the viewing angle dependence of the γ characteristic can be reduced.

It should be noted that to reduce the viewing angle dependence of the γ characteristic sufficiently, the difference between the magnitudes of a decrease in effective voltages applied to respective portions of the liquid crystal layer 30 over the first and second slit cut regions 11R1 and 11R1' is suitably at least 0.5 V, and more suitably, 1.0 V or more.

In addition, this configuration in which the pixel electrode 11 has such additional slit cut regions (i.e., second slit cut regions) 11R1' instead of the slit uncut regions 11R2 can also further stabilize the alignments of the liquid crystal molecules as well, which is also advantageous. Meanwhile, the configuration in which the pixel electrode 11 has the slit uncut regions (solid regions) 11R2 as in the liquid crystal display devices 100 to 500 of the first through fifth embodiments described above can maximize the difference in the effective voltage applied to the liquid crystal layer 30, which is also beneficial.

Figure 22:
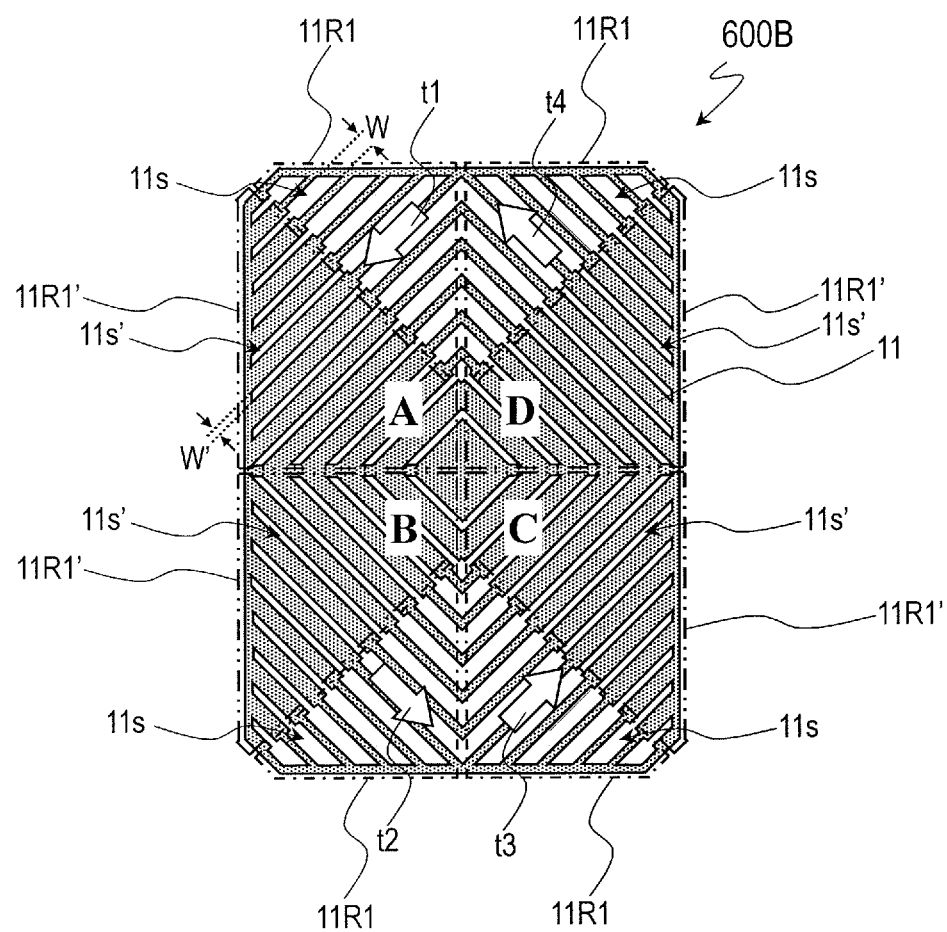
FIG. 22 A plan view schematically illustrating a single pixel region of a liquid crystal display device 600B according to an embodiment of the present invention.

FIG. 22 illustrates another liquid crystal display device 600B with no slit uncut regions 11R2. As shown in FIG. 22, each pixel electrode 11 of this liquid crystal display device 600B has first and second slit cut regions 11R1 and 11R1' in each of the regions allocated to the liquid crystal domains A, B, C and D.

In this liquid crystal display device 600B, the slits 11s and 11s' of the first and second slit cut regions 11R1 and 11R1' are continuous with each other. Even by adopting such a configuration, the same effects as those achieved by the liquid crystal display device 600A can also be achieved.

Figure 23:
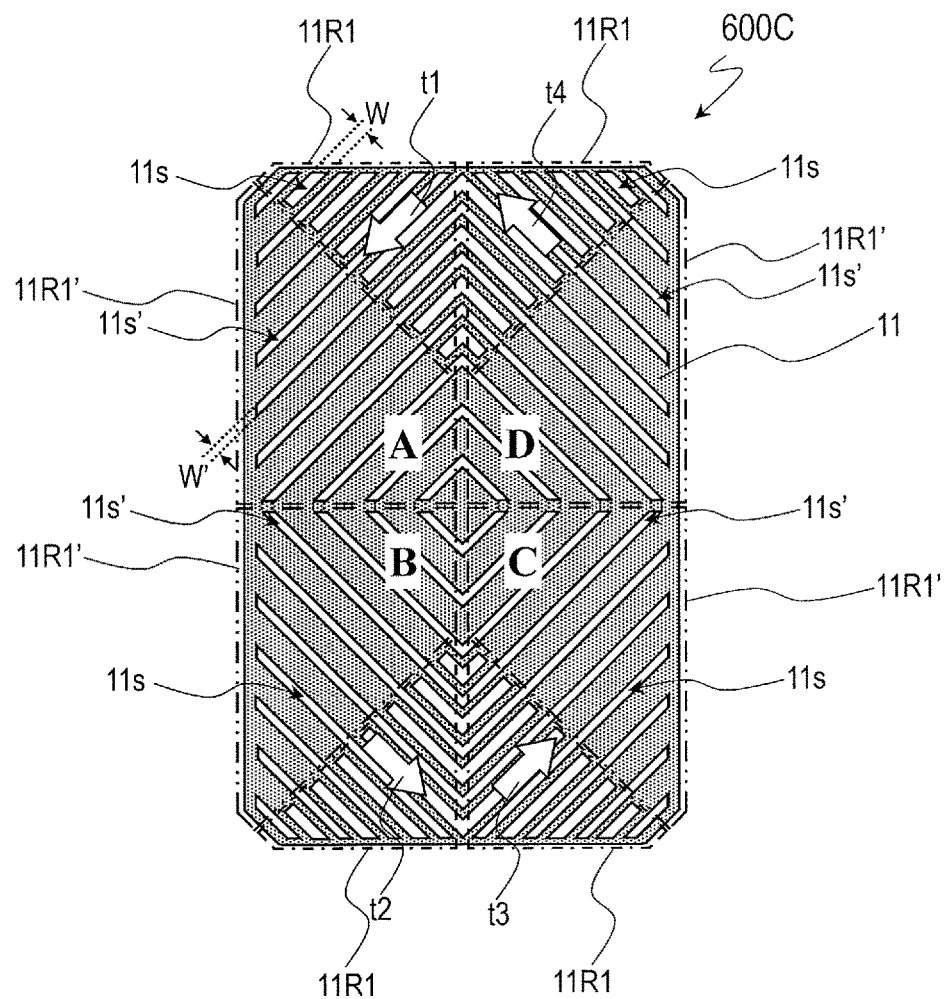
FIG. 23 A plan view schematically illustrating a single pixel region of a liquid crystal display device 600C according to an embodiment of the present invention.

FIG. 23 illustrates another liquid crystal display device 600C with no slit uncut regions 11R2. As shown in FIG. 23, each pixel electrode 11 of this liquid crystal display device 600C has first and second slit cut regions 11R1 and 11R1' in each of the regions allocated to the liquid crystal domains A, B, C and D.

In this liquid crystal display device 600C, the narrower slits 11s' that have been cut through the second slit cut regions 11R1' are extended to run through the first slit cut regions 11R1, in each of which slits 11s and 11s' with mutually different widths are arranged alternately. Even by adopting such a configuration, the same effects as those achieved by the liquid crystal display device 600A or 600B can also be achieved.

(Embodiment 7)

In each of the embodiments described above, each pixel region is supposed to be divided into four liquid crystal domains A, B, C and D. However, a single pixel is not necessarily divided into four. The present invention can also be used effectively even in a configuration in which each pixel is split into two.

Figure 24:
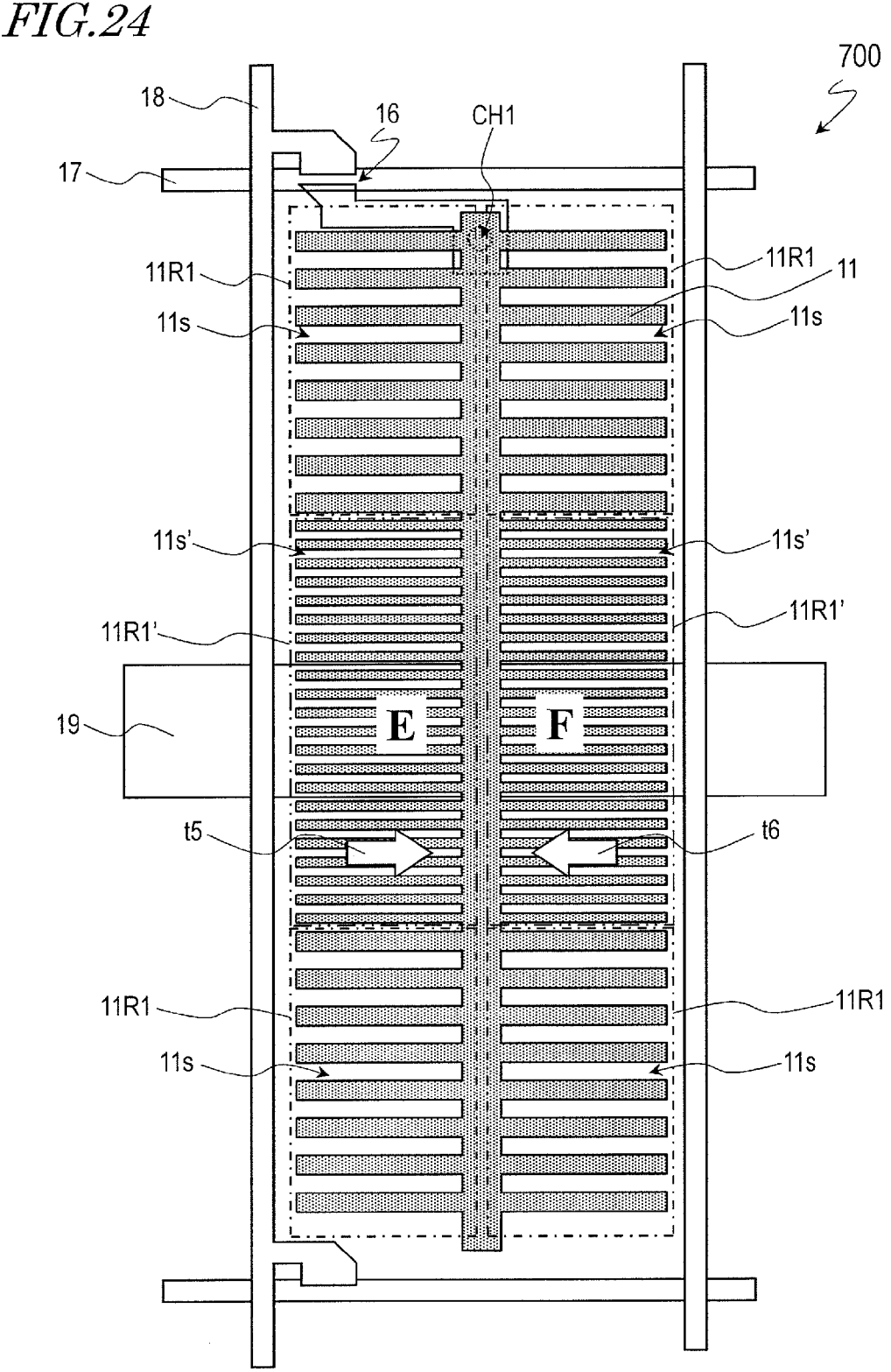
FIG. 24 A plan view schematically illustrating a single pixel region of a liquid crystal display device 700 according to an embodiment of the present invention.

FIG. 24 is a plan view schematically illustrating a single pixel region of a liquid crystal display device 700 according to a seventh embodiment of the present invention.

As shown in FIG. 24, each pixel region of this liquid crystal display device 700 has two liquid crystal domains E and F, which are respectively located on the left- and right-hand sides of the pixel region. That is to say, each pixel is horizontally split into two. The tilt directions (reference alignment directions) t5 and t6 of these liquid crystal domains E and F are approximately 0 degree and 180 degree directions, respectively. In this embodiment, the two polarizers 13 and 23 are arranged so that their transmission axes define an angle of approximately 45 degrees with respect to the horizontal and vertical directions on the display screen.

Each pixel electrode 11 of this liquid crystal display device 700 has first and second slit cut regions 11R1 and 11R1' in each of the regions allocated to the liquid crystal domains E and F.

In this embodiment, the slits 11s and 11s' which have been cut through the first and second slit cut regions 11R1 and 11R1' also run substantially parallel to the reference alignment directions. That is to say, the slits 11s and 11s' that have been cut through the first and second slit cut regions 11R1 and 11R1' for the liquid crystal domain E run substantially parallel to the reference alignment direction t5 (approximately 0 degree direction). On the other hand, the slits 11s and 11s' that have been cut through the first and second slit cut regions 11R1 and 11R1' for the liquid crystal domain F run substantially parallel to the reference alignment direction t6 (approximately 180 degree direction).

The slits 11s and 11s' that have been cut through the first and second slit cut regions 11R1 and 11R1' have mutually different widths W and W'. In the exemplary configuration shown in FIG. 24, the width W of the slits 11s in the first slit cut region 11R1 is broader than the width W' of the slits 11s' in the second slit cut region 11R1'.

These widths W and W' of the slits 11s and 11s' in the first and second slit cut regions 11R1 and 11R1' have been set so that when the highest grayscale voltage is applied to the pixel electrode 11, the effective applied voltage will decrease by at least 0.5 V and the alignment direction of the liquid crystal molecules 30a will shift with respect to the reference alignment direction by less than 45 degrees.

In this liquid crystal display device 700, there are multiple regions in which multiple different effective voltages are applied to the liquid crystal layer 30 in each of the liquid crystal domains E and F. Consequently, the viewing angle dependence of the γ characteristic can be reduced.

In this embodiment, the pixel electrode 11 is supposed to include first and second slit cut regions 11R1 and 11R1'. However, this is only an example. Alternatively, the pixel electrode 11 may have a slit uncut region with no slits instead of the second slit cut region 11R1'.

As can be seen from the foregoing description of the first through seventh embodiments, by adopting a configuration in which the reference alignment directions of respective liquid crystal domains are defined by a pair of photo-alignment films and in which those reference alignment directions are substantially parallel to the slits to be cut through the pixel electrode, the effective voltage applied to the liquid crystal layer can be changed significantly with the alignment direction of the liquid crystal molecules kept close enough to their original direction. Consequently, by setting the width of the slits to be a value falling within an appropriate range, a bright image can be displayed with the viewing angle dependence of the γ characteristic reduced sufficiently effectively.

(Embodiment 8)

Figure 25:
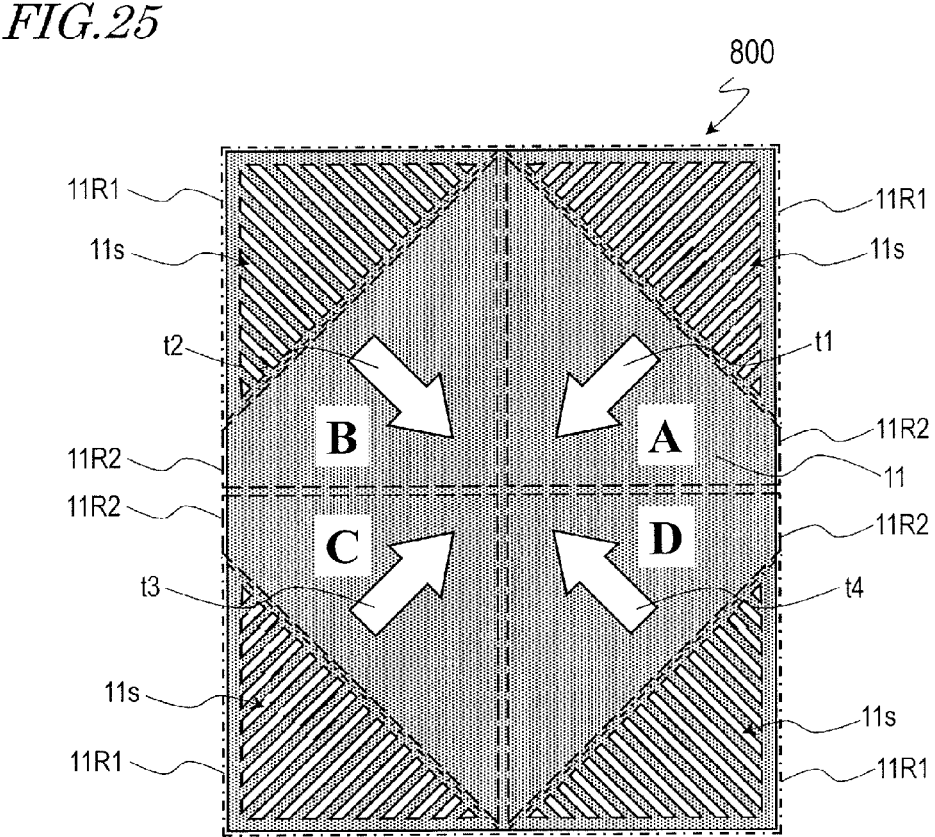
FIG. 25 A plan view schematically illustrating a single pixel region of a liquid crystal display device 800 according to an embodiment of the present invention.

FIG. 25 is a plan view schematically illustrating a single pixel region of a liquid crystal display device 800 according to an eighth embodiment of the present invention.

In the liquid crystal display device 800 of this embodiment, each pixel electrode 11 also has a slit cut region 11R1 in a part of a region allocated to each of liquid crystal domains A, B, C and D and a slit uncut region (solid region) 11R2 in another part of the region allocated to each of the liquid crystal domains A, B, C and D.

In this liquid crystal display device 800, however, the mode of the alignment division in each pixel region (i.e., the arrangement of the liquid crystal domains A, B, C and D in each pixel region) is different from that of the liquid crystal display device 100 of the first embodiment.

Figure 26:
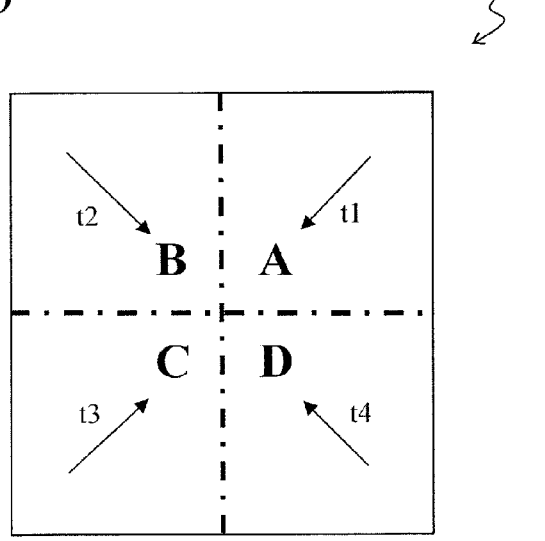
FIG. 26 Illustrates another exemplary pixel region.

Specifically, each pixel region of this liquid crystal display device 800 is subjected to the alignment division in the same way as the pixel region P5 shown in FIG. 26. Just like the pixel region P1, the pixel region P5 also has four liquid crystal domains A through D. The respective tilt directions (reference alignment directions) of the liquid crystal domains A through D of the pixel region P5 are the same as the tilt directions of the liquid crystal domains A through D of the pixel region P1.

Nevertheless, even though the liquid crystal domains A through D of the pixel region P1 are respectively arranged as its upper left, lower left, lower right and upper right parts (i.e., arranged counterclockwise from the upper left part), the liquid crystal domains A through D of the pixel region P5 are respectively arranged as its upper right, upper left, lower left and lower right parts (i.e., arranged counterclockwise from the upper right part). The respective tilt directions t1 through t4 of the four liquid crystal domains A through D of the pixel region P5 point toward the center of the pixel region P5.

Figure 27:
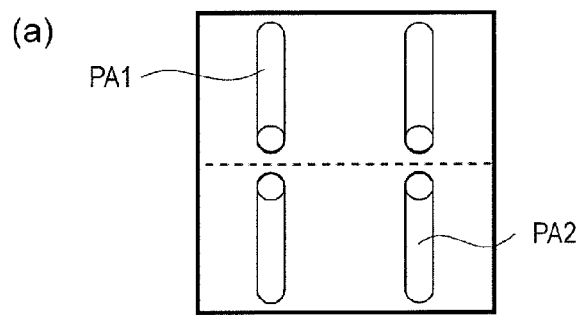
FIG. 27 Shows a method of dividing the pixel region shown in FIG. 26, wherein (a) shows the pretilt directions on a rear substrate side, (b) shows the pretilt directions on a front substrate side, and (c) shows the tilt directions when a voltage is applied to the liquid crystal layer.
Figure 27:
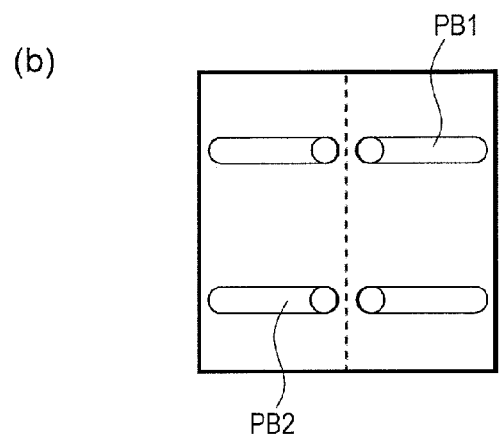
Figure 27:
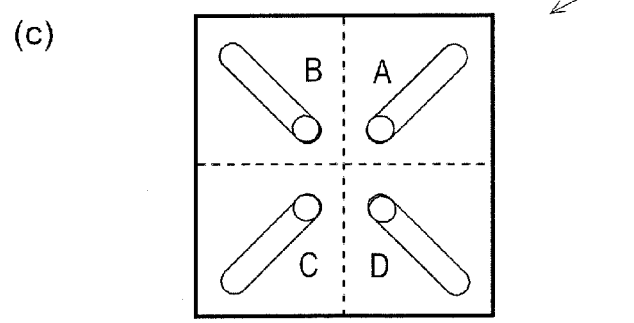

By bonding together the rear and front substrates that have been subjected to the alignment treatment as shown in FIGS. 27(a) and 27(b), an alignment divided pixel region P5 can be defined as shown in FIG. 27(c). A specific method for subjecting the rear and front substrates to the alignment treatment as shown in FIGS. 27(a) and 27(b) will be described later.

As can be seen, in the liquid crystal display device 800 of this embodiment, the liquid crystal domains A through D are arranged in the pixel region differently from the liquid crystal display device 100 of the first embodiment. That is why in this liquid crystal display device 800, the directions in which the slits 11s run in the upper left, lower left, lower right and upper right parts of the pixel electrode 11 are different by approximately 90 degrees as shown in FIG. 25 from in the liquid crystal display device 100 of the first embodiment.

The liquid crystal display device 800 of this embodiment can display an even brighter image than the liquid crystal display device 100 of the first embodiment, because each pixel region is subjected to the alignment division as described above. The reason is that even though in the pixel region P1 shown in FIG. 1, darker regions then elsewhere are produced in the vicinity of the edges of the pixel electrode 11, no such dark regions are produced in the pixel region P5 shown in FIG. 26. Hereinafter, the reason will be described in detail.

Figure 28:
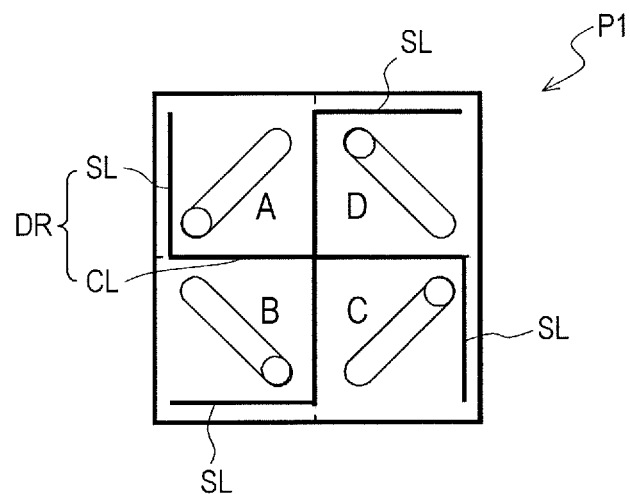
FIG. 28 Illustrates a dark region to be produced when a certain grayscale tone is displayed in the pixel region shown in FIG. 1.

When a certain grayscale tone is being displayed, a region DR which looks darker than the grayscale tone to be displayed is produced in the pixel region P1 as shown in FIG. 28. This dark region DR includes crossed dark lines (cross portion) CL which is located on the boundaries between the liquid crystal domains A, B, C and D and straight dark lines (straight portions) SL which run substantially parallel to the edges of the pixel electrode in the vicinity of the edges, and has a substantially swastika shape overall.

Figure 29:
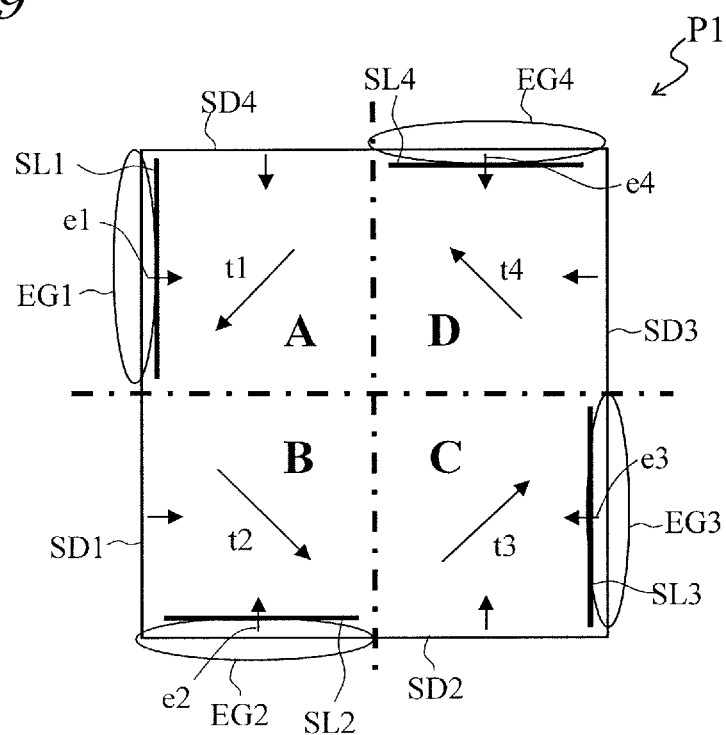
FIG. 29 Shows the reason why those dark lines are produced in the vicinity of the edges of the pixel electrode in the pixel region shown in FIG. 1.

The crossed dark lines CL are produced by inducing the liquid crystal molecules to get aligned either parallel or perpendicular to the transmission axes of the polarizers on the boundaries between the liquid crystal domains so that the liquid crystal molecules are aligned continuously between the liquid crystal domains. On the other hand, the straight dark lines SL are produced in the vicinity of the edges if there are edge portions where azimuthal directions that are perpendicular to the edge portions and that point toward the inside of the pixel electrode define an angle greater than 90 degrees with respect to the tilt directions (reference alignment directions) of the liquid crystal domains around the edges of the pixel electrode to which the liquid crystal domains are located close. In those portions, the liquid crystal molecules would get aligned either parallel or perpendicular to the transmission axes of the polarizers, because the tilt directions of the liquid crystal domains and the direction of the alignment controlling force produced by the oblique electric field that has been generated around the edges of the pixel electrode have components that are opposite from each other. Hereinafter, it will be described more specifically with reference to FIG. 29 why those dark lines SL are produced in the vicinity of the edges. In FIG. 29, illustration of the crossed dark lines is omitted.

As shown in FIG. 29, this pixel electrode has four edges (or sides) SD1, SD2, SD3 and SD4. An oblique electric field to be generated responsive to a voltage applied produces an alignment controlling force that has a component that is perpendicular to any of these sides and that points toward the inside of the pixel electrode (in an azimuthal direction). In FIG. 29, the azimuthal directions that are perpendicular to the four edges SD1, SD2, SD3 and SD4 and that point toward the inside of the pixel electrode are identified by the arrows e1, e2, e3 and e4, respectively.

Each of the four liquid crystal domains A, B, C and D is close to two out of the four edges SD1, SD2, SD3 and SD4 of the pixel electrode. While a voltage is being applied thereto, each liquid crystal domain A, B, C or D is subjected to the alignment controlling forces that have been produced at those edges by the oblique electric field.

In an edge portion EG1 of edges of the pixel electrode, to which the liquid crystal domain A is located close, the azimuthal direction e1 that is perpendicular to the edge portion EG1 and that points toward the inside of the pixel electrode defines an angle greater than 90 degrees with respect to the tilt direction t1 of the liquid crystal domain A. As a result, when a voltage is applied thereto, the liquid crystal domain A produces a dark line SL1 substantially parallel to this edge portion EG1.

In the same way, in an edge portion EG2 of edges of the pixel electrode, to which the liquid crystal domain B is located close, the azimuthal direction e2 that is perpendicular to the edge portion EG2 and that points toward the inside of the pixel electrode defines an angle greater than 90 degrees with respect to the tilt direction t2 of the liquid crystal domain B. As a result, when a voltage is applied thereto, the liquid crystal domain B produces a dark line SL2 substantially parallel to this edge portion EG2.

In the same way, in an edge portion EG3 of edges of the pixel electrode, to which the liquid crystal domain C is located close, the azimuthal direction e3 that is perpendicular to the edge portion EG3 and that points toward the inside of the pixel electrode defines an angle greater than 90 degrees with respect to the tilt direction t3 of the liquid crystal domain C. As a result, when a voltage is applied thereto, the liquid crystal domain C produces a dark line SL3 substantially parallel to this edge portion EG3.

In the same way, in an edge portion EG4 of edges of the pixel electrode, to which the liquid crystal domain D is located close, the azimuthal direction e4 that is perpendicular to the edge portion EG4 and that points toward the inside of the pixel electrode defines an angle greater than 90 degrees with respect to the tilt direction t4 of the liquid crystal domain D. As a result, when a voltage is applied thereto, the liquid crystal domain D produces a dark line SL4 substantially parallel to this edge portion EG4.

The angle defined by any of the tilt directions t1, t2, t3 and t4 of the liquid crystal domains A, B, C and D with respect to an associated one of the azimuthal components e1, e2, e3 and e4 of the alignment controlling forces produced by the oblique electric fields at the nearby edge portions EG1, EG2, EG3 and EG4 is approximately 135 degrees.

In this manner, in the pixel region P1, dark lines SL are produced in the vicinity of the edges of the pixel electrode. Likewise, as shown in FIGS. 30(a), 30(b) and 30(c), dark lines SL1 through SL4 are produced in the vicinity of the edges of the pixel electrode in the pixel regions P2, P3 and P4 shown in FIGS. 3(c), 4(c) and 5(c), too.

Figure 30:
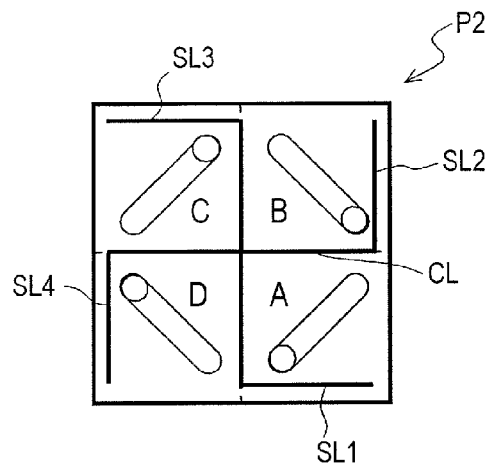
FIG. 30 (a) illustrates a dark region to be produced when a certain grayscale tone is displayed in the pixel region shown in FIG. 3(c), (b) illustrates a dark region to be produced when a certain grayscale tone is displayed in the pixel region shown in FIG. 4(c), and (c) illustrates a dark region to be produced when a certain grayscale tone is displayed in the pixel region shown in FIG. 5(c).
Figure 30:
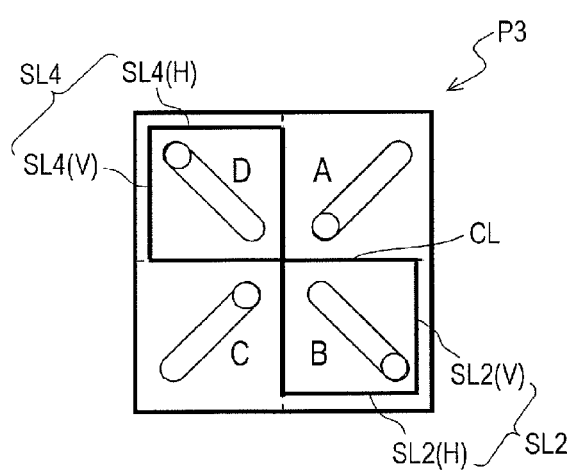
Figure 30:
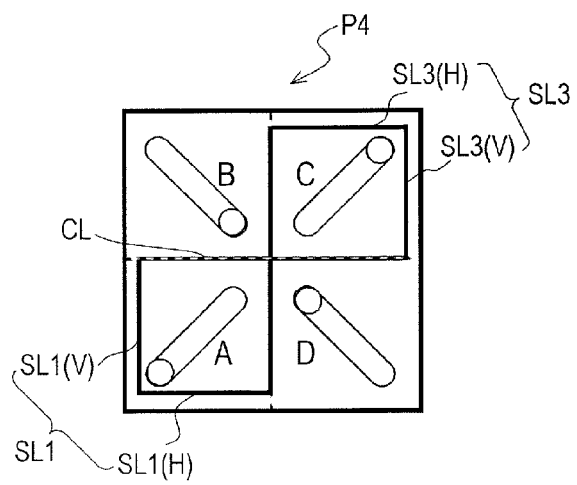

When a certain grayscale tone is being displayed, a region which looks darker than the grayscale tone to be displayed is also produced in the pixel region P2 as shown in FIG. 30(a). This dark region includes crossed dark lines CL which are located on the boundaries between the liquid crystal domains A, B, C and D and straight dark lines SL1 through SL4 which are produced in the vicinity of the edges of the pixel electrode, and has a substantially swastika shape overall.

When a certain grayscale tone is being displayed, a region which looks darker than the grayscale tone to be displayed is also produced in the pixel region P3 as shown in FIG. 30(b). This dark region includes crossed dark lines CL which are located on the boundaries between the liquid crystal domains A, B, C and D and straight dark lines SL2 and SL4 which are produced in the vicinity of the edges of the pixel electrode, and has a substantially numeral eight shape (more exactly, the shape of numeral eight that is tilted with respect to the perpendicular direction) overall. In the pixel region P3, no dark lines are produced in the liquid crystal domains A and C, because the edges of the pixel electrode which are close to the liquid crystal domains A and C have no edge portions where azimuthal directions that are perpendicular to the edge portions and that point toward the inside of the pixel electrode define an angle greater than 90 degrees with respect to the tilt direction. On the other hand, dark lines SL2 and SL4 are produced in the liquid crystal domains B and D, because the edges of the pixel electrode which are close to the liquid crystal domains B and D have edge portions where azimuthal directions that are perpendicular to the edge portions and that point toward the inside of the pixel electrode define an angle greater than 90 degrees with respect to the tilt direction. Also, each of the dark lines SL2 and SL4 includes a portion SL2(H), SL4(H) that is parallel to the horizontal direction and a portion SL2(V), SL4(V) that is parallel to the vertical direction. The reason is that in each of the liquid crystal domains B and D, the tilt direction defines an angle greater than 90 degrees with respect to the azimuthal direction that is perpendicular to the edge portion and that points toward the inside of the pixel electrode in both of the horizontal and vertical edge portions.

When a certain grayscale tone is being displayed, a region which looks darker than the grayscale tone to be displayed is also produced in the pixel region P4 as shown in FIG. 30(c). This dark region includes crossed dark lines CL which are located on the boundaries between the liquid crystal domains A, B, C and D and straight dark lines SL1 and SL3 which are produced in the vicinity of the edges of the pixel electrode, and has a substantially numeral eight shape overall. In the pixel region P4, no dark lines are produced in the liquid crystal domains B and D, because the edges of the pixel electrode which are close to the liquid crystal domains B and D have no edge portions where azimuthal directions that are perpendicular to the edge portions and that point toward the inside of the pixel electrode define an angle greater than 90 degrees with respect to the tilt direction. On the other hand, dark lines SL1 and SL3 are produced in the liquid crystal domains A and C, because the edges of the pixel electrode which are close to the liquid crystal domains A and C have edge portions where azimuthal directions that are perpendicular to the edge portions and that point toward the inside of the pixel electrode define an angle greater than 90 degrees with respect to the tilt direction. Also, each of the dark lines SL1 and SL3 includes a portion SL1(H), SL3(H) that is parallel to the horizontal direction and a portion SL1(V), SL3(V) that is parallel to the vertical direction. The reason is that in each of the liquid crystal domains A and C, the tilt direction defines an angle greater than 90 degrees with respect to the azimuthal direction that is perpendicular to the edge portion and that points toward the inside of the pixel electrode in both of the horizontal and vertical edge portions.

Figure 31:
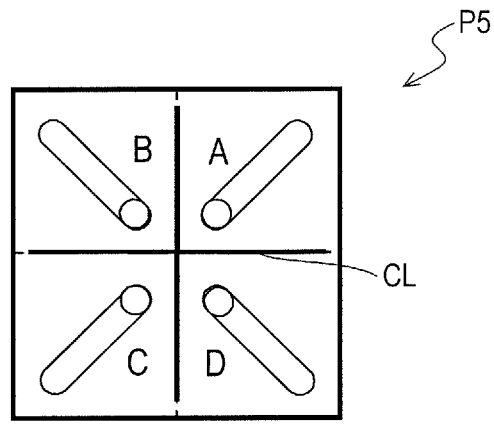
FIG. 31 Illustrates a dark region to be produced when a certain grayscale tone is displayed in the pixel region shown in FIG. 26.

As described above, by adopting the arrangements of the liquid crystal domains A through D for these pixel regions P1 through P4, dark lines SL are produced in the vicinity of the edges of the pixel electrode. As for the pixel region P5, on the other hand, crossed dark lines CL are certainly produced on the boundaries between the liquid crystal domains A, B, C and D but no dark lines SL are produced in the vicinity of the edges of the pixel electrode as shown in FIG. 31.

Figure 32:
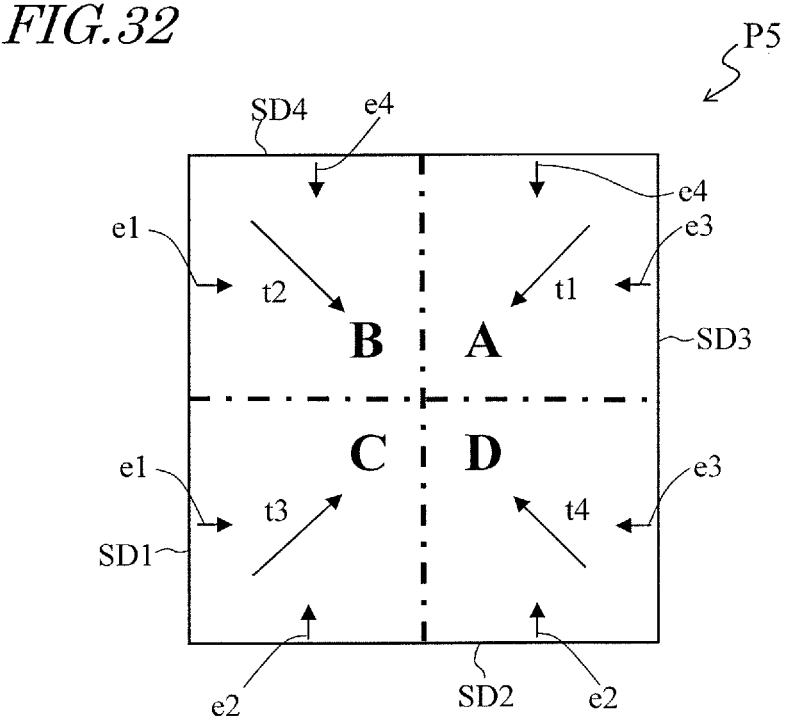
FIG. 32 Shows the reason why no dark lines are produced in the vicinity of the edges of the pixel electrode in the pixel region shown in FIG. 26.

Hereinafter, it will be described with reference to FIG. 32 why no dark lines SL are produced in the vicinity of the edges. In FIG. 32, illustration of crossed dark lines CL is omitted.

Portions of the edges of the pixel electrode which are located close to the liquid crystal domain A (i.e., the upper half of the edge SD3 and the right half of the edge SD4) include no edge portions where azimuthal directions e3, e4 that are perpendicular to the edge portions and that point toward the inside of the pixel electrode define an angle greater than 90 degrees with respect to the tilt direction t1 of the liquid crystal domain A. Specifically, the tilt direction t1 of the liquid crystal domain A defines an angle of approximately 45 degrees with respect to the azimuthal directions e3 and e4. Consequently, in the liquid crystal domain A, no straight dark lines SL are produced in the vicinity of the edges of the pixel electrode upon the application of a voltage.

In the same way, portions of the edges of the pixel electrode which are located close to the liquid crystal domain B (i.e., the upper half of the edge SD1 and the left half of the edge SD4) include no edge portions where azimuthal directions e1, e4 that are perpendicular to the edge portions and that point toward the inside of the pixel electrode define an angle greater than 90 degrees with respect to the tilt direction t2 of the liquid crystal domain B. Specifically, the tilt direction t2 of the liquid crystal domain B defines an angle of approximately 45 degrees with respect to the azimuthal directions e1 and e4. Consequently, in the liquid crystal domain B, no straight dark lines SL are produced in the vicinity of the edges of the pixel electrode upon the application of a voltage.

In the same way, portions of the edges of the pixel electrode which are located close to the liquid crystal domain C (i.e., the lower half of the edge SD1 and the left half of the edge SD2) include no edge portions where azimuthal directions e1, e2 that are perpendicular to the edge portions and that point toward the inside of the pixel electrode define an angle greater than 90 degrees with respect to the tilt direction t3 of the liquid crystal domain C. Specifically, the tilt direction t3 of the liquid crystal domain C defines an angle of approximately 45 degrees with respect to the azimuthal directions e1 and e2. Consequently, in the liquid crystal domain C, no straight dark lines SL are produced in the vicinity of the edges of the pixel electrode upon the application of a voltage.

In the same way, portions of the edges of the pixel electrode which are located close to the liquid crystal domain D (i.e., the right half of the edge SD2 and the lower half of the edge SD3) include no edge portions where azimuthal directions e2, e3 that are perpendicular to the edge portions and that point toward the inside of the pixel electrode define an angle greater than 90 degrees with respect to the tilt direction t4 of the liquid crystal domain D. Specifically, the tilt direction t4 of the liquid crystal domain D defines an angle of approximately 45 degrees with respect to the azimuthal directions e2 and e3. Consequently, in the liquid crystal domain D, no straight dark lines SL are produced in the vicinity of the edges of the pixel electrode upon the application of a voltage.

As can be seen, in the pixel region P5, no dark lines SL are produced in the vicinity of any edges of the pixel electrode. That is why the liquid crystal display device 800 of this embodiment, of which each pixel region is subjected to the alignment division in the same way as the pixel region P5, can display an even brighter image than the liquid crystal display device 100 of the first embodiment.

Next, it will be described how to carry out an alignment division as what is performed on the pixel region P5 (i.e., how to subject the rear and front substrates to the alignment treatment shown in FIGS. 27(a) and 27(b)).

If the rear substrate is subjected to the alignment treatment shown in FIG. 27(a), the respective pretilt directions PA1 and PA2 given to the vertical alignment film in the upper and lower parts of a single pixel region P5 intersect with the boundary (which runs horizontally) between the upper and lower parts at substantially right angles. On the other hand, if the front substrate is subjected to the alignment treatment shown in FIG. 27(b), the respective pretilt directions PB1 and PB2 given to the vertical alignment film in the right and left parts of a single pixel region P5 intersect with the boundary (which runs vertically) between the right and left parts at substantially right angles. If the two pretilt directions given to the vertical alignment film of each of those substrates and the boundary between those parts satisfy the relation described above, two pretilt directions which are antiparallel to each other can be given to the vertical alignment film on each substrate through a single exposure (UV ray radiation) process.

Figure 33:
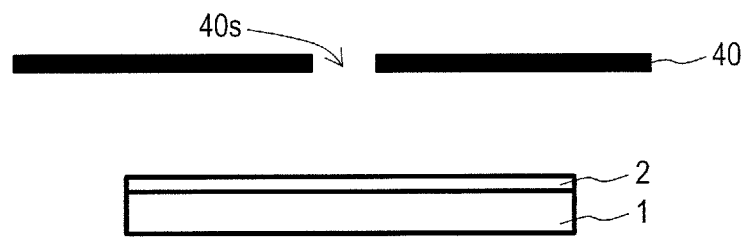
FIG. 33 (a), (b) and (c) illustrate how to subject rear and front substrates to the alignment treatment as shown in FIGS. 27(a) and 27(b).
Figure 33:
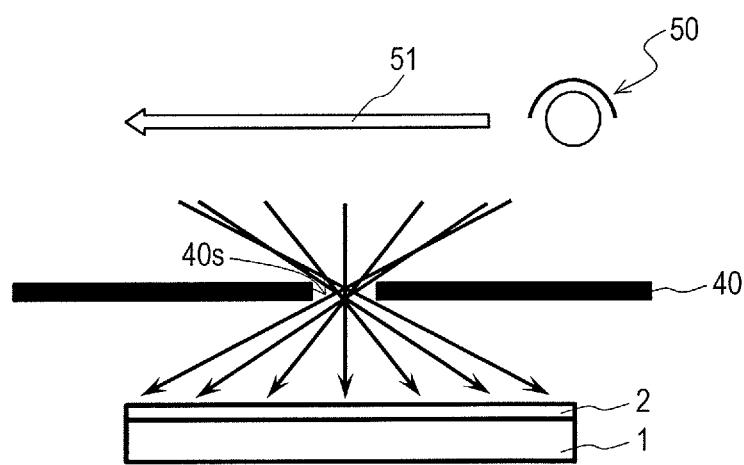
Figure 33:
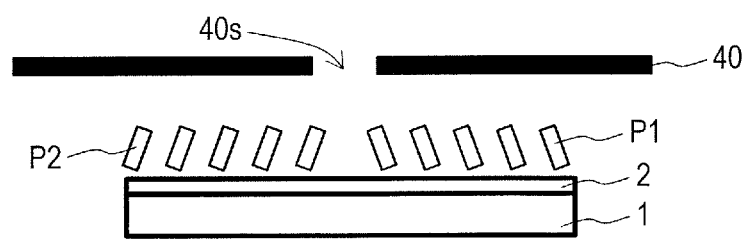
Figure 34:
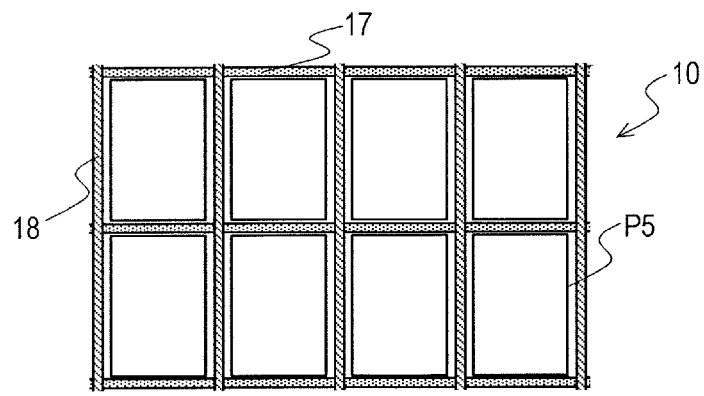
FIG. 34 (a), (b) and (c) show an exemplary specific relative arrangement of a photomask with respect to an active-matrix substrate in a situation where the active-matrix substrate (rear substrate) is subjected to the alignment treatment shown in FIG. 27(a).
Figure 34:
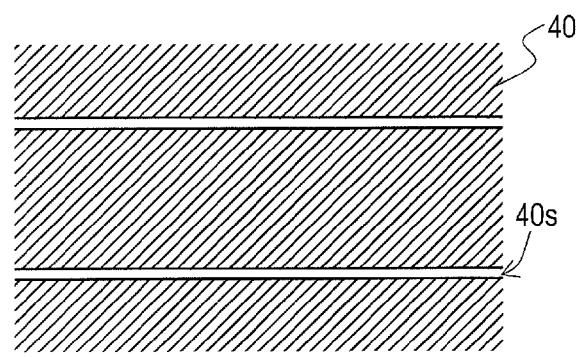
Figure 34:
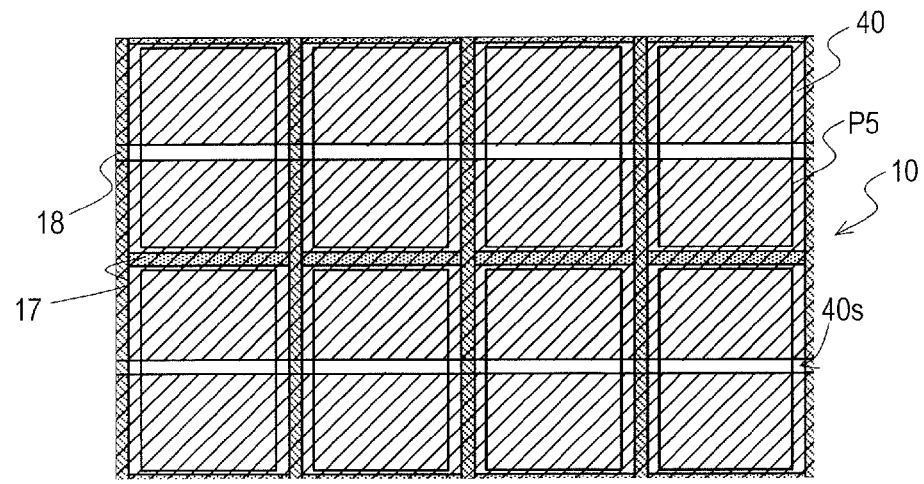
Figure 35:
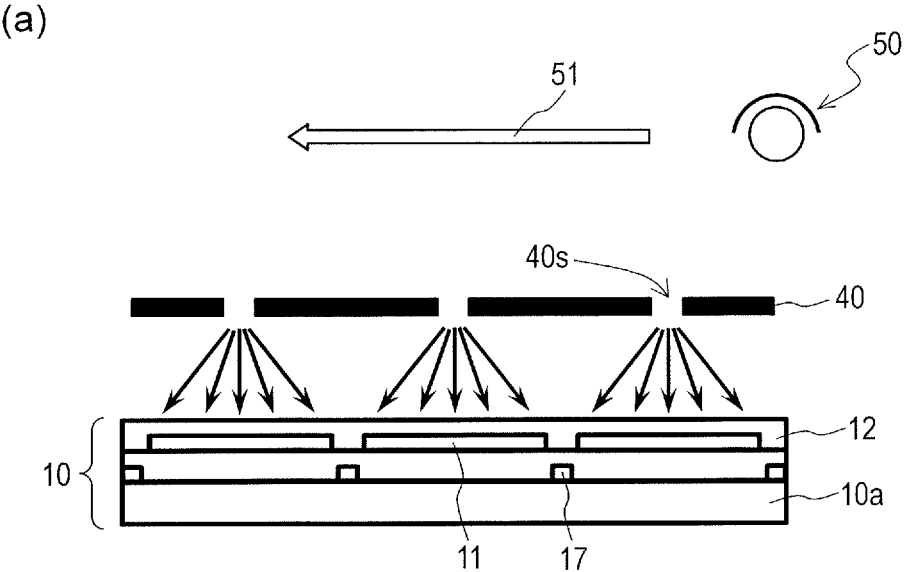
FIG. 35 (a) and (b) show an exemplary specific relative arrangement of a photomask with respect to an active-matrix substrate in a situation where the active-matrix substrate (rear substrate) is subjected to the alignment treatment shown in FIG. 27(a).
Figure 35:
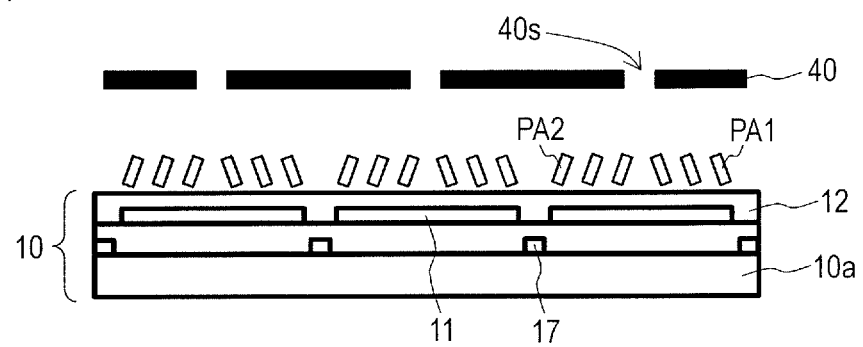
Figure 36:
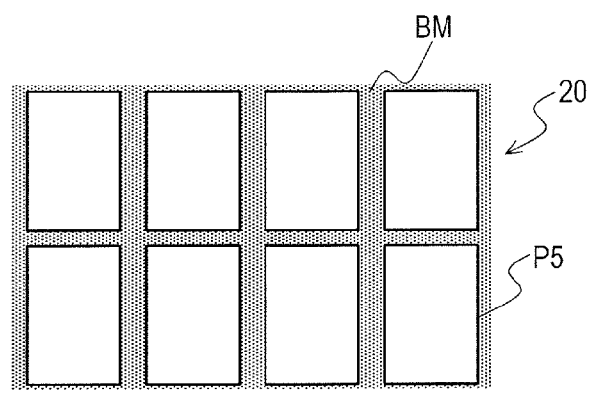
FIG. 36 (a), (b) and (c) show an exemplary specific relative arrangement of a photomask with respect to a counter substrate in a situation where the counter substrate (front substrate) is subjected to the alignment treatment shown in FIG. 27(b).
Figure 36:
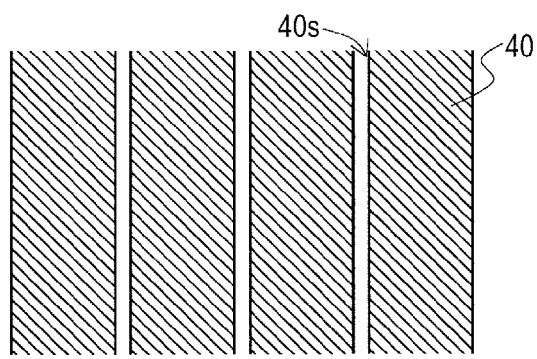
Figure 36:
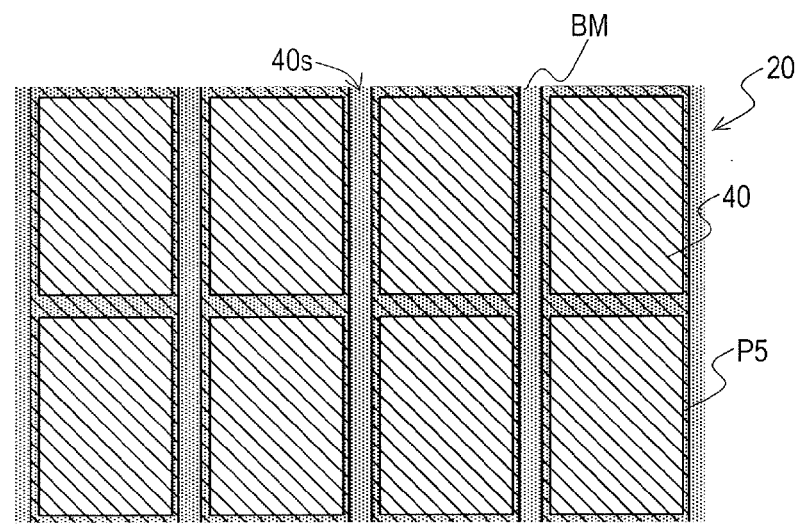
Figure 37:
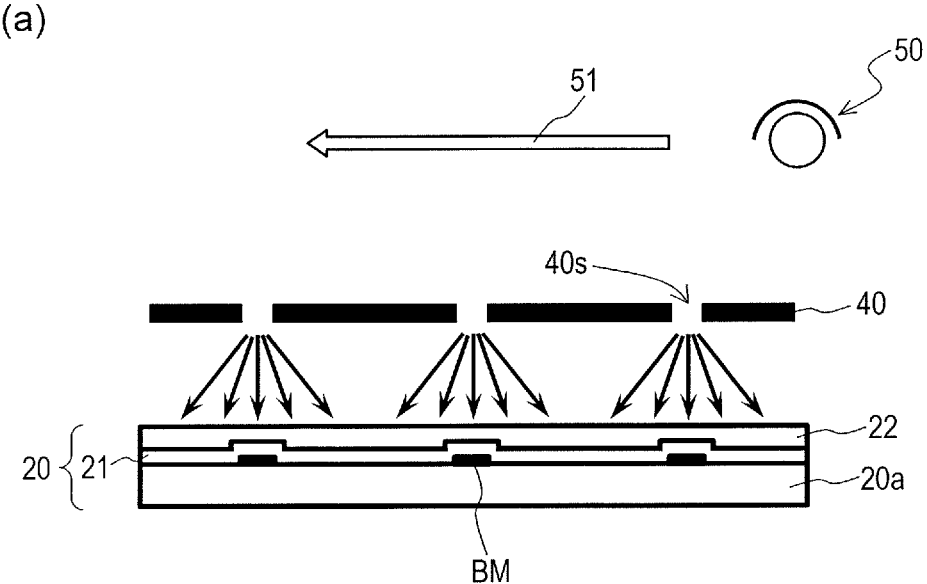
FIG. 37 (a) and (b) show an exemplary specific relative arrangement of a photomask with respect to a counter substrate in a situation where the counter substrate (front substrate) is subjected to the alignment treatment shown in FIG. 27(a).
Figure 37:
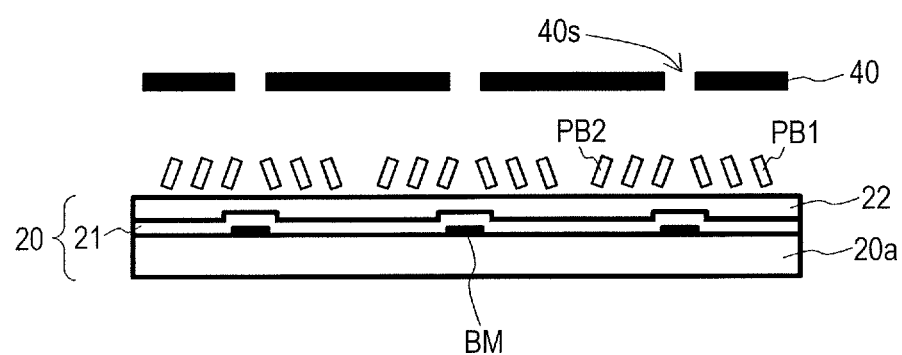

First of all, as shown in FIG. 33(a), a photomask 40, through which a slit 40s has been cut is provided, and is arranged at a predetermined distance from a substrate 1 which is covered with a photo-alignment film 2.

Next, as shown in FIG. 33(b), an exposure process is carried out with a light source 50 which emits an ultraviolet ray (such as a UV ray lamp) moved in a direction 51 that intersects at right angles with the direction in which the slit 40s runs. As a result, the ultraviolet ray emitted from the light source 50 irradiates the photo-alignment film 2 as diffused light through the slit 40s.

Consequently, pretilt directions P1 and P2 which are antiparallel to each other are given to two regions of the photo-alignment film 2, of which the boundary is located right under the slit 40s as shown in FIG. 33(c).

Hereinafter, an exemplary specific arrangement of the photomask 40 with respect to an active-matrix substrate (rear substrate) 10 and an exemplary specific arrangement of the photomask 40 with respect to a counter substrate (front substrate) 20 will be described with reference to FIGS. 34 through 37.

In subjecting an active-matrix substrate 10 to an alignment treatment, first of all, an active-matrix substrate 10 including a plurality of scan lines 17 and a plurality of signal lines 18 is provided as shown in FIG. 34(a). In the example illustrated in FIG. 34(a), each pixel region P5 is surrounded with the scan lines 17 and the signal lines 18. The top surface of the active-matrix substrate 10 is covered with a photo-alignment film 12 (not shown).

Meanwhile, while the active-matrix substrate 10 is being provided, a photomask 40 with a plurality of slits 40s is provided separately as shown in FIG. 34(b). Those slits 40s run laterally (i.e., horizontally).

Then, the active-matrix substrate 10 and the photomask 40 are arranged so that the slits 40s of the photomask 40 run through the middle of the pixel region P5 as shown in FIG. 34(c).

In this state, the exposure process is carried out with the light source 50 moved in the direction 51 that intersects at right angles with the direction in which the slits 40s run as shown in FIG. 35(a). As a result, the ultraviolet ray emitted from the light source 50 irradiates the photo-alignment film 12 as diffused light through the slits 40s.

Consequently, pretilt directions PA1 and PA2 which are antiparallel to each other are given to two regions of the photo-alignment film 12, of which the boundary is located right under the slit 40s as shown in FIG. 35(b).

In subjecting a counter substrate 20 to an alignment treatment, first of all, a counter substrate 10 with a black matrix (opaque layer) BM is provided as shown in FIG. 36(a). The black matrix BM may be made of resin and fills the gap between the pixel regions P5. The top surface of the counter substrate 20 is covered with a photo-alignment film 22 (not shown).

Meanwhile, while the counter substrate 20 is being provided, a photomask 40 with a plurality of slits 40s is provided separately as shown in FIG. 36(b). Those slits 40s run longitudinally (i.e., vertically).

Then, the counter substrate 20 and the photomask 40 are arranged so that the slits 40s of the photomask 40 run through the gaps between the pixel regions P5 as shown in FIG. 36(c).

In this state, the exposure process is carried out with the light source 50 moved in the direction 51 that intersects at right angles with the direction in which the slits 40s run as shown in FIG. 37(a). As a result, the ultraviolet ray emitted from the light source 50 irradiates the photo-alignment film 22 as diffused light through the slits 40s.

Consequently, pretilt directions PB1 and PB2 which are antiparallel to each other are given to two regions of the photo-alignment film 22, of which the boundary is located right under the slit 40s as shown in FIG. 37(b).

(Embodiment 9)

Figure 38:
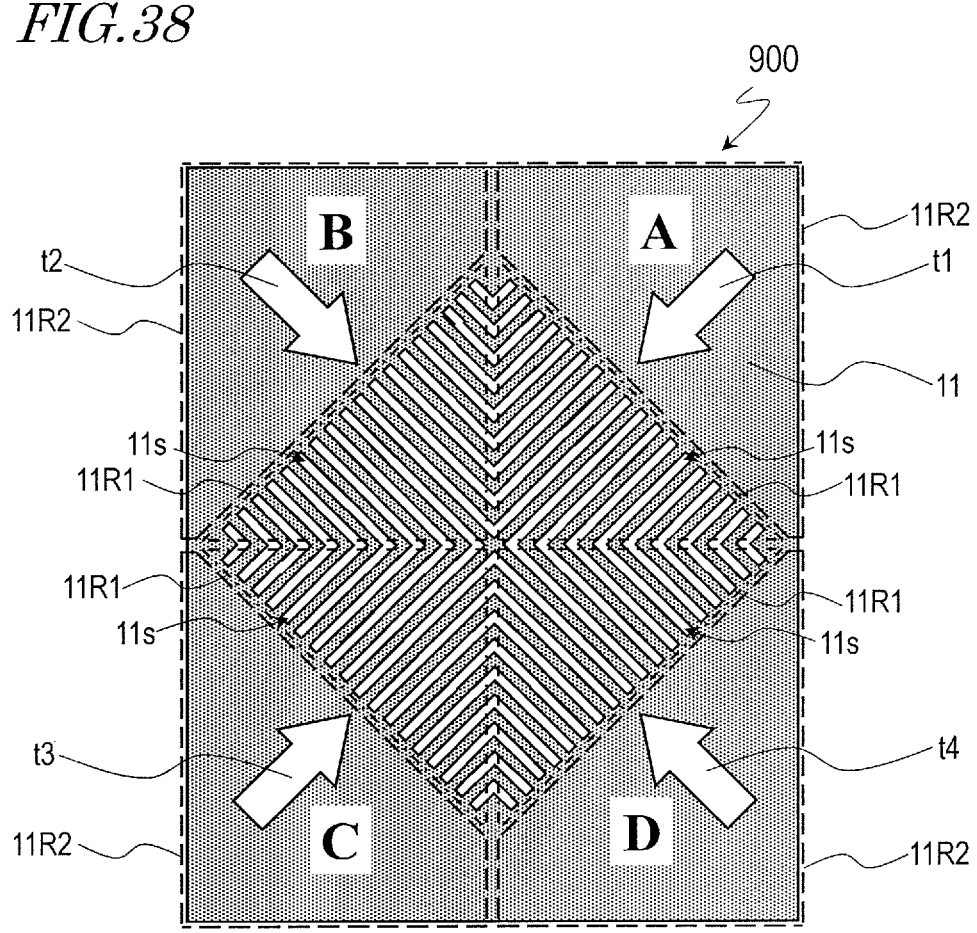
FIG. 38 A plan view schematically illustrating a single pixel region of a liquid crystal display device 900 according to an embodiment of the present invention.

FIG. 38 is a plan view schematically illustrating a single pixel region of a liquid crystal display device 900 as a ninth embodiment of the present invention.

In the liquid crystal display device 900 of this embodiment, the relative positions of the slit cut regions 11R1 and slit uncut regions 11R2 in the pixel electrode 11 are different from in the liquid crystal display device 800 of the eighth embodiment.

Specifically, according to this embodiment, in the regions of the pixel electrode 11 allocated to the liquid crystal domains A and B, the slit cut regions 11R1 form a relatively lower part and the slit uncut regions 11R2 form a relatively upper part as shown in FIG. 38. On the other hand, in the regions of the pixel electrode 11 allocated to the liquid crystal domains C and D, the slit cut regions 11R1 form a relatively upper part and the slit uncut regions 11R2 form a relatively lower part. That is to say, although the slits 11s are arranged in the upper and lower parts of the pixel region in the liquid crystal display device 800 of the eighth embodiment, the slits 11s are arranged around the center of the pixel region in the liquid crystal display device 900 of this embodiment. That is why in this embodiment, the dark subpixel is located at the center of a pixel, one half of the bright subpixel is located in the upper part of the pixel, and the other half of the bright subpixel is located in the lower part of the pixel.

The liquid crystal display device 900 of this embodiment can also reduce the viewing angle dependence of the γ characteristic. In addition, the liquid crystal display device 9800 of this embodiment can also stabilize the alignments around the center of the pixel region thanks to the alignment controlling force of the slits 11s which are located in the central part of the pixel region. It should be noted that by adopting a configuration in which the slits 11s are located in the upper and lower parts of the pixel region (i.e., in outer parts of the pixel region) as in the liquid crystal display device 800 of the eighth embodiment, not in the central part of the pixel region, the adverse effects of an oblique electric field, generated due to the potentials on the scan lines 17, signal lines 18 and other bus lines, on the alignments can be reduced, which is advantageous.

(Embodiment 10)

Figure 39:
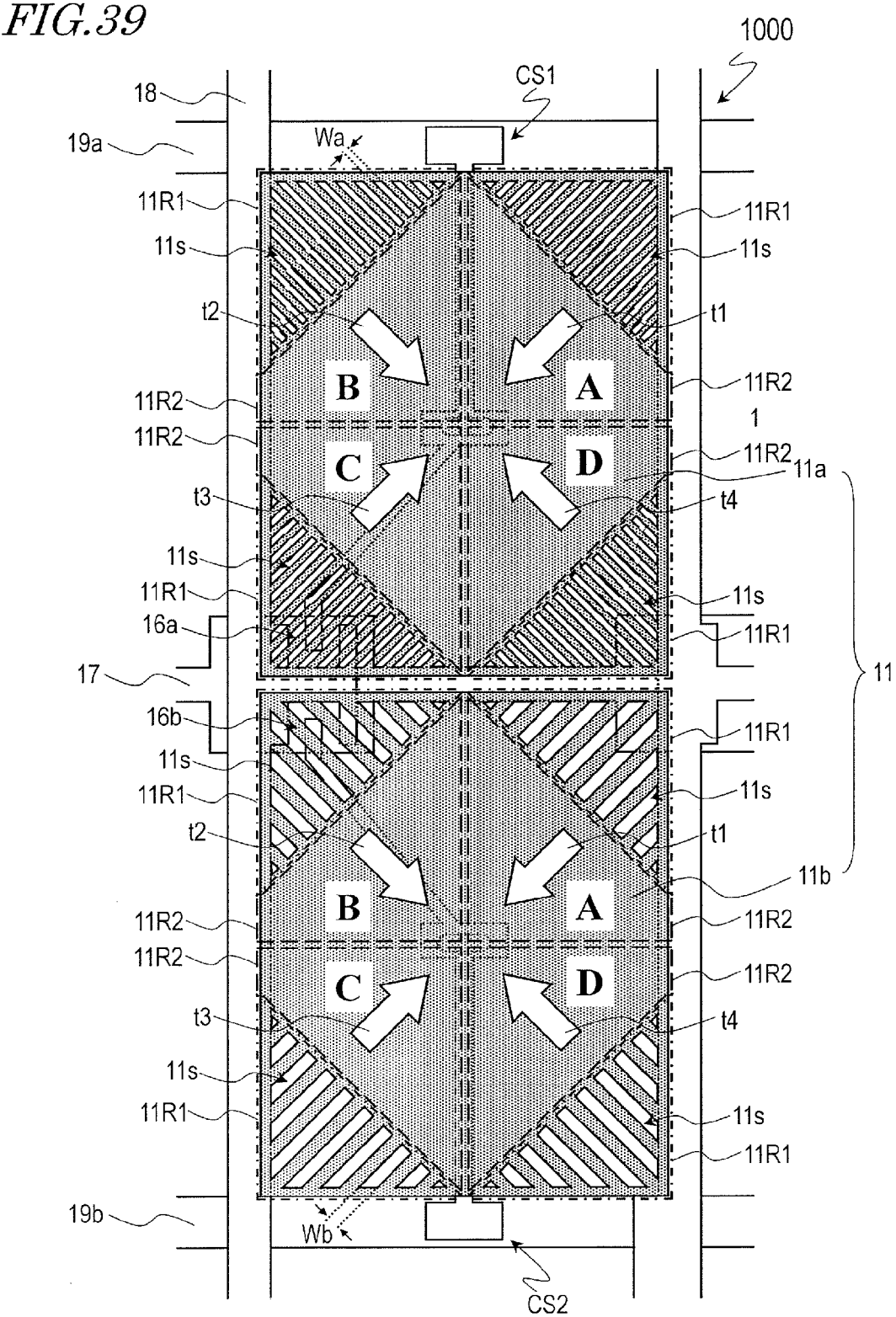
FIG. 39 A plan view schematically illustrating a single pixel region of a liquid crystal display device 1000 according to an embodiment of the present invention.

FIG. 39 is a plan view schematically illustrating a single pixel region of a liquid crystal display device 1000 as a tenth embodiment of the present invention.

The liquid crystal display device 1000 of this embodiment uses the pixel division driving technique, which a major difference from the liquid crystal display device 800 of the eighth embodiment. As shown in FIG. 39, each pixel electrode 11 of the liquid crystal display device 1000 includes a plurality of (e.g., two in this example) subpixel electrodes 11a and 11b. One of the two subpixel electrodes 11a and 11b (which will be referred to herein as a "first subpixel electrode 11a") is connected to a first TFT 16a and a first storage capacitor CS1. The other subpixel electrode 11b (which will be referred to herein as a "second subpixel electrode 11b") is connected to a second TFT 16b and a second storage capacitor CS2. Each pixel region of the liquid crystal display device 1000 includes a plurality of (e.g., two in this example) subpixel regions corresponding to those subpixel electrodes 11a and 11b.

The respective gate electrodes of the first and second TFTs 16a and 16b are connected to the same scan line 17 in common. On the other hand, the respective source electrodes of the first and second TFTs 16a and 16b are connected to the same signal line 18 in common.

The first storage capacitor CS1 is connected to a first storage capacitor line 19a, while the second storage capacitor CS2 is connected to a second storage capacitor line 19b. One of the two electrodes that form the first storage capacitor CS1 (which is a storage capacitor counter electrode that forms part of the first storage capacitor line 19a in this example) is supplied with a storage capacitor counter voltage through the first storage capacitor line 19a. On the other hand, one of the two electrodes that form the second storage capacitor CS2 (which is a storage capacitor counter electrode that forms part of the second storage capacitor line 19b in this example) is supplied with a storage capacitor counter voltage through the second storage capacitor line 19b. The respective storage capacitor counter electrodes of the first and second storage capacitors CS1 and CS2 are independent of each other, and therefore, can be supplied with mutually different storage capacitor counter voltages (which will be referred to herein as "CS voltages") through their associated storage capacitor lines (i.e., the first and second storage capacitor lines 19a and 19b).

If after the first and second TFTs 16a and 16b have been turned OFF by supplying a display signal voltage to the first and second subpixel electrodes 11a and 11b through the same signal line 18, the voltages applied to the storage capacitor counter electrodes of the first and second storage capacitors CS1 and CS2 (i.e., the voltages supplied through the first and second storage capacitor lines 19a and 19b) have different variations (which are defined by the directions and magnitudes of the variations), the voltages applied to the first and second subpixel electrodes 11a and 11b can be different from each other by using the capacitance division technique.

In this liquid crystal display device 1000, each of the two subpixel regions has four liquid crystal domains A, B, C and D. Each of the first and second subpixel electrodes 11a and 11b has slit cut regions 11R1 and slit uncut regions 11R2 in the regions allocated to those liquid crystal domains A, B, C and D. That is why in each of the two subpixel regions, there are two regions in which mutually different effective voltages are applied to the liquid crystal layer 30. That is why in the liquid crystal display device 1000 of this embodiment, four regions in which mutually different effective voltages are applied to the liquid crystal layer 30 can be defined in a single pixel region. Consequently, the effect of reducing the viewing angle dependence of the γ characteristic can be achieved even more significantly.

It should be noted that the liquid crystal display device 1000 of this embodiment uses the pixel division driving technique, and therefore, needs to have a little more complicated circuit configuration than the liquid crystal display devices 800 of the eighth embodiment described above. However, by using the pixel electrode 11 including the slit cut regions 11R1 and the pixel division driving technique as in this embodiment, the pixel division number can be increased (i.e., the viewing angle dependence of the γ characteristic can be reduced) more significantly with a similar circuit configuration, compared to a situation where just the pixel division driving technique is simply used. In other words, if the viewing angle dependence of the γ characteristic should be reduced to approximately the same degree, the combined use of the pixel electrode 11 including the slit cut regions 11R1 and the pixel division driving technique can simplify the circuit configuration, compared to a situation where just the pixel division driving technique is used.

In the exemplary configuration shown in FIG. 39, the width Wa of the slits 11s that have been cut through the first subpixel electrode 11a is different from the width Wb of the slits his that have been cut through the second subpixel electrode 11b. However, these widths Wa and Wb of the first and second subpixel electrodes 11a and 11b may naturally be the same.

(Embodiment 11)

Figure 40:
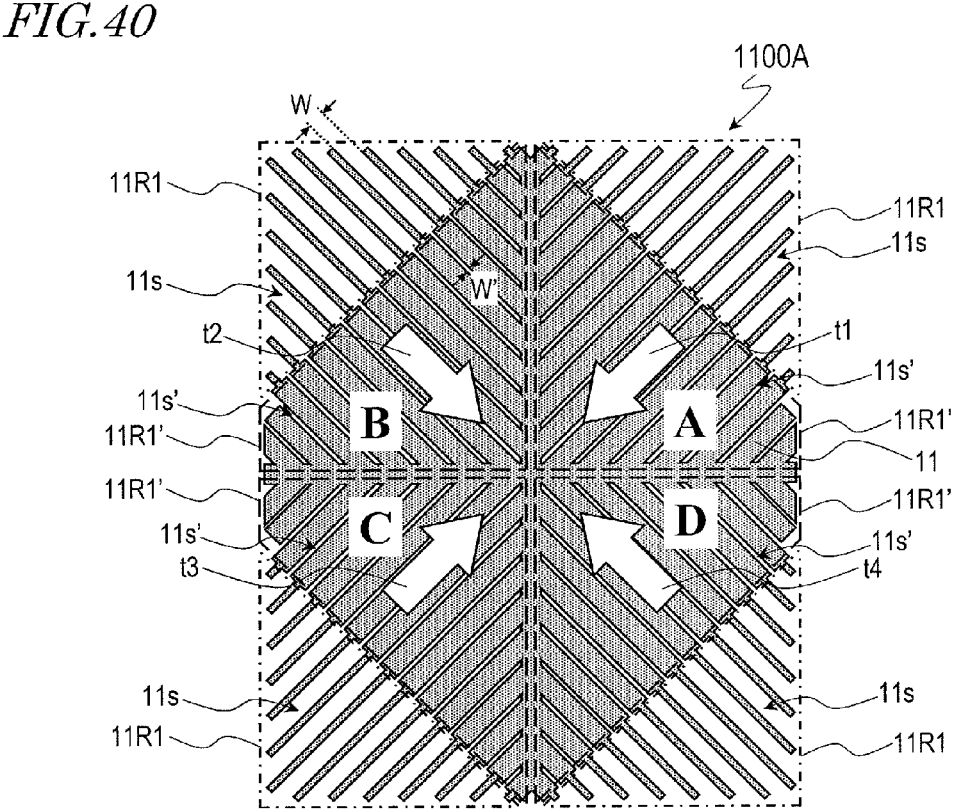
FIG. 40 A plan view schematically illustrating a single pixel region of a liquid crystal display device 1100A according to an embodiment of the present invention.
Figure 41:
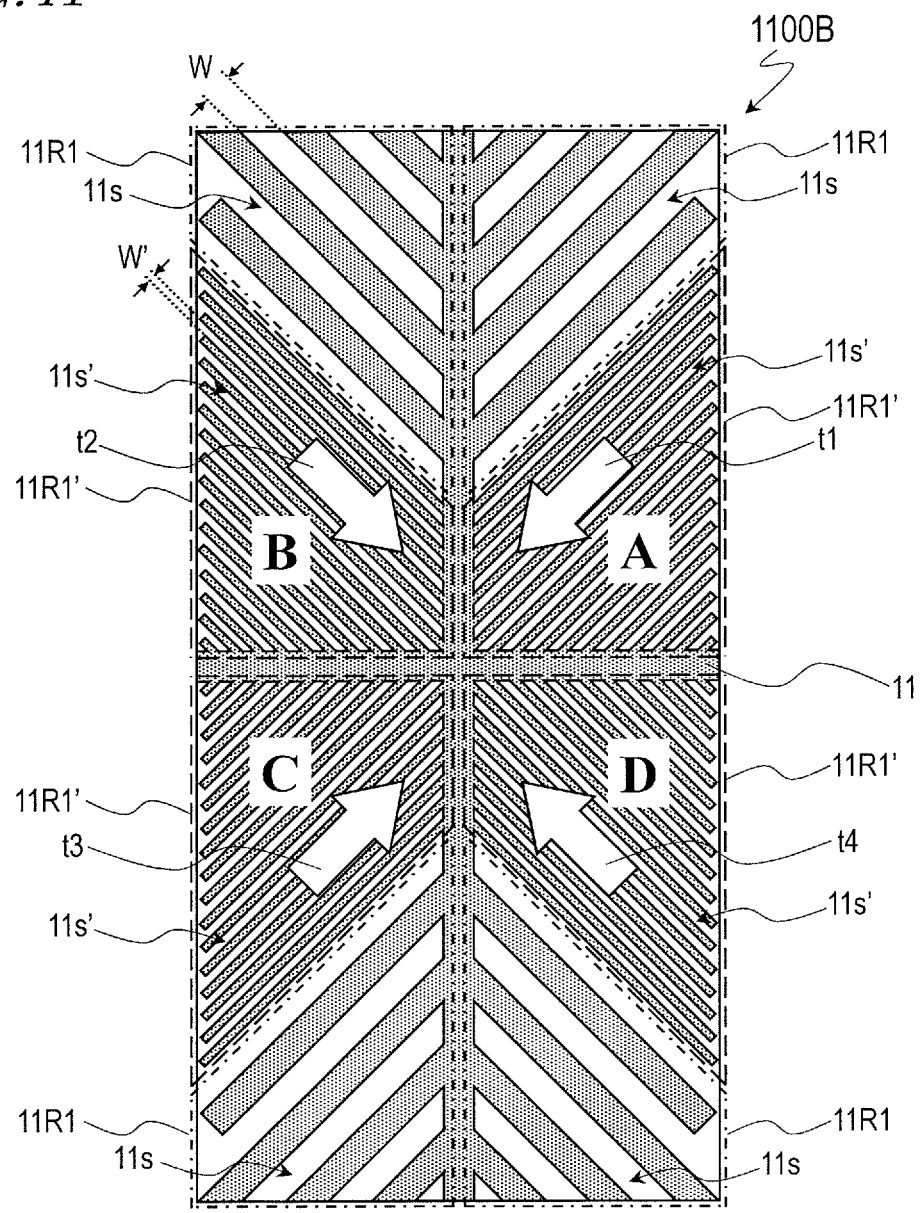
FIG. 41 A plan view schematically illustrating a single pixel region of a liquid crystal display device 1100B according to an embodiment of the present invention.

FIGS. 40 and 41 are plan views schematically illustrating a single pixel region of liquid crystal display devices 1100A and 1100B according to an eleventh embodiment of the present invention.

In the liquid crystal display devices 1100A and 1100B of this embodiment, the pixel electrode 11 has no slit uncut regions 11R2, which is a major difference from the liquid crystal display device 800 of the eighth embodiment.

As shown in FIGS. 40 and 41, the pixel electrode 11 of these liquid crystal display devices 1100A and 1100B has slit cut regions (first slit cut regions) 11R1 in parts of the regions allocated to the liquid crystal domains A, B, C and D. The pixel electrode 11 of these liquid crystal display devices 1100A and 1100B also has additional slit cut regions (second slit cut regions) 11R1', through which additional slits 11s' with a different width W' from the width W of the slits 11s in the slit cut regions 11R1 have been cut.

The width W of the slits 11s in the first slit cut regions 11R1 and the width W' of the slits 11s' in the second slit cut regions 11R1' have been set so that when the highest grayscale voltage is applied to the pixel electrode 11, the effective applied voltage will decrease by at least 0.5 V and the alignment direction of the liquid crystal molecules 30a will shift with respect to the reference alignment direction by less than 45 degrees. Also, in the exemplary configuration illustrated in FIGS. 40 and 41, the width W of the slits 11s in the first slit cut regions 11R1 is greater than the width W' of the slits 11s' in the second slit cut regions 11R1'.

In these liquid crystal display devices 1100A and 1100B, the width W of the slits 11s in the first slit cut regions 11R1 is different from the width W' of the slits 11s' in the second slit cut regions 11R1'. That is why the magnitude of a decrease in the voltage applied to the liquid crystal layer 30 over the first slit cut regions 11R1 is different from that of a decrease in the voltage applied to the liquid crystal layer 30 over the second slit cut regions 11R1'. Consequently, in each liquid crystal domain, there are two regions in which mutually different voltages are applied to the liquid crystal layer 30, i.e., the first slit cut region 11R1 in which a relatively low voltage is applied and the second slit cut region 11R1' in which a relatively high voltage is applied. As a result, the viewing angle dependence of the γ characteristic can be reduced.

It should be noted that to reduce the viewing angle dependence of the γ characteristic sufficiently, the difference between the magnitudes of a decrease in effective voltages applied to respective portions of the liquid crystal layer 30 over the first and second slit cut regions 11R1 and 11R1' is suitably at least 0.5 V, and more suitably, 1.0 V or more.

In addition, this configuration in which the pixel electrode 11 has such additional slit cut regions (i.e., second slit cut regions) 11R1' instead of the slit uncut regions 11R2 can also further stabilize the alignments of the liquid crystal molecules as well, which is also advantageous. Meanwhile, the configuration in which the pixel electrode 11 has the slit uncut regions (solid regions) 11R2 as in the liquid crystal display device 800 of the eighth embodiment described above can maximize the difference in the effective voltage applied to the liquid crystal layer 30, which is also beneficial.

INDUSTRIAL APPLICABILITY

According to an embodiment of the present invention, the viewing angle dependence of the γ characteristic of a VA mode liquid crystal display device can be reduced sufficiently by using a relatively simple circuit configuration. A liquid crystal display device according to the present invention can be used effectively in a TV receiver or in any other application that requires high display quality.

REFERENCE SIGNS LIST 10 active-matrix substrate
11 pixel electrode
11s, 11s', 11s1, 11s2 slit
11R1 slit cut region (first slit cut region)
11R1' additional slit cut region (second slit cut region)
11R2 slit uncut region (solid region)
12 first photo-alignment film
13, 23 polarizer
14 dielectric layer
15 lower electrode
16 thin-film transistor (TFT)
17 scan line
18 signal line
19 storage capacitor line
20 counter substrate
21 counter electrode
22 second photo-alignment film
30 liquid crystal layer
30a liquid crystal molecules
100, 200, 300, 400, 500 liquid crystal display device
600A, 600B, 600C, 700 liquid crystal display device
800, 900, 1000, 1100A, 1100B liquid crystal display device
A, B, C, D, E, F liquid crystal domain
t1, t2, t3, t4, t5, t6 tilt direction (reference alignment direction)
P1, P2, P3, P4, P5 pixel region

The invention claimed is:

1. A liquid crystal display device comprising:
a vertical alignment liquid crystal layer;
a first substrate and a second substrate which face each other with the liquid crystal layer between them;
a first electrode and a second electrode on the first and the second substrates, respectively, to face the liquid crystal layer;
two photo-alignment films between the first electrode and the liquid crystal layer and between the second electrode and the liquid crystal layer, respectively; and
a plurality of pixel regions in a matrix pattern between the first and the second substrates, wherein
each of the plurality of pixel regions includes a first liquid crystal domain, of which a reference alignment direction defined by the two photo-alignment films is a first direction, and a second liquid crystal domain, of which the reference alignment direction is a second direction that is different from the first direction,
the first electrode has a slit cut region, through which a slit has been cut substantially parallel to the reference alignment direction defined by the two photo-alignment films, in a part of a region which is allocated to each of the first and the second liquid crystal domains,
a width of the slit is set so that when a highest grayscale voltage is applied to the first electrode, an effective voltage applied to the liquid crystal layer over the slit decreases by at least 0.5 V and an alignment direction of liquid crystal molecules in the liquid crystal layer over the slit shifts with respect to the reference alignment direction by less than 45 degrees,
each of the plurality of pixel regions further includes a third liquid crystal domain and a fourth liquid crystal domain, of which the reference alignment directions are a third direction and a fourth direction, respectively,
the first direction, the second direction, the third direction, and the fourth direction are four directions which are defined so that an angle formed between any two of the four directions is approximately equal to an integral multiple of 90 degrees,
the first electrode also includes the slit cut region in a portion of the region which is allocated to each of the third liquid crystal domain and the fourth liquid crystal domain,
the first liquid crystal domain, the second liquid crystal domain, the third liquid crystal domain, and the fourth liquid crystal domain are in two columns and two rows in a matrix pattern so that each of the first liquid crystal domain, the second liquid crystal domain, the third liquid crystal domain, and the fourth liquid crystal domain is adjacent to each of others of the first liquid crystal domain, the second liquid crystal domain, the third liquid crystal domain, and the fourth liquid crystal domain,
a portion of a plurality of edges of the first electrode located adjacent to the first liquid crystal domain includes no edge portion in which an azimuthal direction that is perpendicular to the portion of the plurality of edges of the first electrode located adjacent to the first liquid crystal domain and that points toward an inside of the first electrode defines an angle greater than 90 degrees with the first direction,
a portion of a plurality of edges of the first electrode located adjacent to the second liquid crystal domain includes no edge portion in which an azimthal direction that is perpendicular to the portion of the plurality of the edges of the first electrode located adjacent to the second liquid crystal domain and that points toward the inside of the first electrode defines an angle greater that 90 degrees to the second direction,
a portion of a plurality of edges of the first electrode located close to the third liquid crystal domain includes no edge portion in which an azimuthal direction that is perpendicular to the portion of the plurality of the edges of the first electrode located close the third liquid crystal domain and that points toward the inside of the first electrode defines an angle greater than 90 degrees with the third direction, and
a portion of a plurality of edges of the first electrode located adjacent to the fourth liquid crystal domain includes no edge portion in which an azimuthal direction that is perpendicular to the portion of the plurality of the edges of the first electrode located adjacent to the fourth liquid crystal domain and that points toward the inside of the first electrode defines an angle greater that 90 degrees with the fourth direction.

2. The liquid crystal display device of claim 1, wherein the width of the slit is set so that when the highest grayscale voltage is applied to the first electrode, the effective voltage applied to the liquid crystal layer over the slit decreases by 1.0 V or more.

3. The liquid crystal display device of claim 1, wherein the width of the slit is set so that when the highest grayscale voltage is applied to the first electrode, the alignment direction of liquid crystal molecules in the liquid crystal layer over the slit shifts with respect to the reference alignment direction by 30 degrees or less.

4. The liquid crystal display device of claim 1, wherein the first substrate further includes a third electrode under the first electrode with a dielectric layer between the first electrode and the third electrode.

5. The liquid crystal display device of claim 4, wherein the third electrode is supplied with substantially a same voltage as a voltage applied to the second electrode.

6. The liquid crystal display device of claim 1, wherein the slit cut region accounts for one third or more of each of two regions of the first electrode that are allocated to the first liquid crystal domain and the second liquid crystal domain, respectively.

7. The liquid crystal display device of claim 1, wherein a plurality of the slits have been cut through the slit cut region, and
the plurality of slits have substantially a same width.

8. The liquid crystal display device of claim 1, wherein a plurality of the slits have been cut through the slit cut region, and
the plurality of slits include a slit with a first width and a slit with a second width which is different from the first width.

9. The liquid crystal display device of claim 1, wherein when viewed along a normal to a display screen, the slit is entirely surrounded with a conductive film of the first electrode.

10. The liquid crystal display device of claim 1, wherein when viewed along a normal to a display screen, the slit is not entirely surrounded with a conductive film of the first electrode.

11. The liquid crystal display device of claim 1, wherein the first electrode includes an additional slit cut region, through which an additional slit with a different width from the slit of the slit cut region has been cut, in another part of the region which is allocated to each of the first and the second liquid crystal domains.

12. The liquid crystal display device of claim 1, wherein
the first substrate is an active-matrix substrate, and
the first electrode is a pixel electrode.

13. The liquid crystal display device of claim 12, wherein
the pixel electrode includes a plurality of subpixel electrodes,
each of the plurality of pixel regions includes a plurality of subpixel regions which are associated with the plurality of subpixel electrodes, and
each of the subpixel regions has the first and the second liquid crystal domains.

14. The liquid crystal display device of claim 1, wherein the first liquid crystal domain, the second liquid crystal domain, the third liquid crystal domain, and the fourth liquid crystal domain are arranged so that their reference alignment directions are different from each other by approximately 90 degrees between any two adjacent ones of the first liquid crystal domain, the second liquid crystal domain, the third liquid crystal domain, and the fourth liquid crystal domain.

15. The liquid crystal display device of claim 1, wherein
the first direction defines an angle of approximately 45 degrees with respect to the azimuthal direction which is perpendicular to the portion of the edges of the first electrode that is located close to the first liquid crystal domain and which points toward the inside of the first electrode,
the second direction defines an angle of approximately 45 degrees with respect to the azimuthal direction which is perpendicular to the portion of the edges of the first electrode that is located close to the second liquid crystal domain and which points toward the inside of the first electrode,
the third direction defines an angle of approximately 45 degrees with respect to the azimuthal direction which is perpendicular to the portion of the edges of the first electrode that is located close to the third liquid crystal domain and which points toward the inside of the first electrode, and
the fourth direction defines an angle of approximately 45 degrees with respect to the azimuthal direction which is perpendicular to the portion of the edges of the first electrode that is located close to the fourth liquid crystal domain and which points toward the inside of the first electrode.

16. A liquid crystal display device comprising:
a vertical alignment liquid crystal layer;
a first substrate and a second substrate which face each other with the liquid crystal layer between them;
a first electrode and a second electrode on the first and the second substrates, respectively, to face the liquid crystal layer;
two photo-alignment films between the first electrode and the liquid crystal layer and between the second electrode and the liquid crystal layer, respectively; and
a plurality of pixel regions in a matrix pattern between the first and the second substrates, wherein
each of the plurality of pixel regions includes a first liquid crystal domain, of which a reference alignment direction defined by the two photo-alignment films is a first direction, and a second liquid crystal domain, of which the reference alignment direction is a second direction that is different from the first direction,
the first electrode includes a slit cut region, through which a slit has been cut substantially parallel to the reference alignment direction defined by the two photo-alignment films, in a part of a region which is allocated to each of the first liquid crystal domain and the second liquid crystal domain,
a width of the slit is set so that when a highest grayscale voltage is applied to the first electrode, an effective voltage applied to the liquid crystal layer over the slit decreases by at least 0.5 V and an alignment direction of liquid crystal molecules in the liquid crystal layer over the slit shifts with respect to the reference alignment direction by less than 45 degrees,
each of the plurality of pixel regions further include a third liquid crystal domain and a fourth liquid crystal domain, of which the reference alignment directions are a third direction and a fourth direction, respectively,
the first, the second, the third and the fourth directions are four directions which are defined so that an angle formed between any two of the four directions is approximately equal to an integral multiple of 90 degrees,
the first electrode also includes the slit cut region in a portion of the region which is allocated to each of the third and the fourth liquid crystal domains,
the first liquid crystal domain, the second liquid crystal domain, the third liquid crystal domain, and the fourth liquid crystal domain are in two columns and two rows in a matrix pattern so that each of the first liquid crystal domain through the fourth liquid crystal domain is adjacent to each of other ones of the first liquid crystal domain, the second liquid crystal domain, the third liquid crystal domain, and the fourth liquid crystal domain,
a portion of edges of the first electrode which is located close to the first liquid crystal domain includes a first edge portion in which an azimuthal direction that is perpendicular to the portion and that points toward the inside of the first electrode defines an angle greater than 90 degrees with respect to the first direction,
a portion of the edges of the first electrode which is located close to the second liquid crystal domain includes a second edge portion in which an azimuthal direction that is perpendicular to the portion and that points toward the inside of the first electrode defines an angle greater than 90 degrees with respect to the second direction,
a portion of the edges of the first electrode which is located close to the third liquid crystal domain includes a third edge portion in which an azimuthal direction that is perpendicular to the portion and that points toward the inside of the first electrode defines an angle greater than 90 degrees with respect to the third direction, and
a portion of the edges of the first electrode which is located close to the fourth liquid crystal domain includes a fourth edge portion in which an azimuthal direction that is perpendicular to the portion and that points toward the inside of the first electrode defines an angle greater than 90 degrees with respect to the fourth direction.

17. The liquid crystal display device of claim 16, wherein
the first direction defines an angle of approximately 135 degrees with respect to the azimuthal direction which is perpendicular to the first edge portion and which points toward the inside of the first electrode,
the second direction defines an angle of approximately 135 degrees with respect to the azimuthal direction which is perpendicular to the second edge portion and which points toward the inside of the first electrode,
the third direction defines an angle of approximately 135 degrees with respect to the azimuthal direction which is perpendicular to the third edge portion and which points toward the inside of the first electrode, and
the fourth direction defines an angle of approximately 135 degrees with respect to the azimuthal direction which is perpendicular to the fourth edge portion and which points toward the inside of the first electrode.

* * * * *